United States Patent [19]
Andersen et al.

[11] Patent Number: 5,736,209
[45] Date of Patent: Apr. 7, 1998

[54] COMPOSITIONS HAVING A HIGH UNGELATINIZED STARCH CONTENT AND SHEETS MOLDED THEREFROM

[75] Inventors: Per Just Andersen, Santa Barbara; Shaode Ong; Bruce J. Christensen, both of Goleta; Simon K. Hodson, Santa Barbara, all of Calif.

[73] Assignee: E. Kashoggi, Industries, LLC, Santa Barbara, Calif.

[21] Appl. No.: 629,539

[22] Filed: Apr. 9, 1996

Related U.S. Application Data

[63] Continuation-in-part of Ser. No. 152,354, Nov. 19, 1993, Pat. No. 5,508,072, Ser. No. 158,824, Nov. 24, 1993, Pat. No. 5,506,046, and Ser. No. 192,965, Feb. 7, 1994, abandoned.

[51] Int. Cl.$^6$ .............................. B32B 1/08; B32B 5/02; B32B 23/18

[52] U.S. Cl. .................... 428/36.4; 428/36.5; 428/36.92; 428/43; 428/152; 428/182; 428/317.9; 428/532; 428/906

[58] Field of Search .................. 428/34.5, 35.6, 428/35.7, 36.4, 36.5, 43, 152, 182, 220, 312.4, 317.9, 339, 532, 906, 36.92; 229/3.5 R, 930; 524/4, 425, 446, 447, 451, 498, 650

[56] References Cited

U.S. PATENT DOCUMENTS

| | | |
|---|---|---|
| 3,493,382 | 2/1970 | Ryan et al. . |
| 3,949,145 | 4/1976 | Otey et al. . |

(List continued on next page.)

FOREIGN PATENT DOCUMENTS

| | | |
|---|---|---|
| 0006390 A1 | 1/1980 | European Pat. Off. . |
| 0265745 A2 | 5/1988 | European Pat. Off. . |
| 0447797 A2 | 9/1991 | European Pat. Off. . |
| 0453980 A2 | 10/1991 | European Pat. Off. . |

(List continued on next page.)

OTHER PUBLICATIONS

Andersen, *Control and Monitoring of Concrete Production; A Study of Particle Packing and Rheology*, The Danish Academy of Technical Sciences (Mar. 1990).

Andersen, *Effect of Organic Superplasticizing Admixtures and Their Components on Zeta Potential and Related Properties of Cement Materials*, Pennsylvania State University (May 1987).

Bishop, *Cotton, Wool and Silk, Make Way For Soybeans*, Wall Street Journal (Jan. 14, 1993).

Clark, *The Incredible, Edible Plastic*, Ag Consultant (May 1993).

(List continued on next page.)

*Primary Examiner*—James J. Bell
*Assistant Examiner*—Blaine R. Copenheaver
*Attorney, Agent, or Firm*—Workman, Nydegger & Seeley

[57] ABSTRACT

Compositions and methods for manufacturing sheets having a starch-bound matrix reinforced with fibers and optionally including an inorganic mineral filler. Suitable mixtures for forming the sheets are prepared by mixing together water, unmodified and ungelatinized starch granules, a cellulosic ether, fibers, and optionally an inorganic mineral filler in the correct proportions to form a sheet having desired properties. The mixtures are formed into sheets by passing them between one or more sets of heated rollers to form green sheets. The heated rollers cause the cellulosic ether to form a skin on the outer surfaces of the sheet that prevents the starch granules from causing the sheet to adhere to the rollers upon gelation of the starch. The green sheets are passed between heated rollers to gelatinize the starch granules, and then to dry the sheet by removing a substantial portion of the water by evaporation. The starch and cellulosic ether form the binding matrix of the sheets with the fibers and optional inorganic filler dispersed throughout the binding matrix. The starch-bound sheets can be cut, rolled, pressed, scored, perforated, folded, and glued to fashion articles from the sheets much like paper or paperboard. The sheets are particularly useful in the mass production of containers, such as food and beverage containers.

86 Claims, 7 Drawing Sheets

U.S. PATENT DOCUMENTS

| | | |
|---|---|---|
| 3,968,004 | 7/1976 | Coffey et al. . |
| 4,017,324 | 4/1977 | Eggers . |
| 4,043,862 | 8/1977 | Roberts . |
| 4,044,166 | 8/1977 | Koizumi . |
| 4,070,196 | 1/1978 | Kraak et al. . |
| 4,076,547 | 2/1978 | Lester et al. . |
| 4,080,213 | 3/1978 | Mori et al. . |
| 4,089,691 | 5/1978 | Cummisford et al. . |
| 4,094,077 | 6/1978 | Schrader et al. . |
| 4,124,550 | 11/1978 | Kobayashi et al. . |
| 4,133,784 | 1/1979 | Otey et al. . |
| 4,149,550 | 4/1979 | Green et al. . |
| 4,172,154 | 10/1979 | von Rymon Lipinski . |
| 4,204,337 | 5/1980 | Roos et al. . |
| 4,210,490 | 7/1980 | Taylor . |
| 4,225,247 | 9/1980 | Hodson . |
| 4,225,383 | 9/1980 | McReynolds . |
| 4,229,225 | 10/1980 | Kraszewski et al. . |
| 4,249,991 | 2/1981 | Baes et al. . |
| 4,303,690 | 12/1981 | Haas, Sr. et al. . |
| 4,306,059 | 12/1981 | Yokobayashi et al. . |
| 4,328,136 | 5/1982 | Blount . |
| 4,329,177 | 5/1982 | George . |
| 4,377,440 | 3/1983 | Gasland . |
| 4,378,271 | 3/1983 | Hargreaves et al. . |
| 4,394,930 | 7/1983 | Korpman . |
| 4,410,571 | 10/1983 | Korpman . |
| 4,438,685 | 3/1984 | Haas, Sr. et al. . |
| 4,445,970 | 5/1984 | Post et al. . |
| 4,454,268 | 6/1984 | Otey et al. . |
| 4,456,625 | 6/1984 | Durst . |
| 4,482,386 | 11/1984 | Wittwer et al. . |
| 4,508,595 | 4/1985 | Gasland . |
| 4,511,585 | 4/1985 | Durst . |
| 4,524,682 | 6/1985 | Haas, Sr. et al. . |
| 4,529,653 | 7/1985 | Hargreaves et al. . |
| 4,545,854 | 10/1985 | Gomez et al. . |
| 4,562,218 | 12/1985 | Fornandel et al. . |
| 4,588,443 | 5/1986 | Bache . |
| 4,595,623 | 6/1986 | Du Pont et al. . |
| 4,613,627 | 9/1986 | Sherman et al. . |
| 4,623,150 | 11/1986 | Moehlman et al. . |
| 4,624,855 | 11/1986 | Haas, Sr. et al. . |
| 4,655,840 | 4/1987 | Wittwer et al. . |
| 4,673,438 | 6/1987 | Wittwer et al. . |
| 4,710,442 | 12/1987 | Fredenucci . |
| 4,711,669 | 12/1987 | Paul et al. . |
| 4,735,811 | 4/1988 | Skarra et al. . |
| 4,749,583 | 6/1988 | Branch . |
| 4,753,710 | 6/1988 | Langley et al. . |
| 4,755,494 | 7/1988 | Ruben . |
| 4,775,580 | 10/1988 | Dighton . |
| 4,781,932 | 11/1988 | Skarra et al. . |
| 4,789,244 | 12/1988 | Dunton et al. . |
| 4,814,012 | 3/1989 | Paul et al. . |
| 4,828,650 | 5/1989 | Wagle et al. . |
| 4,833,191 | 5/1989 | Bushway et al. . |
| 4,846,932 | 7/1989 | Karita et al. . |
| 4,863,655 | 9/1989 | Lacourse et al. . |
| 4,872,913 | 10/1989 | Dunton et al. . |
| 4,892,590 | 1/1990 | Gill et al. . |
| 4,912,069 | 3/1990 | Ruben . |
| 4,919,758 | 4/1990 | Wagle et al. . |
| 4,921,250 | 5/1990 | Ayers . |
| 4,923,665 | 5/1990 | Andersen et al. . |
| 4,925,530 | 5/1990 | Sinclair et al. . |
| 4,927,655 | 5/1990 | Ito . |
| 4,927,656 | 5/1990 | Ito . |
| 4,941,922 | 7/1990 | Snyder . |
| 4,943,349 | 7/1990 | Gomez . |
| 4,944,595 | 7/1990 | Hodson . |
| 4,950,490 | 8/1990 | Ghiasi et al. . |
| 4,952,278 | 8/1990 | Gregory et al. . |
| 4,953,453 | 9/1990 | Haas, Sr. et al. . |
| 4,957,558 | 9/1990 | Ueda et al. . |
| 4,957,754 | 9/1990 | Munk et al. . |
| 4,963,603 | 8/1990 | Felegi, Jr. et al. . |
| 4,979,992 | 12/1990 | Bache . |
| 5,035,930 | 7/1991 | Lacourse et al. . |
| 5,039,003 | 8/1991 | Gordon et al. . |
| 5,039,378 | 8/1991 | Pommier et al. . |
| 5,043,196 | 8/1991 | Lacourse et al. . |
| 5,059,642 | 10/1991 | Jane et al. . |
| 5,061,346 | 10/1991 | Taggart et al. . |
| 5,071,512 | 12/1991 | Bixler et al. . |
| 5,076,985 | 12/1991 | Koch et al. . |
| 5,082,500 | 1/1992 | Nachtman et al. . |
| 5,095,054 | 3/1992 | Lay et al. . |
| 5,104,487 | 4/1992 | Taggart et al. . |
| 5,104,669 | 4/1992 | Wolke et al. . |
| 5,106,880 | 4/1992 | Miller et al. . |
| 5,108,677 | 4/1992 | Ayres . |
| 5,108,807 | 4/1992 | Tucker . |
| 5,110,413 | 5/1992 | Steer . |
| 5,122,231 | 6/1992 | Anderson . |
| 5,124,161 | 6/1992 | van Lengerich et al. . |
| 5,126,013 | 6/1992 | Wiker et al. . |
| 5,126,014 | 6/1992 | Chung . |
| 5,134,179 | 7/1992 | Felegi, Jr. et al. . |
| 5,153,037 | 10/1992 | Alteri . |
| 5,160,368 | 11/1992 | Begovich . |
| 5,162,126 | 11/1992 | Thomer et al. . |
| 5,178,730 | 1/1993 | Bixler et al. . |
| 5,185,382 | 2/1993 | Neumann et al. . |
| 5,186,990 | 2/1993 | Starcevich . |
| 5,194,206 | 3/1993 | Koch et al. . |
| 5,201,403 | 4/1993 | Haas, Sr. et al. . |
| 5,206,087 | 4/1993 | Tokiwa et al. . |
| 5,208,267 | 5/1993 | Neumann et al. . |
| 5,221,435 | 6/1993 | Smith, Jr. . |
| 5,224,595 | 7/1993 | Sugimoto et al. . |
| 5,234,978 | 8/1993 | Delrue et al. . |
| 5,240,561 | 8/1993 | Kaliski . |
| 5,248,702 | 9/1993 | Neumann et al. . |
| 5,252,271 | 10/1993 | Jeffs . |
| 5,256,711 | 10/1993 | Tokiwa et al. . |
| 5,258,430 | 11/1993 | Bastioli et al. . |
| 5,262,458 | 11/1993 | Bastioli et al. . |
| 5,264,030 | 11/1993 | Tanabe et al. . |
| 5,264,080 | 11/1993 | Shaw et al. . |
| 5,266,368 | 11/1993 | Miller . |
| 5,268,187 | 12/1993 | Quinlan . |
| 5,269,845 | 12/1993 | Grunau et al. . |
| 5,272,181 | 12/1993 | Boehmer et al. . |
| 5,273,167 | 12/1993 | Haas et al. . |
| 5,273,821 | 12/1993 | Olson et al. . |
| 5,275,774 | 1/1994 | Bahr et al. . |
| 5,277,764 | 1/1994 | Johansson et al. . |
| 5,278,194 | 1/1994 | Tickner et al. . |
| 5,279,658 | 1/1994 | Aung . |
| 5,280,055 | 1/1994 | Tomka . |
| 5,284,672 | 2/1994 | Ito . |
| 5,288,318 | 2/1994 | Mayer et al. . |
| 5,288,765 | 2/1994 | Bastioli et al. . |
| 5,290,350 | 3/1994 | Besnard et al. . |
| 5,296,180 | 3/1994 | Hayes et al. . |
| 5,296,526 | 3/1994 | Delrue et al. . |
| 5,298,273 | 3/1994 | Ito . |
| 5,300,333 | 4/1994 | Wilkerson et al. . |
| 5,308,879 | 5/1994 | Akamatu et al. . |
| 5,314,754 | 5/1994 | Knight . |
| 5,317,037 | 5/1994 | Golden et al. . |

| | | |
|---|---|---|
| 5,317,119 | 5/1994 | Ayres . |
| 5,320,669 | 6/1994 | Lim et al. . |
| 5,324,351 | 6/1994 | Oshlack et al. . |
| 5,346,541 | 9/1994 | Goldman et al. . |
| 5,352,709 | 10/1994 | Tarrant et al. . |
| 5,356,467 | 10/1994 | Oshlack et al. . |
| 5,360,473 | 11/1994 | Fleche et al. . |
| 5,360,586 | 11/1994 | Wyatt et al. . |
| 5,360,828 | 11/1994 | Morrison . |
| 5,360,844 | 11/1994 | Delrue et al. . |
| 5,362,776 | 11/1994 | Barenburg et al. . |
| 5,362,777 | 11/1994 | Tomka . |
| 5,367,067 | 11/1994 | Frische et al. . |
| 5,372,877 | 12/1994 | Kannankeril . |
| 5,376,320 | 12/1994 | Tiefenbacher et al. . |
| 5,378,418 | 1/1995 | Berger et al. . |
| 5,380,180 | 1/1995 | Lamb, Sr. . |
| 5,382,285 | 1/1995 | Morrison . |
| 5,382,611 | 1/1995 | Stepto et al. . |
| 5,389,322 | 2/1995 | Kim et al. . |
| 5,393,333 | 2/1995 | Trouve . |
| 5,393,804 | 2/1995 | George et al. . |
| 5,395,438 | 3/1995 | Baig et al. . |
| 5,397,834 | 3/1995 | Jane et al. . |
| 5,405,437 | 4/1995 | Leake et al. . |
| 5,405,564 | 4/1995 | Stepto et al. . |
| 5,411,639 | 5/1995 | Kurrie . |
| 5,415,827 | 5/1995 | Tomka et al. . |
| 5,419,962 | 5/1995 | Robertson et al. . |
| 5,427,614 | 6/1995 | Wittwer et al. . |
| 5,428,150 | 6/1995 | De Bock et al. . |
| 5,432,000 | 7/1995 | Young, Sr. et al. . |
| 5,436,078 | 7/1995 | Buhler et al. . |
| 5,447,604 | 9/1995 | Johansson et al. . |
| 5,454,863 | 10/1995 | Foran et al. . |
| 5,456,933 | 10/1995 | Lee . |
| 5,462,980 | 10/1995 | Bastioli et al. . |
| 5,470,382 | 11/1995 | Andou . |
| 5,474,856 | 12/1995 | Tamagawa et al. . |
| 5,476,621 | 12/1995 | Kustner . |
| 5,480,923 | 1/1996 | Schmid et al. . |
| 5,487,813 | 1/1996 | Vinson et al. . |
| 5,494,509 | 2/1996 | Kruythoff et al. . |
| 5,496,440 | 3/1996 | Carre et al. . |
| 5,500,089 | 3/1996 | Huang et al. . |
| 5,501,771 | 3/1996 | Bourson . |
| 5,501,774 | 3/1996 | Burke . |
| 5,506,046 | 4/1996 | Andersen et al. ............... 428/34.5 |
| 5,506,277 | 4/1996 | Griesbach, III . |
| 5,508,072 | 4/1996 | Andersen et al. ............... 428/34.5 |
| 5,512,090 | 4/1996 | Franke . |
| 5,512,135 | 4/1996 | Carre et al. . |
| 5,512,378 | 4/1996 | Bastioli . |
| 5,523,293 | 6/1996 | Jane et al. . |
| 5,525,281 | 6/1996 | Lorcks et al. . |
| 5,545,450 | 8/1996 | Andersen et al. ............... 428/34.5 |
| 5,569,514 | 10/1996 | Ayres . |
| 5,580,624 | 12/1996 | Andersen et al. ............... 428/34.5 |
| 5,631,053 | 5/1997 | Andersen et al. ............... 428/36.4 |

FOREIGN PATENT DOCUMENTS

| | | |
|---|---|---|
| 0370913 B1 | 12/1992 | European Pat. Off. . |
| 0546956 A2 | 6/1993 | European Pat. Off. . |
| 0551954 A2 | 7/1993 | European Pat. Off. . |
| 0556774 A2 | 8/1993 | European Pat. Off. . |
| 0405146 B1 | 2/1994 | European Pat. Off. . |
| 0304401 B1 | 3/1994 | European Pat. Off. . |
| 0271853 B2 | 7/1994 | European Pat. Off. . |
| 0608031 A1 | 7/1994 | European Pat. Off. . |
| 0609983 A2 | 8/1994 | European Pat. Off. . |
| 0118240 B1 | 7/1995 | European Pat. Off. . |
| 1278195 | 10/1961 | France . |
| 2642731 | 7/1990 | France . |
| 3346970 | 7/1985 | Germany . |
| 3420195 A1 | 12/1985 | Germany . |
| 4008862 C1 | 4/1991 | Germany . |
| 51-73143 | 6/1976 | Japan . |
| 60-35052 | 2/1985 | Japan . |
| 60-235624 | 11/1985 | Japan . |
| 62-22636 | 1/1988 | Japan . |
| 5-105815 | 4/1993 | Japan . |
| 5-171049 | 7/1993 | Japan . |
| 5-246417 | 9/1993 | Japan . |
| 5-230401 | 12/1993 | Japan . |
| 4-185468 | 2/1994 | Japan . |
| 60-32386 | 2/1994 | Japan . |
| 6-135487 | 5/1994 | Japan . |
| 6-192577 | 7/1994 | Japan . |
| 9100590 | 11/1992 | Netherlands . |
| 1584387 | 2/1981 | United Kingdom . |
| 2050459 | 6/1983 | United Kingdom . |
| 2208651 | 4/1989 | United Kingdom . |
| 2214516 A | 9/1989 | United Kingdom . |
| WO 87/00828 | 2/1987 | WIPO . |
| WO 89/02225 | 3/1989 | WIPO . |
| WO 90/10671 | 9/1990 | WIPO . |
| WO 91/12186 | 8/1991 | WIPO . |
| WO 92/04408 | 3/1992 | WIPO . |
| WO 93/01242 | 1/1993 | WIPO . |
| WO 93/22048 | 11/1993 | WIPO . |
| WO 94/03543 | 2/1994 | WIPO . |
| WO 94/18384 | 8/1994 | WIPO . |
| WO 94/18388 | 8/1994 | WIPO . |

OTHER PUBLICATIONS

Davidson et al., *Water-Soluble Resins*, New York: Reinhold Publishing Corp., Chapman & Hall, Ltd., London (1962).

Dow Plastics, *Thermoforming Process Guide*. no date.

Fedors and Landel, *An Empirical Method Of Estimating the Void Fraction in Mixtures of Uniform Particles of Different Size*, Powder Technology, 23, 225–231 (Apr. 1979).

Freeman Industries, Inc. *Zein In The Food Industry*. no date.

Furnas, *Grading Aggregates I–Mathematical Relations for Beds of Broken Solids of Maximum Density*, Industrial and Engineering Chemistry (Sep. 1931).

Greminger, Jr and Krumel, *Alkyl and Hydroxyalkylalkylcellulose*, Dow Chemical U.S.A., Midland, Oregon. no date.

Howard, *Universities Make Plea For Cash*, . . . Register (Feb. 11, 1993).

Iowa State University, *Crop Utilization Research / Crop Products Pilot Plant*, Utilization Center for Agricultural Products, Ames, Iowa. no date.

Johansen et al., *Particle Packing and Concrete Properties*, Materials Science of Concrete II, 111–147. no date.

Lane, *SoyDiesel: Promising New Market For Soy Oil / Soybeans Come Callin' On Utensils*, Soybean Digest, vol. 54, No. 11 (Dec. 1994).

Lucht, *Golf Tees Out of Corn, Boards From Beans*, Iowa Farmer Today, NW Edition (Jan. 16, 1993).

Lucht, *Product Research Aimed At Propping Up Crop Prices*, Iowa Farmer Today, NW Edition (Jan. 16, 1993).

McGeary, *Mechanical Packing of Spherical Particles*, Journal of the American Ceramic Society, vol. 44, No. 10 (Oct. 1961).

McMurray, *For People Without Livestock, Growing Children Should Do Fine*, The Wall Street Journal (Mar. 31, 1993).

Osbaeck and Johansen, *Particle Size Distribution and Rate of Strength Development*, Paper for 89th Annual Meeting of the American Ceramic Society, Inc., Pittsburgh, PA (Apr. 26–30, 1987).

Patankar and Mandal, *The Packing of Some Non-Spherical Solid Particles*, Trans. J. Brit. Ceram. Soc., 79, 59–66 (1980).

Ridgway and Tarbuck, *Particulate Mixture Bulk Densities*, Chemical and Process Engineering (Feb. 1968).

Robinson, *Extrusion Defects*. no date.

Sequa Chemicals, Inc., Technical Data, *Sunrez®700 Series Insolubilizers Coating Additive*. no date.

Staley Starch and Specialty Products Group, Technical Data *Sta-Lok®400 Cationic Potato Starch*. no date.

Stovall, De Larrard, and Bull, *Linear Packing Density Model of Grain Mixtures*, Powder Technology, 48 1–12 (1986).

Swientek, *Formidable Films*, Prepared Foods (Sep. 1993).

United Soybean Board, *New Uses For Soybeans / The Best Is Yet To Be*. no date.

Vrana, *Khashoggi Kin Reported Planning Private Placement of Shares in New Container Firm* (Mar. 28, 1993).

Weinrich, *German Comes Up With Recycled Product to Replace Foam Chips*. no date.

Westman and Hugill, *The Packing of Particles* (1930).

Zeneca, *BIOPOL, Nature's Plastic–Born from Nature, Back to Nature* (1993).

Zinkland, *New EcoPLA Plastic Stretches Corn Use*, Iowa Farmer Today, NW Edition (Apr. 2, 1994).

*An Inventive End To A Daily Grind: Do In The Dishes*. no date.

*Biotec Product Literature*. no date.

*ISU Researcher Foams At New Breakthrough*, Times-Republican (Jul. 16, 1994).

*Plastic–Forming Processes*. no date.

*Starch Foam Dishes at Burger King's*, Biomat 32—Production Unit for Natural Packaging. no date.

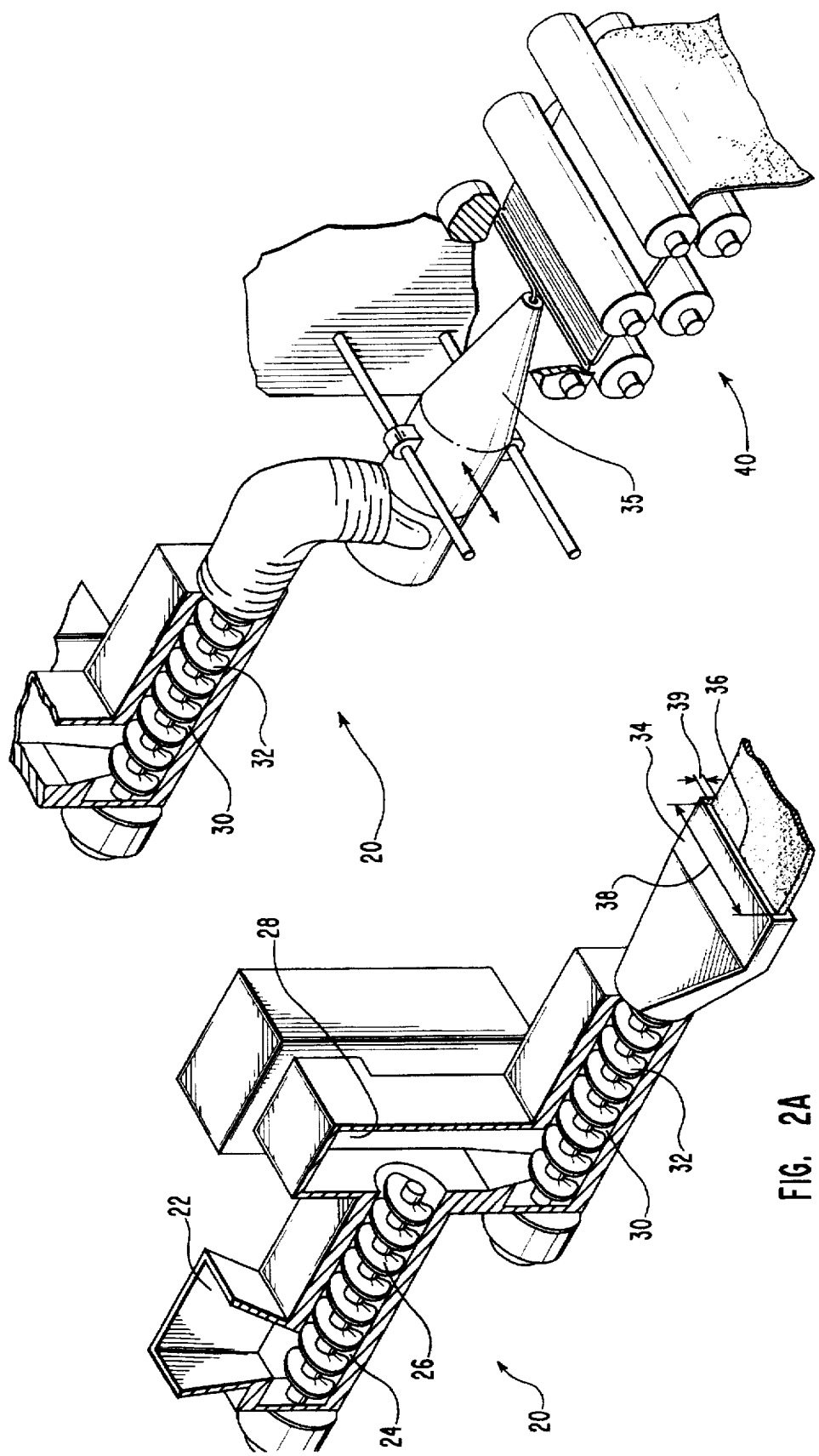

COMPOSITIONS HAVING A HIGH UNGELATINIZED STARCH CONTENT AND SHEETS MOLDED THEREFROM

RELATED APPLICATIONS

This application is a continuation-in-part of U.S. application Ser. No. 08/152,354, filed Nov. 19, 1993, now issued as U.S. Pat. No. 5,508,072; also a continuation-in-part of U.S. application Ser. No. 08/158,824, filed Nov. 24, 1993, now issued as U.S. Pat. No. 5,506,046; and also a continuation-in-part of U.S. application Ser. No. 08/192,965 entitled "Hinges For Inorganically Filled Composite Materials," and filed Feb. 7, 1994, in the names of Per Just Andersen, Ph.D., and Simon K. Hodson (now abandoned). For purposes of disclosure, the foregoing applications and patents are incorporated herein by specific reference.

BACKGROUND OF THE INVENTION

1. Field of the Invention

The present invention relates to compositions and methods for manufacturing molded sheets and articles therefrom. More particularly the present invention relates to sheets having a starch-bound matrix reinforced with fibers and optionally including an inorganic mineral filler. The molded sheets may be substituted for conventional paper and paperboard products.

2. The Relevant Technology

A. Sheets, Containers, and Other Articles

Thin, flexible sheets made from materials such as paper, paperboard, plastic, polystyrene, and even metals are presently used in enormous quantity as printed materials, labels, mats, and in the manufacture of other articles such as containers, separators, dividers, envelopes, lids, tops, cans, and other packaging materials. Advanced processing and packaging techniques presently allow an enormous variety of liquid and solid goods to be stored, packaged, or shipped while being protected from harmful elements.

Containers and other packaging materials protect goods from environmental influences and distribution damage, particularly from chemical and physical influences. Packaging helps protect an enormous variety of goods from gases, moisture, light, microorganisms, vermin, physical shock, crushing forces, vibration, leaking, or spilling. Some packaging materials also provide a medium for the dissemination of information to the consumer, such as the origin of manufacture, contents, advertising, instructions, brand identification, and pricing.

Typically, most containers and cups (including disposable containers) are made from paper, paperboard, plastic, polystyrene, glass and metal materials. Each year over 100 billion aluminum cans, billions of glass bottles and thousands of tons of paper and plastic are used in storing and dispensing soft drinks, juices, processed foods, grains, beer, etc. Outside of the food and beverage industry, packaging containers (and especially disposable containers) made from such materials are ubiquitous. Paper for printing, writing, and photocopying, as well as magazines, newspapers, books, wrappers, and other flat items made primarily from tree derived paper sheets are also manufactured each year in enormous quantities. In the United States alone, approximately 5½ million tons of paper are consumed each year for packaging purposes, which represents only about 15% of the total annual domestic paper production.

B. The Impact of Paper, Plastic, Glass and Metal

Recently there has been a debate as to which of these materials (e.g., paper, paperboard, plastic, polystyrene, glass, or metal) is most damaging to the environment. Consciousness-raising organizations have convinced many people to substitute one material for another in order to be more environmentally "correct." The debate often misses the point that each of these materials has its own unique environmental weaknesses. One material may appear superior to another when viewed in light of a particular environmental problem, while ignoring different, often larger, problems associated with the supposedly preferred material. In fact, paper, paperboard, plastic, polystyrene, glass, and metal materials each have their own unique environmental weaknesses.

Polystyrene products have more recently attracted the ire of environmental groups, particularly containers and other packaging materials. While polystyrene itself is a relatively inert substance, its manufacture involves the use of a variety of hazardous chemicals and starting materials. Unpolymerized styrene is very reactive and therefore presents a health problem to those who must handle it. Because styrene is manufactured from benzene (a known mutagen and probably a carcinogen), residual quantities of benzene can be found in styrene. Finally, because polymerized styrene is relatively stable under ordinary conditions, containers, packing peanuts, and other articles made therefrom resist breakdown and therefore persist over long periods of time when discarded into the environment.

More potentially damaging has been the use of chlorofluorocarbons (or "CFCs") in the manufacture of "blown" or "expanded" polystyrene products. This is because CFCs have been linked to the destruction of the ozone layer. In the manufacture of foams, including blown polystyrene, CFCs (which are highly volatile liquids) have been used to "expand" or "blow" the polystyrene into a foamed material, which is then molded into the form of cups, plates, trays, boxes, "clam-shell" containers, spacers, or packaging materials. Even the substitution of less "environmentally damaging" blowing agents (e.g., HCFC, $CO_2$, and pentanes) is still significantly harmful and their elimination would be beneficial.

As a result, there has been widespread pressure for companies to stop using polystyrene products in favor of more environmentally safe materials. Some environmental groups have favored a temporary return to the use of more "natural" products such as paper or other products made from wood pulp, which are believed to be biodegradable. Nevertheless, other environmental groups have taken the opposite view in order to minimize the cutting of trees and depletion of forests.

Although paper products are ostensibly biodegradable and have not been linked to the destruction of the ozone layer, recent studies have shown that the manufacture of paper probably more strongly impacts the environment than does the manufacture of polystyrene. In fact, the wood pulp and paper industry has been identified as one of the five top polluters in the United States. For instance, products made from paper require ten times as much steam, fourteen to twenty times as much electricity, and twice as much cooling water compared to an equivalent polystyrene product. Various studies have shown that the effluent from paper manufacturing contains ten to one hundred times the amount of contaminants produced in the manufacture of polystyrene foam.

Another drawback of the manufacture of paper and paperboard is the relatively large amount of energy that is required to produce paper. This includes the energy required to process wood pulp to the point that the fibers are sufficiently delignified and frayed such that the fibers are essentially self-binding under the principles of web physics. In addition, a large amount of energy is required in order to remove the water within conventional paper slurries, which contain water in amounts of up to about 99.5% by volume. Because so much water must be removed from the slurry, it is necessary to literally suck water out of the slurry even before heated rollers can be used to dry the sheet. Moreover, much of the water that is sucked out of the sheets during the dewatering process is usually discarded into the environment.

The manufacturing processes of forming metal sheets into containers (particularly cans made of aluminum and tin), blowing glass bottles, and shaping ceramic containers utilize high amounts of energy because of the necessity to melt and then separately work and shape the raw material into an intermediate or final product. These high energy and processing requirements not only utilize valuable energy resources, but they also result in significant air, water, and heat pollution to the environment. While glass can be recycled, that portion that ends up in landfills is essentially non-degradable. Broken glass shards are very dangerous and can persist for years.

Even paper or paperboard, believed by many to be biodegradable, can persist for years, even decades, within landfills shielded from air, light, and water, all of which are required for normal biodegradation activities. There are reports of telephone books and newspapers having been lifted from garbage dumps that had been buried for decades. This longevity of paper is further complicated since it is common to treat, coat, or impregnate paper with various protective materials which further slow or prevent degradation.

Another problem with paper, paperboard, polystyrene, and plastic is that each of these requires relatively expensive organic starting materials, some of which are nonrenewable, such as the use of petroleum in the manufacture of polystyrene and plastic. Although trees used in making paper and paperboard are renewable in the strict sense of the word, their large land requirements and rapid depletion in certain areas of the world undermines this notion. Hence, the use of huge amounts of essentially nonrenewable starting materials in making sheets and articles therefrom cannot be sustained and is not wise from a long term perspective. Furthermore, the processes used to make the packaging stock raw materials (such as paper pulp, styrene, or metal sheets) are very energy intensive, cause major amounts of water and air pollution, and require significant capital requirements.

In light of the foregoing, the debate should not be directed to which of these materials is more or less harmful to the environment, but rather toward asking whether an alternative material can be developed which will solve most, if not all, of the various environmental problems associated with each of these presently used materials.

C. Starch Binders

More recently, many have attempted to utilize starches and starch derivatives as the binding agent or sole constituent within molded articles. One method for molding starch is by means of forming what is known in the art as "destructurized starch." In the manufacture of destructurized starch, native starch or starch derivatives are mixed with a plasticizing agent and liquified under high temperature and pressure in order to create a "hot melt" which is solidified by cooling the hot melt to below the "glass transition temperature." In this way, starch is treated like a thermoplastic material. While destructurized or hot melt starch systems sound easy in theory, in practice the manufacturing methods are quite expensive and the articles made therefrom are generally unsatisfactory and of low quality.

Another method for molding starch-based mixtures into articles involves molding an aqueous starch mixture between heated dies. The starch binder is preferably initially in an unmodified, ungelatinized state within the moldable aqueous mixture. Otherwise, the mixture would have to include far more water in order to maintain the same characteristics of moldability due to the gelation of starch and the tremendous viscosity increasing effect of gelatinized starch within water. The starch water mixtures are heated between the molds to a temperature great enough to gelatinize the starch as well as to remove the majority of the water from the moldable mixture. The resulting molded articles can be demolded, but are initially very brittle until they have been "conditioned" by placing them in a high humidity chamber for extended periods of time in order to reabsorb moisture.

Simply demolding the articles to have residual moisture has not proven feasible due to the tendency of the foamed cellular starch matrix to collapse if not sufficiently dried and hardened. However, obtaining a cellular starch matrix having sufficient strength to avoid collapse usually entails overdrying the starch. Such a conditioning is a required after molding process. While the foregoing molding process may have some utility, it does not allow for the continuous manufacture of continuous sheets, such as in conventional paper making processes.

Starch derivatives are also widely used in the paper industry as sizing agents and coatings in order to seal the pores of paper and create a smoother, less porous surface. However, conventional paper manufacturing processes universally rely on the principle of web physics, which is the intertwining of and hydrogen bonding between fibers, in order to form the bonding matrix of the sheet. The starch binders added to the paper slurry or furnish only act as secondary binding agents since most of the starch will pass through the forming wire along with the water as it is drained from the furnish during the paper-making process. Hence, much of the starch added to paper furnish is wasted. It therefore would be highly uneconomical to utilize starch as the sole or primary binder in conventional paper.

Moreover, one of the problems with starch binders is that they are generally very sticky once dissolved or gelatinized in water. While this makes them generally good binding agents, it complicates the manufacturing process since sheets or articles made using large amounts of dissolved or gelated starch binders have a tendency to stick to the mold or sheet-forming apparatus. On the other hand, unmodified starch granules are generally insoluble in water and merely act as passive particulate fillers in wet systems unless the compositions containing starch granules are heated to above the gelation temperature of the starch. However, once gelated, the unmodified starch granules will, of course, become very sticky and tend to adhere to the molding equipment, particularly heated molding equipment.

Based on the foregoing, what is needed are improved compositions and methods for manufacturing low cost, environmentally friendly sheets which had properties similar to paper, paperboard, polystyrene, plastic, or metal sheets.

It would be a significant improvement in the art if such sheets could be formed into a variety of containers or other articles using existing manufacturing equipment and techniques presently used to form articles from paper, paperboard, polystyrene, plastic, or metal sheets.

It would yet be an advancement in sheet-making if the environmentally friendly sheets could be formed from molding compositions which contain only a fraction of the water and/or fibers contained in typical slurries used to make conventional paper and which did not require extensive dewatering during the sheet forming process.

It would be a significant improvement in the art if such sheets, as well as containers or other articles made therefrom, were readily biodegradable and/or degradable into substances commonly found in the earth.

From a practical point of view, it would be a significant improvement to provide compositions and methods which allowed the manufacture of sheets, containers, and other articles therefrom at a cost that was comparable to or even lower than the cost of existing methods of manufacturing paper, plastics, or metal products. Specifically, it would be desirable to reduce the energy requirements and initial capital investment costs for making products having the desirable characteristics of paper, plastics, or metals.

It would be a further advancement in the art to provide compositions and methods which allowed for the inclusion of relatively high amounts of starch within sheets while overcoming the problems associated with the adhesion of starch, particularly gelatinized starch, to the molding or sheet forming apparatus.

It would also be a tremendous advancement in the art to provide compositions and methods which allowed for the optional inclusion of significant quantities of natural inorganic mineral fillers within the aforementioned sheets. In particular, it would be a significant improvement in the art if such inorganically filled sheets had greater flexibility, tensile strength, toughness, moldability, and mass-producibility compared to prior materials having a high content of inorganic filler.

Such compositions and methods for manufacturing the aforementioned sheets are disclosed and claimed herein.

SUMMARY AND OBJECTS OF THE INVENTION

The present invention is directed to compositions and methods for manufacturing environmentally friendly sheets that have relatively high concentrations of starch and optionally inorganic mineral fillers. Because the starch component comprises the primary binding agent, the sheets of the present invention shall hereinafter be referred to as "starch-bound sheets." Such sheets have strength and other performance properties which make them comparable and even superior to conventional tree paper.

The moldable compositions used to form the starch-bound sheets typically include ungelatinized starch granules, a cellulosic ether, homogeneously dispersed fibers, water, and optionally inorganic mineral fillers and other optional components. Appropriate cellulosic ethers include those which undergo "thermal precipitation", which is a phenomenon wherein the cellulosic ether within an aqueous system releases water and solidifies upon heating the aqueous system to above the thermal precipitation point of the particular cellulosic ether. In this manner the cellulosic ether forms a nonstick film on the sheet exterior, which encapsulates the moist sheet interior and which thereby prevents the starch granules within the moldable composition from adhering to the sheet forming rollers upon gelatinization during subsequent stages of the sheet-forming process.

The moldable composition is preferably formed into sheets by passing it between forming rollers that are heated to at or above the thermal precipitation temperature of the cellulosic ether but below the gelation temperature of the starch. The forming roller yields a green sheet having a nonstick film of thermally precipitated cellulosic ether. At this point, the green sheet has a relatively dry surface, although the interior contains considerable moisture. Thereafter, the sheet is passed between rollers heated to a temperature sufficient to gelatinize the starch granules. The gelated starch granules meld together within the sheet to form a very strong binding matrix but do not cause the sheet to stick to the rollers because the gelatinized starch is encapsulated within the nonstick surface film of thermally precipitated cellulosic ether. The sheet is further heated to remove a substantial quantity of the water by evaporation to yield a substantially dried sheet. The sheets molded according to the preferred process comprise a starch-bound matrix reinforced with substantially homogeneously dispersed fibers. The sheets may optionally include an inorganic mineral filler and other admixtures.

A preferred composition for forming the sheets includes an ungelatinized starch binder having a concentration in a range from about 5% to about 90% by weight of total solids in the composition; a cellulosic ether having a concentration in a range from about 0.5% to about 10% by weight of total solids in the composition; a fibrous material having a concentration in a range from about 3% to about 40% by weight of total solids in the composition; optionally an inorganic aggregate having a concentration in a range from 0% to about 90% by weight of total solids in the composition; and water in a quantity sufficient to yield a moldable composition. The cellulosic ether in the molding composition acts as a thickening agent which increases the yield stress of the fluid fraction and allows for the homogeneous dispersion of the fibers throughout the molding composition.

Sheets formed using the compositions and methods of the present invention can have a thickness as low as about 0.01 mm up to as high as 10 cm or more. However, in order for the sheets to have qualities similar to paper or paperboard, they will generally have a thickness less than about 1 cm, preferably less than about 5 mm, more preferably less than about 3 mm, and most preferably less than about 1 mm. In addition, the starch-bound structural matrix of the sheet will degrade after prolonged exposure to water.

Before the inventors discovered the ability to utilize relatively high quantities of starch in conjunction with thermal precipitating cellulosic ethers, preferred primary binders for molding inorganically filled sheets were in fact the cellulosic ethers themselves. However, cellulosic ethers have the disadvantage of being far more expensive compared to the other components used to make the sheets. Unmodified starch granules, the least expensive of all starches, have heretofore found little use as a binder because once gelatinized they have the disadvantage of being extremely sticky. Attempts to use as the primary binder in sheet forming processes met with unsatisfactory adhesion of the starch to the extrusion or sheet-forming apparatus.

The present invention provides for the substitution of large quantities of starch for much of the cellulosic ether binder previously employed in compositions for making sheets. The combination of using a small amount of relatively expensive cellulosic ether along with much higher amounts of relatively inexpensive unmodified starch granules eliminates the above disadvantages of using each of these binders separately. Reducing the amount of cellulosic ether within the moldable compositions used to form the sheets substantially reduces the cost of making the sheets. In addition, not only is starch far less expensive but it is a superior binder compared to cellulosic ethers and yields sheets of far higher quality at far less cost than sheets that employ cellulosic ethers as the sole binding agent.

When mixing together the components of the molding composition, it is important that the starch not be subjected to shearing forces large enough to break or rupture the starch granules. It is also important to maintain the mixture at a temperature below the gelation temperature of the starch to avoid premature gelation of the starch binder before the sheet forming process has begun. Otherwise the starch at the surface of the sheet may stick to the sheet-forming apparatus before the cellulosic ether has first precipitated and formed the nonstick film on the surface of the sheet.

Accordingly, a preferred method for forming the molding composition used to form the sheets of the present invention comprises mixing together water, fibers and the cellulosic ether using high shear mixing to substantially homogeneously disperse the fibers and form a fibrous mixture. Thereafter, the unmodified starch granules, inorganic mineral filler, and other optional admixtures are blended into the fibrous mixture to form the molding composition. Additional water may also be added at this time. The molding composition is then formed into a sheet by passing the molding composition through at least one set of forming rollers heated to the thermal precipitation temperature of the cellulosic ether. The molding composition may be directly fed between the forming rollers by means of an extruding apparatus, preferably by means of a "wig wag" system. Alternatively, the extruder can have a sheet-forming die. The cellulosic ether prevents the starch binder in the sheet from adhering to the rollers as discussed above.

Thereafter, the green sheet is passed between starch gelation rollers, which are heated to at or above the gelation point of the starch. Some starches, such as potato starch, gelate at about 65° C., while others, such as corn starch, gelate at about 95° C. Waxy corn starch gelates at about 70° C. The sheet is then hardened to a significant degree in an accelerated manner by removing a substantial quantity of water by evaporation. The removal of the water may occur, at least in part, by means of the gelation rollers although there may be little difference between the rollers used to gelate the starch and those used to remove the water. Rollers hot enough to remove the water will also gelate the starch granules. The fibers within the dried sheet are substantially homogeneously dispersed as a reinforcing agent throughout the starch matrix.

In addition to the simple sheet forming process, the sheet can be optionally compacted while still in a green and at least partial moldable condition in order e.g., to eliminate unwanted air voids created when water is removed from the structural matrix by evaporation or to increase the adhesion between binder and fibers and increase surface smoothness. Compaction is carried out by passing the sheet between one or more sets of compaction rollers having a nap that is less than the sheet thickness.

The surface of the sheet can be improved by passing it between one or more pairs of finishing rollers consisting of a hard and soft roller. The soft roller has sufficient friction to grip to the sheet so that the tangential velocity of the sheet will be substantially the same as the sheet velocity. The "hard roller" is very smooth and rotates at a tangential velocity substantially greater than the sheet velocity such that it polishes the sheet surface. Other finishing rollers include textured rollers or corrugating rollers to texture or corrugate the sheet, respectively.

The sheets made according to the present invention have properties similar to those of paper, plastic, or thin-walled metals, and can be used immediately to form a variety of articles such as containers or other packaging materials. Alternatively, such sheets can be rolled onto large spools or cut into sheets and stacked on a pallet much like paper or paperboard and stored until needed. Thereafter, the stacked or rolled sheets may be cut and formed into the desired article of manufacture.

The sheets of the present invention may be optionally remoistened to make them more flexible and/or to give them self-adhesion qualities. Increased flexibility reduces the likelihood that the sheet will split or crack while being formed into the desired article. In addition, starch can behave as a thermoplastic. If the sheets of the present invention are heated to above the glass transition temperature of starch they can be molded into a desired shape. Upon cooling to below the glass transition temperature, the sheets will maintain whatever shape they are molded into. Thermally melting the starch within the sheets also makes the starch self-adhesive, which allows adhesion and sealing of the sheets if formed into a container, for example, such as by spiral winding. A combination of remoistening and thermoforming the sheets can advantageously be employed in order to increase the versatility of the sheets and the range of possible manufacturing procedures using the sheets.

The sheets of the present invention have high tensile strength, up to 100 MPa in some cases depending on the starch and fiber content. They can be printed on, coated, laminated, layered, crimped, creped, stretched, stamped, bent, folded, rolled, convoluted, spiral wound, pressed, folded, fluted, corrugated, and glued much like paper or paperboard to form a variety of articles. In some cases, it may be advantageous during the manufacturing process to score, score cut, corrugate, or perforate the sheet to aid in forming a bend or hinge at a predetermined location within the sheet.

The result of the present invention is the ability to mass produce a wide variety of different articles heretofore manufactured from paper, paperboard, plastic, polystyrene, or metal at a cost that is usually competitive with, and in most cases even lower than the costs involved in using these prior materials. The cost savings come not only from the reduced cost of the raw materials, but also from the manufacturing processes, which require less energy and lower initial capital investment. In particular, the compositions used to manufacture the sheets of the present invention require far less dewatering than in the manufacture of paper, as well as far lower expenditures in providing the necessary raw materials compared to the manufacture of plastics or metals.

Moreover, because the starch-bound sheets of the present invention comprise more environmentally friendly components, the manufacture of such sheets impacts the environment to a much lesser extent than does the manufacture of sheets from prior materials. The present sheets do not require the use of high concentrations of wood pulp, petroleum products, or other natural resources as does the manufacture of sheets or other articles from paper, plastic, or metals.

The starch and cellulosic ether components readily dissolve in water, which facilitates recycling or biodegradation. Used sheets or other articles can be readily comminuted in water and reused in the manufacture of similar articles. If discarded into the environment, the starch and cellulosic ether absorb water and quickly dissolve away, leaving behind a small quantity of individual fibers and varying amounts of natural mineral filler, which has a composition that is similar or identical to the earth. The dissolved starch and cellulosic ether and the dispersed fibers are readily broken down by microbial forces present in the soil.

From the foregoing, an object of the present invention is to provide compositions and methods for manufacturing low cost, environmentally friendly, starch-bound sheets having properties similar to those of paper, paperboard, polystyrene, plastic, or metal sheets.

A further object of the present invention is to provide starch-bound sheets that can be formed into a variety of containers and other articles using existing manufacturing equipment and techniques presently used to form such articles from paper, paperboard, plastic, polystyrene, or metal sheets.

Yet another object and feature of the present invention is the ability to manufacture starch-bound sheets from moldable mixtures which contain only a fraction of the water of typical slurries used to make paper and which do not require extensive dewatering during the sheet forming process.

Still a further object and feature is that such sheets, as well as containers or other articles made therefrom, are readily biodegradable and/or decomposable into substances commonly found in the earth.

Another feature of the present invention is to provide compositions and methods which allow for the manufacture of sheets, containers, and other articles therefrom at a cost that is comparable to or even lower than, the cost of existing methods for manufacturing paper, plastics or metal products.

Specifically, it is an object of the present invention that such compositions and methods reduce the energy requirements and initial capital investment costs for making products having the desired characteristics of paper, plastics or metals.

Still a further object and feature of the present invention is to provide compositions and methods that allow for the inclusion of relatively high amounts of starch within sheets while overcoming the problems associated with the adhesion of starch, particularly gelatinized starch, to the molding or sheet forming apparatus.

A further object and feature of the present invention is to provide compositions and methods which allow for the optional inclusion of significant quantities of natural inorganic mineral fillers within the aforementioned starch-bound sheets.

Finally, it is an object and feature of the present invention that such inorganically filled sheets have greater flexibility, tensile strength, toughness, moldability, and mass producibility compared to prior materials having a high content of inorganic filler.

These and other objects and features of the present invention will become more fully apparent from the following description and appended claims, or may be learned by the practice of the invention.

BRIEF DESCRIPTION OF THE DRAWINGS

In order to understand the manner in which the above-recited and other advantages and objects of the invention may be obtained, a more particular description of the invention briefly characterized above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which:

FIG. 2A is an enlarged perspective view with cutaway of an auger extruder with evacuation chamber and die head used in the system of FIG. 1A.

FIG. 2B shows a "wig wag" extruding system for feeding the molding composition between the forming rollers.

DETAILED DESCRIPTION OF THE INVENTION

Figure 1A:
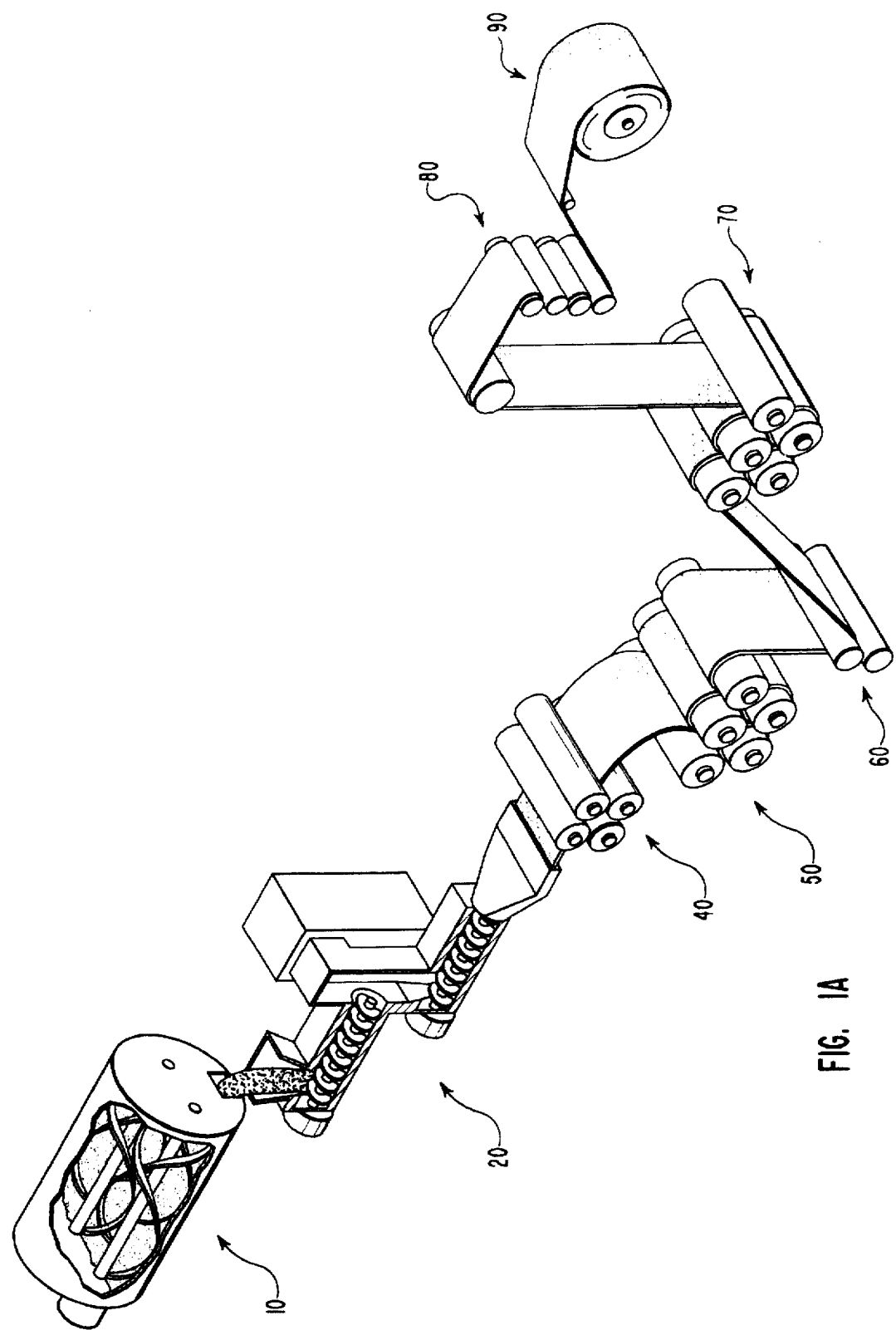
FIG. 1A is a schematic view of a preferred system for manufacturing starch-bound sheets wherein an extruded sheet is passed between reduction rollers.

The present invention is directed to compositions and methods for manufacturing starch-bound sheets that optionally include significant quantities of inorganic mineral fillers. The starch-bound sheets can be manufactured to have properties similar to those of paper, paperboard, or other sheet materials. Such sheets have superior strength qualities due to the incorporation of large quantities of starch as a binder, which also reduces their cost and makes them far more environmentally friendly compared to conventional three paper products. The starch is added to the sheets in the wet end as part of the molding composition used to make the sheets rather than being added as a sizing agent, as is done conventionally. The sheets also include substantially homogeneously dispersed fibers for reinforcement and added flexibility and toughness.

The starch-bound sheets of the present invention can generally be described as multi-component, multi-scale, fiber-reinforced, micro-composites. By carefully incorporating a variety of different materials capable of imparting discrete yet synergistically related properties, it is possible to create a unique class or range of micro-composites having remarkable properties of strength, toughness, environmental soundness, mass-producibility, and low cost.

The term "multi-component" refers to the fact that the compositions used to make the sheets typically include three or more chemically or physically distinct materials or phases, such as water, water-disposible cellulosic ethers, initially insoluble starch granules which later gelatinize during sheet formation, fibers, inorganic mineral fillers, and other admixtures. Each of these broad categories of materials imparts one or more unique properties to the final sheet made therefrom, as well as to the composition used to form the sheet. Within these broad categories it is possible to further include different components, such as two or more types of inorganic fillers or fibers, which can impart different yet complementary properties to the sheet. This allows for the specific engineering of desired properties within the sheet in conjunction with the manufacturing process.

The multi-component (and hence, multi-property) nature of the starch-bound sheets of the present invention is a significant departure from conventional materials such as plastic, polystyrene, paper, or metal, which are essentially single component systems. Thin sheets made from single component materials are generally limited to having the particular properties of the material from which they are made. For example, sheets that are brittle generally cannot be bent or folded without damaging the sheets, while sheets that are flexible often cannot support their own weight. In contrast, the multi-component nature of the materials of the present invention allows for the introduction of multiple properties within the sheets made therefrom.

The term "multi-scale" refers to fact that the compositions and materials of the present invention are definable at different levels or scales. Specifically, within the sheets of the present invention there is typically a macro-component composition in the range from about 10 nanometers to as high as about 10 mm, a micro-component composition in the range of about 1 micron to about 100 microns, and a submicron component. Although these levels may not be fractal, they are usually very similar to each other, and homogeneous and uniform within each level.

The term "fiber-reinforced" is self-explanatory, although the key term is "reinforced", which clearly distinguishes the sheets of the present invention from conventional paper or paper products. Conventional paper relies on "web" physics, or intertwining of fibers, to provide the structural matrix and mass, as well as the binding, of the paper. However, the binding matrix in the sheets of the present invention involves the interaction between the starch binder, fibers, and optional inorganic mineral filler components (and to some extent, the cellulosic ether). The fibers act primarily as a reinforcing component to specifically add tensile strength and flexibility but are not joined together by web physics to any substantial degree.

Finally, the term "micro-composite" refers to the fact that the sheet composition is not merely a compound or mixture but a designed matrix of specific, discrete materials on a micro-level, which are of different sizes, shapes, and chemical make-up. The materials are sufficiently well bound and interactive so that the unique properties of each are fully evidenced in the final composite (e.g., the tensile strength of the matrix has a direct correlation to the tensile strength of the fibers and starch binder).

In light of these definitions and principles, materials that include a starch binder, fibers (both organic and inorganic), and optionally an inorganic aggregate can be combined and molded into a variety of products, including sheets having properties similar to those of conventional paper or paperboard. The starch-bound sheets of the present invention can also substitute for sheets made from plastic, polystyrene, and even metal. The sheets can be cut and formed (such as by bending, folding or rolling) into a variety of containers and other articles of manufacture. The compositions and methods of the invention, including the sheets made therefrom, are particularly useful in the mass production of disposable containers and packaging, such as for the fast food industry.

I. General Discussion

A. Conventional Paper Products

"Paper" is the general term for a wide range of matted or felted webs of vegetable fiber (mostly wood) that have been formed on a screen from a water suspension. The sheet products which most people refer to as "paper" or "paperboard" are generally "tree paper" because they are manufactured from wood pulp derived from trees. Although tree paper may include inorganic fillers or extenders, starches, or other minor components, it will typically contain a relatively high wood fiber content, generally from about 80% to as high as 98% by volume of the paper sheet. This is because the fibers must always have concentrations high enough that they bind together by web physics.

In order to obtain the well-known properties that are typical of paper, substitute fibrous substrates have been added instead of wood derived fibers. These include a variety of plant fibers (known as "secondary fibers"), such as straw, flax, abaca, hemp, and bagasse. The resultant paper is often referred to as "plant paper." The broad category of cellulose-based paper, mainly plant, vegetable, or tree paper, will hereinafter collectively be referred to as "conventional paper."

In the manufacture of conventional paper, either a Kraft or a sulfite process is typically used to form the pulp sheet. In the Kraft process, the pulp fibers are "cooked" in a NaOH process to break up the fibers. In a sulfite process, acid is used in the fiber disintegration process. In both of these processes, the fibers are first processed in order to release lignins locked within the fiber walls. However, when the lignins are removed from the fiber, much of the strength of the fiber is lost. Because the sulfite process is even more severe, the strength of the paper made by a sulfite process will generally have only about 70% of the strength of paper made by the Kraft process.

Once the wood has been made into wood pulp by either a Kraft or a sulfite process, it is further processed in a beater in order to further release lignins and hemicellulose within the fibers and also to fray the fibers. The resultant slurry, which generally contains about 99.5% water and only about 0.5% wood pulp, is subjected to heavy beating in order to release enough hemicellulose and fray the fibers sufficiently to form a fibrous mixture that is essentially self-binding through an intertwining web effect between the fibers, including hydrogen bonding. However, the cost of such harsh treatment is that the fibers develop major flaws along the entire length of the fiber, thereby resulting in a loss of much of their tensile, tear, and burst strengths. Because the manufacture of paper necessarily relies on web physics to obtain the necessary binding and structural integrity required for the paper sheet, a relatively high percentage of fibers (usually at least 80% or more) must be added to the paper sheet.

The highly aqueous slurry, or furnish, is then substantially dewatered by first placing the slurry on a porous screen or wire sieve and then "squeezing" out the water using a roller nip. This first dewatering process results in a sheet having a water content of about 50–60%. At no point in the manufacture of conventional paper is the fibrous slurry or furnish in a "moldable" condition such that it can be molded as in the present invention. After initial dewatering, the partially dried paper sheet is further dried by heating the sheet, often by means of heated rollers. Because of the paper manufacturing process, as well as the limitations imposed by web physics, there has been an upper limit on the amount of inorganic aggregate fillers than can be impregnated within a conventional paper sheet.

In sharp contrast, the present invention does not rely on web physics to bind the components of the starch-bound sheets together. Rather, the binding force of the starch component, and to some degree the cellulosic ether component, provide the majority of the tensile and flexural strengths of the sheets. The starch binder interacts with itself as the binding matrix, as well as with the fibers and other solid components to some extent.

The result is the ability to include far less fiber within the sheets while maintaining the beneficial effects of tensile strength, tear and burst strength, and flexibility imparted by the fibers. Employing less fiber while maintaining good strength properties allows a more economically produced sheet, container, or other article (as compared to paper) because (1) fibers are more expensive than the inorganic filler and even the starch binder, (2) the capital investment for the processing equipment is much less, and (3) minimizing the fiber content also reduces the amount of pollutants associated with manufacture of fibers into the environment.

The sheets of the present invention have properties similar to those of tree or vegetable paper, such as tensile, flexural, and cohesive strengths, even though only about to ⅓ as much fiber is used in the present invention. This is due in part to the fact that the fibers used in the present invention undergo far less processing than fibers used to make paper. It is also due to the inclusion of relatively large quantities of starch as a binder and structural component.

Besides the optional inclusion of much higher concentrations of inorganic aggregate fillers, the present invention differs from conventional paper manufacturing processes in a number of ways. First, far less water is used in the moldable mixtures (usually less than about 50% by weight) of the present invention compared to conventional paper slurries, which typically contain water in an amount of at least 97% by weight, and even as much as 99.9% water. More importantly, the sheets of the present invention are formed from a highly cohesive, yet moldable mixture rather than an aqueous slurry, such that once placed into a shape it will generally maintain its shape unless further molded or acted upon.

B. Sheets, Containers, and Other Articles

The term "sheet" as used in this specification and the appended claims is intended to include any substantially flat, corrugated, curved, bent, or textured sheet made using the compositions and methods described herein. The only essential compositional limitation is that the binding matrix comprises starch formed by gelatinizing starch granules during the sheet-making process. The starch-bound sheets may include organic coatings, printing, other sheets laminated thereto, etc.

The sheets within the scope of the present invention can have greatly varying thickness depending on the particular application for which the sheet is intended. The sheets can be as thin as about 0.01 mm and as thick as 1 cm or greater where strength, durability, and or bulk are important considerations.

The term "container" as used in this specification and the appended claims is intended to include any article, receptacle, or vessel utilized for storing, dispensing, packaging, portioning, or shipping various types of products or objects (including, but not limited to, food and beverage products). Specific examples of such containers are set forth in detail below and include, among others, boxes, cups, "clam shells," jars, bottles, plates, bowls, trays, cartons, cases, crates, cereal boxes, frozen food boxes, milk cartons, carriers for beverage containers, dishes, egg cartons, lids, straws, envelopes, or other types of holders.

In addition to integrally formed containers, containment products used in conjunction with containers are also intended to be included within the term "container." Such articles include, for example, lids, liners, partitions, wrappers, cushioning materials, utensils, and any other product used in packaging, storing, shipping, portioning, serving, or dispensing an object within a container.

In addition to sheets and containers, any articles that can be formed using the starch-bound sheets described herein are also within the scope of the present invention. These include such disparate articles as, for example, model airplanes, book covers, game boards, toys, venetian blinds, mailing tubes, shirt packaging forms, table placemats, and temporary car window shades.

The phrases "mass producible" or manufactured in a "commercial" or "economic" manner are intended in the specification and the appended claims to refer to a capability of the sheets described herein to be rapidly produced at a rate that make their manufacture economically comparable to sheets made from other materials, such as paper, paperboard, polystyrene, or metal. The present invention is directed to innovative compositions which solve the prior art problems of incorporating a high percentage of starch within mass-produced sheets manufactured using heated forming rollers.

The term "solids" or "total solids" is intended to include any admixture that is a solid before being mixed with water. This includes fibers, inorganic fillers, starch, cellulosic ethers, etc.

An advantage of the starch-bound sheets of the present invention (as well as containers, printed materials, or other articles made therefrom) is that their disposal impacts the environment far less than paper, paperboard, plastic, polystyrene, glass, or metal products. The sheets and articles of the present invention are both readily recyclable and, even if not recycled, will readily degrade and decompose when exposed to moisture, pressure, and other environmental forces into components that are complementary to the components of the earth. The starch and cellulosic ether components dissolve slowly in water and then are quickly degraded by microbial action. The fibers are also quickly degraded and are included in far lesser amounts to begin with compared to paper. The inorganic filler is inert and is compatible with earth in any event.

In contrast, a polystyrene, plastic, or metal cup or can thrown into a lake or stream will last for decades, perhaps even centuries. Even paper or cardboard articles can persist for months, even years if conditions for decomposition are not perfect. By contrast, sheets or containers or other articles made from the sheets of the present invention will decompose quickly, in a matter of hours or days depending on the amount of moisture present.

C. Molding Compositions

The terms "molding composition," "moldable mixture," or "starch-based mixture" have interchangeable meanings and shall refer to a starch-filled mixture that can be molded into the sheets which are disclosed and claimed herein. Such mixtures are characterized by having a significant quantity of ungelatinized starch granules, a lesser quantity of a cellulosic ether, varying quantities of fibers and mineral fillers, and water to form a mixture having a moldable, plastic-like consistency. As used in the specification and the appended claims, the term "total solids" will include all solids, whether they are suspended or dissolved within the aqueous phase of the mixture. The moldable mixture may also include other admixtures such as plasticizers, lubricants, dispersants, hydraulically settable materials, and void forming agents.

The moldable mixtures are characterized by having a relatively high yield stress, which makes them highly workable and cohesive, yet form stable immediately or shortly after being molded into the desired shape. The terms "molding composition," "moldable mixture," or "starch-based mixture" shall refer to the mixture regardless of the extent of drying that has taken place. Such mixtures shall include mixtures that are highly workable, those which are partially dried, and those which have been completely dried (although a certain amount of water will usually remain within the sheets as bound water within the starch binder).

After the molding composition has been formed into a sheet, heated to gelatinize the starch granules, and at least partially dried, the sheet or article made therefrom will have a "starch-bound structural matrix" or an "inorganically filled starch-bound matrix."

D. Organic Polymer Binders

The molding compositions used to manufacture the starch-bound sheets and other articles of the present invention develop strength properties through the drying out of a substantially solvated water-dispersible organic polymer binder, predominantly the starch binder. The molding compositions first develop workability and flow properties by adding an amount of water to the mixture sufficient to form a mixture having plastic-like properties. Thereafter, the water-dispersible organic binder will develop its maximum strength properties through the removal of water by evaporation. The organic binder affects the rheology of the moldable mixture, particularly the cellulosic ether, which dissolves or gelates in the presence of cold water.

The water-dispersible organic polymer binders contemplated by the present invention can be generally organized into the following categories: (1) starches, generally unmodified starch granules; (2) cellulosic ethers which have a thermal precipitation and film-forming capabilities, and (3) other organic thickeners and/or binders which are compatible with starches and cellulosic ethers, such as polysaccharides, proteins, and synthetic organic materials.

1. Starch

The sheets of the present invention develop most of their strength through the gelation of the starch-based binder in water followed by the evaporative removal of the water. Starch is a natural carbohydrate chain comprising polymerized glucose molecules that are found in nature in the form of granules. Starch granules include two different types of glucose chains: unbranched, single-chained amylose and branched multi-chained amylopectin.

In general, starch granules are insoluble in cold water; however, if the outer membrane of the granules has been broken by, e.g., grinding, the granules can swell in cold water to form a gel. When the intact granules are exposed to warm water, the granules swell and a portion of the soluble starch (amylose) diffuses through the granule wall to form a paste. In hot water, the granules swell to such an extent that they burst, resulting in gelation of the mixture. The exact temperature at which a starch-based binder swells and gelates depends on the type of starch.

Gelation is a result of the linear amylose polymers, which are initially compressed within the granules, stretching out and intertwining with each other and with the amylopectin chains. After the water is removed, the resulting mesh of inter-connected polymer chains forms a solid material that can have a tensile strength up to about 40–50 MPa. The fiber-reinforced, starch-bound sheets can have varying tensile strengths of up to about 100 MPa, depending on the types and concentrations of starch and fibers within the sheets.

Although starch is produced in many plants, the most important sources are seeds of cereal grains, such as corn, waxy corn, wheat, sorghum, rice, and waxy rice, which can also be used in the flour and cracked state. Other sources of starch include tubers such as potatoes, roots such as tapioca (i.e., cassava and manioc), sweet potato, and arrowroot, and the pith of the sago palm. Potato starch and waxy corn starch are presently preferred starches.

Different native starches have significantly varying gelation temperatures. For example, potato starch typically has a gelation temperature of about 65° C.; corn starch has a gelation temperature of about 95° C.; waxy corn starch has a gelation temperature of about 70° C. Any unmodified starch can work within the present invention. In general, however, adhesion of the newly formed sheets will be greatly reduced as long as the type of starch that is used has a gelation temperature that is higher than the thermal precipitation temperature of the cellulosic ether being employed in the same molding composition. This allows for the use of a forming roller that has a temperature at or above the thermal precipitation temperature of the cellulosic ether, but that is below the gelation temperature of the starch. This in turn allows for the advantageous creation of the cellulosic ether skin on the surface of the newly formed green sheet due to the thermal precipitation of the cellulosic ether and the partial drying of the surface of the sheet as it passes between the forming rollers.

Unmodified starch-based binders are generally preferred over modified starch-based binders because unmodified starches are significantly less expensive. More importantly, unmodified starches will not become gelatinized until the point in the sheet-making process in which the sheet is heated to the gelation point of the starch. Modified starches or starches which gelatinize before the formation of the nonstick film by drying out the cellulosic ether can cause the green sheet to adhere to the forming rollers.

A pure starch composition can absorb ambient moisture from the air such that, at equilibrium, the water is generally present in an amount of about 10–12% by weight of the composition. When inorganic aggregates and fibers are included in the starch composition, such as in the present invention, the water will be present in an amount of about 3–6% by weight of the total composition at equilibrium because of less total starch in the composition. The final water content in a formed product is from about 10 to 15% by weight of the starch.

The concentration of starch-based binder in the moldable mixtures of the present invention is in a range from about 5% to about 90% by weight of total solids, preferably from about 15% to about 75% by weight, and more preferably from about 30% to about 60% by weight.

2. Cellulosic Ethers

The cellulosic ethers used in the present invention are included in much smaller amounts within the moldable mixture compared to the starch binder. While the cellulosic ether has been used alone without the starch binder in forming inorganically filled sheets, the cost of using only the cellulosic ether as the binder is much higher than when starch is the primary binder. Thus, it is more economically feasible to use a high starch content with a relatively low amount of cellulosic ether to prevent sticking. The result is a higher quality sheet having greater flexibility and tensile strength. Any cellulosic ether having thermal precipitation properties may be used.

Suitable cellulosic ethers include, for example, methylhydroxyethylcellulose, hydroxymethylethylcellulose, carboxymethylcellulose, methylcellulose, ethylcellulose, hydroxyethylcellulose, hydroxyethylpropylcellulose, and the like, as well as mixtures or derivatives thereof. The entire range of possible permutations is enormous and shall not be listed here, but other cellulosic ethers which have thermal precipitation properties can also be used.

A preferred cellulosic ether is Methocel® (available from Dow Chemical), a methylcellulose product. Methocel has a thermal precipitation temperature of about 70° C. Another preferred cellulosic ether is Tylose® FL 15002, which has a thermal precipitation temperature of about 85° C. A mixture of cellulosic ethers having varying properties and thermal precipitation temperatures may be employed. One of ordinary skill in the art will know how to select a cellulosic ether that has a thermal precipitation temperature that is lower than the gelation temperature of the starch granules in order to reduce adhesion between the rollers and the green sheet during the sheet-forming process.

Some cellulose-based binders can also be crosspolymerized in solution; an example of this is Cellosize®, a hydroxyethylcellulose product available from Union Carbide. Cellosize® can be cross-linked in water with dialdehydes, methylol ureas, or melamine-formaldehyde resins, thereby forming a less water-soluble binder.

The cellulosic ethers used in the moldable mixtures of the present invention are preferably included in a range from about 0.5% to about 10% by weight of total solids, preferably in a range from about 1% to about 5% by weight, and most preferably from about 2% to about 4% by weight.

3. Other Organic Binders

Although starch-binders and cellulosic ether binders are preferred in the composition of the present invention, other organic binder materials can also be used in addition. For example, other polysaccharide-based binders that can be used include alginic acid, phycocolloids, agar, gum arabic, guar gum, locust bean gum, gum karaya, and gum tragacanth, and mixtures or derivatives thereof. Suitable protein-based binders include, for example, Zein® (a prolamine derived from corn), collagen (extracted from animal connective tissue and bones) and derivatives thereof such as gelatin and glue, casein (the principle protein in cow milk), and mixtures or derivatives thereof.

Synthetic organic binders that are water dispersable can be used and include, for example, polyvinyl pyrrolidone, polyethylene glycol, polyvinyl alcohol, polyvinylmethyl ether, polyacrylic acids, polyacrylic acid salts, polyvinyl acrylic acids, polyvinyl acrylic acid salts, polyacrylimides, ethylene oxide polymers, polylactic acid, latex (which is a broad category that includes a variety of polymerizable substances formed in a water emulsion, an example of which is styrene-butadiene copolymer), and mixtures or derivatives thereof.

The total organic binder content in a hardened sheet will preferably be in a range from about 6% to about 90% by weight of total solids in the hardened sheet, more preferably in a range from about 20% to about 80% by weight, and most preferably in a range from about 30% to about 60% by weight.

4. Characteristics of Organic Binder During Sheet Formation

While it has been recognized by the present inventors that cellulosic ethers (e.g., Methocel) provide optimal performance when making sheets using extrusion and roller processes, cellulosic ethers have the disadvantage of being very expensive compared to the other components used to make the sheets. Starch is a good binder and much less costly than cellulosic ethers, but has the disadvantage of being very sticky or tacky when used as the sole organic binder in sheet forming processes, often causing the sheets to adhere to stick to the rollers, which makes mass production of sheets problematic.

The present invention provides for the use of starch in place of a large amount of cellulosic ether. This combination of small amount of cellulosic ether with a starch binder provides the advantages of substantially reducing the cost of making the sheets, while preventing the starch from sticking to the rollers during the sheet forming process. In addition, including relatively large amounts of starch results in sheets which are stronger and less brittle than sheets that include a high amount of cellulosic ether binders.

In a preferred sheet forming process of the present invention, unmodified ungelatinized starch granules are added to the moldable mixture prior to heating during the sheet forming process discussed in greater detail below. The moldable mixture is passed between a set of heated rollers which are heated to cause thermal precipitation of the cellulosic ether (which is about 70° C. for Methocel), which causes it to precipitate to form a non-sticky skin on the surface of the formed sheet. The starch granules are encapsulated by the precipitated cellulosic ether film binder at the surface of the sheet, thereby preventing the starch binder from sticking to the rollers upon gelation of the starch granules. The cellulosic ether thus acts as a film binder in the formed sheet. As the starch within the interior of the sheet becomes gelatinized and then dried through the evaporative removal of water, it becomes the primary binder that binds together the other solid components within the structural matrix of the sheet.

In mixing together the components of the moldable mixture it is important that the starch-based binder not be subjected to shearing forces large enough to break or rupture the unmodified starch granules. This might cause premature gelation and adhesion of the mixture to the rollers. It is also important to maintain the mixture at a temperature below the gelation temperature of the starch-based binder for the same reason. Preferred starch-based binders include unmodified starches that gelate at a temperature at or above the thermal precipitation temperature of the cellulosic ether to allow formation of the cellulosic ether skin at the sheet surface prior to gelatinization of the starch granules.

E. Water

Water is added to the moldable mixture in order to dissolve, or at least disperse, the organic binder within the mixture. Water also helps to disperse the other solid components, such as fibers and inorganic fillers, throughout the moldable mixture. As such the water serves the function of creating a moldable mixture having the desired rheological properties, including viscosity and yield stress.

In order for the moldable mixture to have adequate workability, water must generally be included in quantities sufficient to wet each of the inorganic aggregate particles, fibers, or other solid particles, to solvate or at least disperse the organic binder, and to at least partially fill the interstices or voids between the particles. In some cases, such as where a dispersant or a lubricant is added, adequate workability can be maintained while using less water initially.

The amount of water that is added to the moldable mixture should be carefully balanced so that the mixture is sufficiently workable, while at the same time recognizing that lowering the initial water content decreases the amount of water that must be removed to form a hardened sheet. The appropriate rheology to meet these needs can be defined in terms of yield stress. The yield stress of the moldable mixture will preferably be in a range from about 2 kPa to about 5 MPa, more preferably in a range from about 100 kPa to about 1 MPa, and most preferably in a range from about 200 kPa to about 700 kPa. The desired level of yield stress can be adjusted and optimized to the particular process being used to form the sheet.

In some cases it may be desirable to initially include a relatively high amount of water since excess water can be removed by evaporation. Nonetheless, one of the important features of the present invention as compared to the manufacture of conventional paper is that the amount of water initially within the moldable mixture will be far less than the amount normally found in fibrous slurries used to make conventional paper. This results in a mixture having far greater yield stress and form stability compared to papermaking slurries. The total amount of water that must be removed from the moldable mixture to obtain a self-supporting and coherent material (i.e., a form stable material) is much less in the case of the mixtures of the present invention compared to the slurries used to manufacture conventional paper. Moreover, the intermediate green sheets of the present invention have far greater internal cohesiveness and coherence compared to wet-laid fibrous slurries.

The amount of water that should be added to the mixture will depend to a large extent on the quantity of starch or other water-absorbing components, fibers, inorganic fillers and the particle packing density of the fillers. It will also depend on the desired rheology of the moldable mixture. The amount of water that will be added to form the moldable mixtures of the present invention will be in a range from about 5% to about 80% by weight of the moldable mixture, more preferably in a range from about 10% to about 70% by weight, and most preferably in a range from about 20% to about 50% by weight. One skilled in the art will be able to adjust the level of water to obtain adequate workability for any given manufacturing process.

It will be preferable in most cases to include the minimum amount of water necessary to give the moldable mixture the desired level of workability, thereby reducing the amount of water that must be removed from the processed sheet. Decreasing the amount of water that must be removed generally reduces the cost of manufacture, since removing water by evaporation requires energy input.

F. Inorganic Fillers

Inorganic materials commonly used in the paper industry, as well as finely ground aggregate materials used in the concrete industry, may optionally be used in the moldable mixtures of the present invention. Nevertheless, the size of the aggregate or inorganic filler materials will often be many times larger than inorganic filler materials used in the paper industry. While the average diameter of the particles within the inorganic fillers used in the paper industry will usually be less than 2 microns, the average particle diameter of the aggregate materials used in the present invention can, in some cases, be up to 100 microns or larger depending on the wall thickness of the resulting sheet and, hence, be less expensive in general and have a lower specific surface area.

The inorganic filler materials used in the paper industry are generally more uniformly sized compared to fillers used in the present invention. It is often generally preferable to use a wide range of filler particle sizes in the present invention in order to increase the natural particle-packing density of the filler within the mixture. Using particles of generally larger and varying size results in a further reduction of cost of the inorganic filler component compared to inorganic filler materials used in the paper industry. It is far more expensive to maintain the extremely small particle size tolerances required in the paper industry, as well as maintain a general uniformity of particle size.

The greatly increased range of particle sizes also allows for a much larger variety of inorganic aggregate materials to be used in the present invention compared to the manufacture of conventional paper. Hence, the aggregate materials of the present invention may be selected to impart a much larger variety of properties to the final sheet. In addition, particle packed aggregate fillers provide for a more moldable mixture compared to typical slurries used to make conventional paper. Compared to conventional paper, far more inorganic aggregate may optionally be incorporated into the materials of the present invention since an organic binder rather than web physics holds the sheet together.

Examples of useful aggregates include perlite, vermiculite, sand, gravel, rock, limestone, sandstone, glass beads, aerogels, xerogels, seagel, mica, clay, synthetic clay, alumina, silica, fly ash, fumed silica, fused silica, tabular alumina, kaolin, microspheres, hollow glass spheres, porous ceramic spheres, gypsum, gypsum dihydrate, calcium carbonate, calcium aluminate, cork, seeds, lightweight polymers, xonotlite (a crystalline calcium silicate gel), lightweight expanded clays, hydrated or unhydrated hydraulic cement particles, waste concrete products, pumice, exfoliated rock, and other geologic materials. Partially hydrated and hydrated cement, as well as silica fume, have a high surface area and give excellent benefits such as high initial cohesiveness of the newly formed sheet.

Different inorganic aggregates will impart their own unique surface characteristics to the sheet and may be chosen accordingly. For example, kaolin gives a smoother, less porous finish, while plate-like materials such as mica and other clays yield a shiny surface. Typically, larger aggregates such as calcium carbonate produce a matte surface, while smaller particles produce a glass-like surface. The advantage of the present invention over the manufacture of conventional paper is that any of these aggregate materials may be added directly into the matrix.

A preferred aggregate material for use in the present invention is calcium carbonate. A dry-milled calcium carbonate is particularly preferred since it can be obtained at one-third the cost of calcium carbonate obtained through wet-milling. A preferred calcium carbonate is R040, which has a particle size range from about 10 to 150 microns, with an average particle size of about 42 microns, and a low specific surface area.

Both clay and gypsum are particularly useful aggregate materials because of their ready availability, extreme low cost, workability, ease of formation, and because they can also provide a degree of binding, cohesiveness and strength if added in high enough amounts. Gypsum hemihydrate is hydratable and forms the dihydrate of calcium sulfate in the presence of water, which is a class of hydraulically settable binder. Upon hydrating, gypsum hardens into a rigid structure depending on its concentration, thereby imparting delayed additional binding strength to the final product.

Hydraulic cement, such as portland cement, can be added as an inorganic filler material within the moldable mixtures of the present invention. Hydraulic cements are relatively inexpensive and plentiful, and can impart a degree of binding to the starch-bound matrix if included in high enough amounts. In addition, hydraulic cement chemically reacts with water, thereby causing an internal drying effect within the moldable mixture which effectively removes at least some of the water within the mixture without the need for evaporation. The same is true for gypsum hemihydrate and calcined clay. Prehydrated cement particles may also be added as an aggregate filler.

Because of the nature of the moldable mixtures and sheets made therefrom, it is possible to include lightweight aggregates having a high amount of interstitial space in order to impart an insulation effect with the molded sheets. Examples of aggregates that can add lightweight and insulating characteristics to the sheets include perlite, vermiculite, glass beads, hollow glass spheres, synthetic materials (e.g., porous ceramic spheres, tabular alumina, etc.), cork, and lightweight expanded clays, sand, gravel, rock, limestone, sandstone, pumice, and other geological materials.

In addition to conventional aggregates used in the paper and cement industries, a wide variety of other aggregates may be added to the moldable mixtures within the scope of the present invention, including strengtheners such as metals and metal alloys (e.g., stainless steel, iron, and copper), balls or hollow spherical materials (such as glass, polymeric, and metals), filings, pellets, and powders (such as microsilica). Even materials such as seeds, gelatins, and agar-type materials can be incorporated as aggregates. Although these latter aggregates are organic and readily biodegradable, they are included here because they act primarily as a filler not a binder.

Another class of aggregates that may be added to the molding composition includes inorganic gels and microgels such as silica gel, calcium silicate gel, aluminum silicate gel, and the like. These can be added in solid form or may be precipitated in situ. Since gels and microgels tend to absorb water, they can be added to reduce the water content of the moldable mixture, thereby increasing the yield stress of the mixture. In addition, the highly hygroscopic nature of silica-based gels and microgels allows them to be used as moisture regulation agents within the final hardened sheet. By absorbing moisture from the air, the gels and microgels will cause the sheets to retain a predetermined amount of moisture under normal ambient conditions. Of course, the rate of moisture absorption from the air will correlate with the relative humidity of the air. Controlling the moisture content of the sheets allows for more careful control of the elongation, modulus of elasticity, bendability, foldability, flexibility, and ductility of the sheets.

It is also within the scope of the present invention to include polymerizable inorganic aggregate materials, such as polymerizable silicates, within the moldable mixture. These may be added to the mixture as ordinary silica or silicates, which are then treated to cause a polymerization reaction in situ in order to create the polymerized silicate aggregate. Polymerized inorganic aggregates are often advantageous in certain applications because of their increased flexibility compared to most other inorganic aggregate materials.

It is generally preferable according to the present invention to include a plurality of differently sized and graded aggregates capable of more completely filling the interstices between the aggregate particles and fibers within the moldable mixture. Optimizing the particle packing density reduces the amount of water that is required to obtain the desired level of workability by eliminating spaces which would otherwise be filled with interstitial water, often referred to as "capillary water."

In order to optimize the packing density, differently sized aggregates with particle sizes ranging from as small as about 0.05 microns to as large as about 2 mm may be used. The desired purpose and thickness of the resulting product will dictate the appropriate particle sizes of the various aggregates to be used. It is within the skill of one in the art to know generally the identity and sizes of the aggregates to be used in order to achieve the desired rheological properties of the green moldable mixtures, as well as the final strength and weight properties of the final hardened sheet or article.

In certain preferred embodiments of the present invention, it may be desirable to maximize the amount of the aggregates within the moldable mixture in order to maximize the properties and characteristics of the aggregates (such as qualities of strength, low density, or high insulation). The use of particle packing techniques may be employed within the molding composition in order to maximize the amount of such aggregates.

A detailed discussion of particle packing can be found in the following article coauthored by one of the inventors of the present invention: Johansen, V. & Andersen, P. J., "Particle Packing and Concrete Properties," *Materials Science of Concrete II* at 111-147, The American Ceramic Society (1991). Further information is available in the Doctoral Dissertation of Andersen, P. J., "Control and Monitoring of Concrete Production—A Study of Particle Packing and Rheology," The Danish Academy of Technical Sciences. For purposes of disclosure, the foregoing article and doctoral dissertation are incorporated herein by specific reference.

In embodiments in which it is desirable to obtain a sheet (or object made therefrom) having high insulation capability, it may be preferable to incorporate into the starch-bound matrix a lightweight aggregate which has a low thermal conductivity, or "k-factor" (defined as W/m·K). Generally, aggregates having a very low k-factor also contain large amounts of trapped interstitial space, air, mixtures of gases, or a partial vacuum which also tends to greatly reduce the strength of such aggregates. Therefore, concerns for insulation and strength tend to compete and should be carefully balanced when designing a particular mix design.

In light of the foregoing, the amount of aggregate added to the moldable mixture of the invention will depend on a variety of factors, including the quantity and identities of the other added components, as well as the particle packing density of the aggregates themselves. Accordingly, the concentration of aggregate within the sheets of the present invention will preferably be in a range from 0% to about 90% by weight of total solids, more preferably in a range from about 20% to about 80% by weight, and most preferably from about 30% to about 70% by weight.

G. Fibers

A wide range of fibers can be used in the present invention with good results. As used in the specification and the appended claims, the terms "fibers" and "fibrous material" include both inorganic fibers and organic fibers. Fibers may be added to the moldable mixture to increase the flexibility, ductility, bendability, cohesion, elongation ability, deflection ability, toughness, and fracture energy, as well as the flexural and tensile strengths of the resulting sheets and articles. Fibrous materials reduce the likelihood that the starch-bound sheets or articles made therefrom will shatter when cross-sectional forces are applied.

Fibers that may be incorporated into the starch-bound matrix of the sheets or articles include naturally occurring organic fibers, such as cellulosic fibers extracted from hemp, cotton, plant leaves, wood, or stems. Any abundant fiber that can be planted and harvested in an agribusiness setting can be utilized in the invention. The use of such fibrous materials would have the additional beneficial effect of preserving our dwindling forests. In addition, inorganic fibers made from glass, graphite, silica, ceramic, or metal materials may also be used.

Fibers such as cotton, wood fibers (both hardwood or softwood fibers, examples of which include southern hardwood and southern pine, respectively), flax, abaca, hemp, and bagasse are preferred because they readily decompose under normal conditions. However, other fibers such as glass fibers may be preferred depending on the intended use and performance criteria of the sheet or article. Even recycled paper fibers can be used, which are extremely inexpensive and plentiful.

The fibers used in making the sheets and other articles of the present invention preferably have a high length to width ratio (or "aspect ratio") because longer, narrower fibers can impart more strength to the starch-bound matrix without significantly adding bulk and mass to the matrix. The fibers should have an aspect ratio of at least about 10:1, more preferably at least about 100:1.

The amount of fibers added to the moldable mixtures of the invention will vary depending upon the desired properties of the final product, with tensile strength, toughness, flexibility, and cost being the principle criteria for determining the amount of fiber to be added in any mix design. Accordingly, the concentration of fibers within the sheets of the present invention will be in a range from about 3% to about 40% by weight of total solids, preferably in a range from about 5% to about 30% by weight, and more preferably from about 7% to about 20% by weight.

It will be appreciated that the strength of the fiber is a very important feature in determining the amount of the fiber to be used. The greater the tensile strength of the fiber, the less fiber that must be used to obtain a given tensile strength in the resulting product. While some fibers have a high tensile, tear, and burst strength, other types of fibers with a lower tensile strength may be more elastic. Including a relatively high concentration of fibers is particularly useful where a sheet has been scored and is expected to bend over a larger angle.

Fibers with a smaller aspect ratio are more easily placed within the sheet and yield a sheet with more uniformity and fewer defects, while a larger aspect ratio increases the strength-imparting effect of the fibers. Some fibers, such as southern pine and abaca, have high tear and burst strengths, while others, such as cotton, have lower strength but greater flexibility. In the case where better placement, higher flexibility, and higher tear and burst strength are desired, a combination of fibers having varying aspect ratios and strength properties can be added to the mixture. For example, a mixture of southern hard wood and southern pine allows for better dispersion of the fibers throughout the moldable mixture, yielding a sheet with good fiber dispersion and excellent folding endurance. In any event, the fibers used in the present invention preferably do not undergo the intense processing of fibers used to make conventional paper and thus maintain far more of their original strength. They also require less chemical processing.

Better water resistance can be obtained by treating the fibers with rosin and alum ($Al_2(SO_4)_3$) or $NaAl(SO_4)_2$), which precipitates out the rosin onto the fiber surface, making the surface highly hydrophobic. The aluminum floc that is formed by the alum creates an anionic adsorption site on the fiber surface for a positively charged organic binder such as a cationic starch.

H. Dispersants

The term "dispersant" is used herein to refer to the class of materials which can be added to reduce the viscosity and yield stress of the moldable mixture. Dispersants act to decrease the viscosity of the mixture by dispersing the individual inorganic aggregate particles or fibers. This allows for the use of less water while maintaining adequate levels of workability. Dispersants act in an opposite manner compared to the organic binders, which bind the solid components together, even while in a wet state.

Dispersants generally work by being adsorbed onto the surface of the aggregate particles and/or into the near colloid double layer of the particles. This creates a negative charge on or around the surfaces of the particles, causing them to repel each other, which prevents the particles from agglomerating. This repulsion of the particles adds "lubrication" by reducing the friction or attractive forces that would otherwise cause the particles to have greater interaction. This increases the packing density of the material somewhat and allows for the addition of less water while maintaining the workability of the moldable mixture. Dispersants should be added before the addition of the cellulosic ether.

A more detailed description of the use of dispersants may be found in the Master's Thesis of Andersen, P. J., "Effects of Organic Superplasticizing Admixtures and their Components on Zeta Potential and Related Properties of Cement Materials" (The Pennsylvania State University Materials Research Laboratory, 1987). For purposes of disclosure, the foregoing Master's Thesis is incorporated herein by specific reference.

A preferred dispersant is sulfonated naphthalene-formaldehyde condensate, an example of which is marketed under the trademark WRDA 19, which is available from W. R. Grace, Inc. Other dispersants which can also be used include sulfonated melamine-formaldehyde condensate, lignosulfonate, and polyacrylic acid.

The amount of added dispersant will generally range up to about 5% by weight of the water in the moldable mixture, preferably in a range from about 0.5% to about 4% by weight, and most preferably from about 1% to about 2% by weight.

I. Other Admixtures

A variety of other components can be optionally added to the moldable mixture to impart desired properties to the final sheets and articles. Flexibility can be increased by adding plasticizers to the moldable mixture. Plasticizers include materials that can be absorbed by the starch-based binder to soften the structural matrix of the formed sheet or article. Such plasticizers, which also act as lubricants, have a sufficiently high vapor point to not be vaporized from the matrix during the forming process, and preferably remain stable after the sheet or article is formed.

Suitable plasticizers for use in the present invention include polyethylene glycol (below a molecular weight of 600), glycerin, and sorbitol, which tend to take the place of water and function as plasticizers with moisture as low as 5%. Preferred plasticizers will not vaporize during the forming process but remain within the formed sheets and articles in order to soften the starch-bound matrix.

Glycerin, which has been found to be removed with the water during the water-removal process, can alternatively be applied to the sheets as a post-sheet-forming treatment process in order to introduce increased flexibility to the sheets and act as a humectant. The glycerin treatment also tends to stabilize the sheets so that they are more resistant to warping if exposed to small amounts of water, such as when applying a water-borne coating to the sheets.

Cross-linking admixtures such as dialdehydes, methylureas, and melamine formaldehyde resins can be added to the mixture to produce a less water soluble starch-bound matrix. The cross-linking admixtures bind to the hydroxyl ions of the starch-based binder, which slows down the water reabsorption rate of the starch-based binder. As a result, the final articles obtain form stability at a faster rate, have higher strength, and are able to retain liquids longer before failure (e.g., a cup can hold water longer before it starts to leak).

J. Interstitial Voids

Where insulation, not strength, is the overriding factor (i.e., where it is desired to insulate hot or cold materials), it may be desirable to incorporate tiny interstitial voids within the structural matrix of the sheets in addition to lightweight aggregates in order to increase the insulating properties of the sheet or article made therefrom. The incorporation of voids is carefully calculated to impart the requisite insulation and light weight characteristics without undue degradation of the strength of the sheet. Where insulation is not important, it is desirable to minimize the voids in order to maximize strength and minimize volume.

Air voids may be introduced by high shear, high speed mixing of the moldable mixture, with a foaming or stabilizing agent added to the mixture to aid in the incorporation and retention of air voids. Suitable foaming and air entraining agents include commonly used surfactants. One foaming and air-entraining agent is vinsol resin.

During the process of forming the moldable mixture into a sheet it will be desirable to heat the moldable mixture in order to remove water. This can also leave porosity behind if the sheet is not compacted, which decreases the density of the sheet.

Another foaming agent that can be used is a mixture of citric acid and bicarbonate, or bicarbonate that has been processed into small granules or particles and coated with wax, starch, or water soluble coatings. These can be used in void formation in two ways: (1) react with water and form $CO_2$ gas in order to create a cellular foam structure within the starch-bound matrix, or (2) pack the particles as part of the matrix and after hardening the matrix remove the foam particles by heating the product above 180° C., which causes an endothermic decomposition of the particles, leaving behind a well controlled cellular lightweight structure.

Finally, air voids may be introduced into the moldable mixture during the molding process by adding a blowing agent to the mixture, which will expand when heat is added to the mixture. Blowing agents typically consist of a low boiling point liquid and finely divided calcium carbonate. These are uniformly mixed into the moldable mixture and kept under pressure while heated. The liquid blowing agent penetrates into the pores of the individual calcium carbonate particles, which act as points from which the blowing agent can then be vaporized upon thermal expansion of the blowing agent as the pressure is suddenly reduced.

II. Manufacturing Sheets From Moldable Mixtures

The starch-bound sheets of the present invention are manufactured by molding a moldable starch-filled mixture at temperatures that progressively increase in order to first cause the formation of a skin of cellulosic ether, second gelatinize the starch granules, and third remove water by evaporation.

A detailed description of a preferred sheet forming process can be found in U.S. Pat. No. 5,508,072, entitled "Sheets Having A Highly Inorganically Filled Organic Polymer Matrix," in the names of Per Just Andersen, Ph.D. and Simon K. Hodson. For purposes of disclosure, including the manufacture of inorganically filled sheets, this patent is incorporated herein by specific reference.

A comprehensive production sequence used to manufacture the starch-bound sheets of the present invention, which can be formed into containers or other articles, is set forth in FIG. 1A, including the apparatus for carrying out the following manufacturing steps: (1) preparing and mixing the molding composition; (2) extruding the mixture into a sheet or other shape through an appropriate die; (3) passing the extruded mixture through at least one pair of forming rollers in order to form a stick of the desired thickness and; (4) passing the sheet between further sets of rollers that gelatinize the starch and remove at least part of the water from the mixture further drying the sheet by rolling it onto one or more larger diameter heated drying rollers; (5) optionally compacting the sheet while in a slightly moist condition in order to eliminate unwanted voids and increase the strength of the sheet; (6) optionally drying the sheet after it has been compacted; (7) optionally finishing the sheet by passing it between one or more pairs of finishing rollers; and (8) optionally rolling the substantially dried sheet onto a spool to form a roll which can be stored and used when needed. Each of these manufacturing steps is set forth more fully below.

Figure 1B:
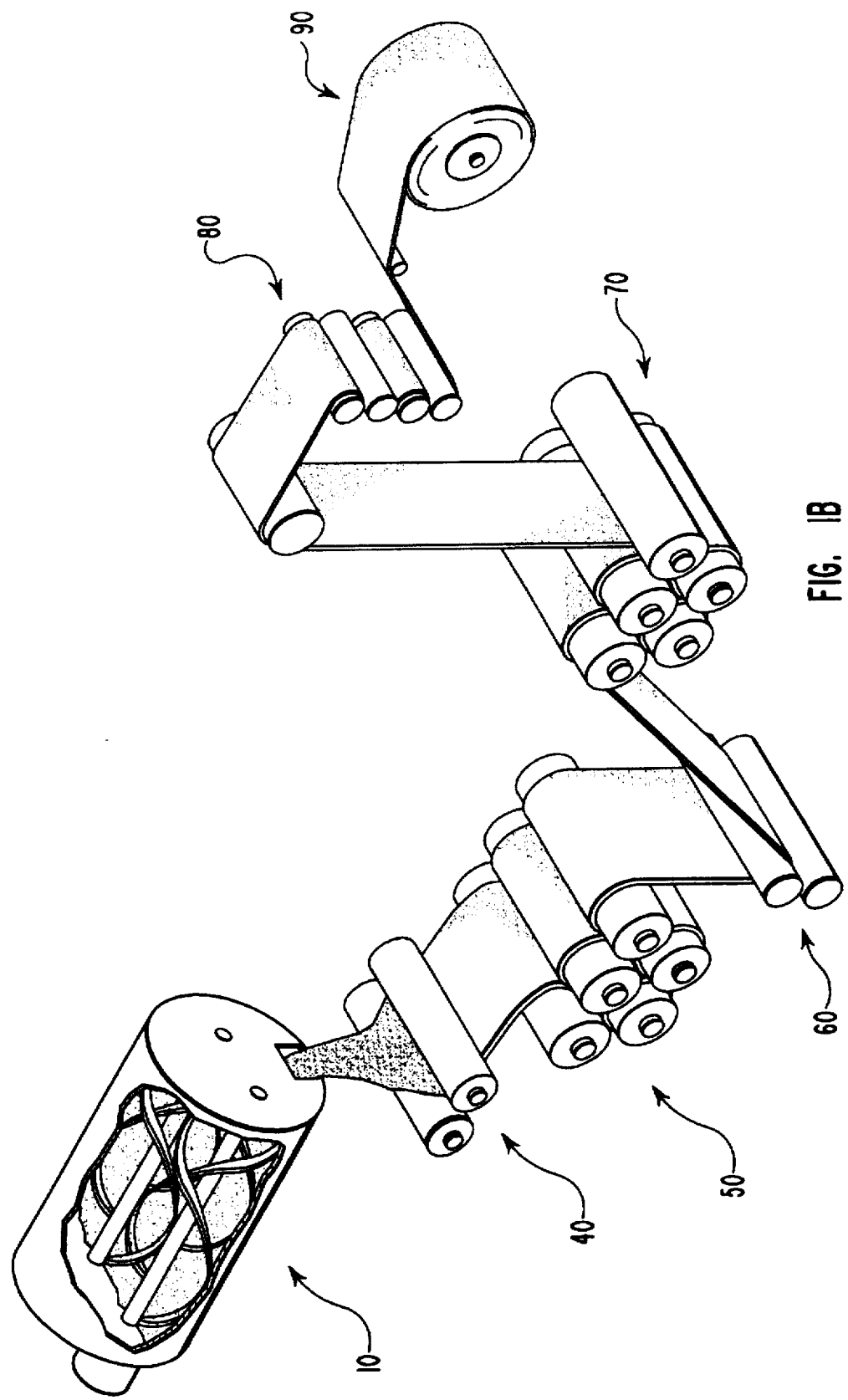
FIG. 1B is a schematic view of an alternative preferred system for manufacturing starch-bound sheets wherein the amorphous mixture is directly passed between sheet-forming rollers.

As shown in FIG. 1B, the moldable mixture can alternatively be fed directly between the sheet-forming rollers. FIG. 2B depicts a "wig wag" extruding apparatus which rapidly feeds a bead of material back and forth along the length of the sheet-forming rollers as another preferred process.

A second method suitable for most mix designs includes (1) mixing the moldable mixture in a kneader and then removing the air under a vacuum; (2) extruding and then cutting the mixture into individual units of an appropriate shape (such as a cylinder); (3) conveying the extruded units into a hopper; (4) passing the extruded units between a pair of self-feeding extruding rollers to form a sheet; and (5) optionally drying or otherwise finishing the sheet. The extrusion step aids in deairing the moldable mixture and the individual extruded units provide a more uniform supply of the moldable mixture at the entrance of the extruding rollers.

A. Preparing The Moldable Mixture

The first step in the manufacture of sheets involves the formation of a suitable moldable mixture having the desired properties of workability and green strength, as well as strength, flexibility, toughness, and degradability of the final hardened sheet. Some of the properties considered to be generally desirable with regard to the moldable mixture are adequate workability, plastic-like qualities, and green strength for a given extrusion, rolling, and/or molding process. As set forth above, the level of water, organic binder, and (optionally) dispersant will determine the level of workability and extrudability of the mixture, as will the other components within the mixture, such as aggregates, fibers, plasticizers, air entraining agents, etc. However, no single component will completely determine the rheology and other properties of the moldable mixture. Rather, each of the components work together in an interrelated fashion.

1. Effect of Components on Mixture Rheology

The amount of water that should be added to obtain a mixture having adequate workability and flowability will depend on the concentration and particle packing density of the inorganic filler, the amount of fibers, the identity and quantity of the organic binder, and the identity and quantity of other admixtures (such as dispersants, plasticizers, or lubricants). In general, however, the addition of more water will decrease the viscosity and yield stress of the mixture, thereby increasing the flowability of the mixture and decreasing the form stability of an object molded therefrom.

The organic binder can greatly affect the rheology of the mixture depending on the identity, concentration, and extent of gelation or dissolution of the organic binder in the wet mixture. The cellulosic ether will generally dissolve in or at least be fairly thoroughly dispersed by the water. The starch granules preferably remain ungelatinized in the wet mixture until molding.

The cellulosic ethers have greatly varying levels of water solubility or dispersability, as well as varying levels of viscosity and yield stress. For example, a 2% solution of Tylose® FL 15002 (a methylhydroxyethelcellulose) at 20° C. has a viscosity of about 15000 cps, while a similar solution of Tylose® 4000 has a viscosity of about 4000 cps. The former greatly increases the yield stress and plastic-like properties of a moldable mixture, while the latter may act more as a lubricant or plasticizer.

The starch component will gelate later during the sheet-forming process. Although many organic polymer binders such as starch neither polymerize or depolymerize when added to the moldable mixture, but rather gelate and then dry out to form a bonding matrix, it is within the scope of the present invention to add water soluble or water-dispersable polymerizable units to the moldable mixture which will thereafter polymerize in situ over time. The rate of the polymerization reaction can be regulated by adjusting the temperature of the mixture and/or adding a catalyst or inhibitor. Examples of polymerizable units that may be added to a moldable mixture include Cellosize and latex-forming monomers.

With regard to gelation, most cellulosic ethers will readily gelate in water at room temperature. Others, such as many starches, will only gelate in water at higher temperatures. Certain modified starches can, however, gelate at room temperature. Cellulosic ethers will generally impart their maximum rheological effect almost immediately, while polymerizable binders will stiffen over time, and starch-based binders will generally stiffen as the temperature of the mixture is increased.

Other admixtures which may be added to directly influence the rheology of the moldable mixture include dispersants, plasticizers, and lubricants. Dispersants such as sulfonyl-based materials greatly decrease the viscosity and increase the workability of the moldable mixture while keeping the amount of water constant. Using a dispersant allows for the inclusion of less water while maintaining the same level of workability.

The amount, identity, and particle packing density of the inorganic aggregate filler can greatly affect the rheology and workability of the moldable mixture. Inorganic aggregates which are porous or which have a high specific surface area will tend to absorb more water than nonporous aggregates, thereby reducing the amount of water available to lubricate the particles. This results in a stiffer, more viscous mixture. Particle packing density can also have a tremendous impact on the rheology of the mixture by determining the amount of interstitial space which generally must be filled by water, lubricants, organic polymers, or other liquids in order for the mixture to flow.

By way of example, an aggregate system having a natural packing density of 0.65 will generally require about 35% liquids (including water) by volume in order to substantially fill the interstitial space between the particles. On the other hand, an aggregate system having a natural packing density of 0.95 will generally require only about 5% liquids by volume in order to substantially fill the voids. Thus, particle packing density directly correlates to the rheological properties including the level of workability of the mixture. The size and morphology of the aggregate particles can also affect the rheology and flow properties of the moldable mixture to some degree.

Hydraulically settable inorganic aggregates such as hydraulic cement, gypsum hemihydrate, and calcium oxide can be utilized as a water absorption mechanism. These chemically react with the water, thereby reducing the effective level of water within the moldable mixture without resorting to heating or drying techniques. Such materials can greatly affect the rheology of the moldable mixtures as a function of the extent of hydration, which is a function of time. In addition, it has been found that hydraulic cement increases the cohesive strength of the green moldable mixture and a fresh sheet made therefrom. Cohesion holds the molded material together so that the sheet can be pulled through the rollers and yet maintain its form until dried sufficiently to obtain sufficient tensile strength.

Finally, other solid components within the mixture, such as fibers, will affect the rheology of the mixture in similar fashion to the inorganic aggregates. Certain fibers may absorb water depending on their porosity and swelling capability. In addition, certain fibers can be treated to become ionically charged, which will allow them to chemically interact with ionically charged organic plasticizers. In this way the fibers may affect the rheology of the mixture to some degree.

2. Effect of Components on Final Properties

With regard to the final dried or hardened product, some of the properties considered generally desirable to design into the structural matrix of the sheet include high tensile strength (in general or along particular vectors), flexibility, and ability to elongate, deflect or bend. In some cases, it may be desirable to obtain sheets which substantially incorporate the properties of conventional paper or paperboard products. However, in other cases it may be desirable to obtain a structural matrix having properties not obtainable using ordinary wood pulp or other conventional paper-making starting materials. These may include increased toughness, higher modulus of elasticity, water resistance, or lower bulk density.

In contrast to conventional paper or paperboard, in which the properties of the sheets are extremely dependent on the properties of the pulps used, the properties of the starch-bound sheets of the present invention are substantially independent of the properties of the fibers used in making the sheets. To be sure, using longer, more flexible fibers will generally impart more flexibility to the sheet than shorter, stiffer fibers. However, properties that are largely pulp-dependent in conventional papers can be designed into the starch-bound sheets by adjusting the concentrations of the nonfibrous components of the moldable mixture as well as the processing technique used. Such properties as stiffness, rigidity, surface finish, porosity, and the like are generally not dependent on the type of fibers used in the starch-bound sheets.

The flexibility, tensile strength, or modulus of elasticity can be tailored to the particular performance criteria of the sheet, container, or other object made therefrom by altering the components and relative concentrations of the components within the moldable mixture. In some cases, higher tensile strength may be an important feature. In others, it may be less significant. Some sheets should preferably be more flexible, while others should be more rigid. Some will be relatively dense, while others will be thicker, lighter, and more insulative. The important thing is to achieve a material which has properties appropriate for a particular use, while remaining cognizant of cost and other practical production line parameters. While having "too much" or "too little" of a particular property may be inconsequential from the standpoint of performance, from a cost standpoint it may be wasteful or inefficient to provide for the particular property.

In general, increasing the amount of organic polymer binder will increase the tensile strength of the final hardened sheet, while also increasing the flexibility and resilience of the sheet, while also decreasing the modulus of elasticity.

Similarly, increasing the concentration of fibers within the mixture generally increases the tensile strength, flexibility, tear strength and burst strength of the final sheet. Different fibers have greatly varying degrees of tear and burst strength, flexibility, tensile strength, ability to elongate without breaking, and stiffness. In order to obtain the advantageous properties of different types of fibers, it may be preferable in some cases to combine two or more different kinds of fibers within the moldable mixture.

It should also be understood that certain sheet forming processes, such as extrusion and rolling, will tend to orient the fibers in the direction of elongation of the mixture or sheet. This may be advantageous in order to maximize the tensile strength of the sheet in a certain direction. For example, where the sheet will be required to bend along a hinge, it is preferable for the fibers to be oriented in a way to more effectively bridge the two sides of the hinge by being oriented perpendicular to the fold line to reinforce the hinge in the sheet. In addition, it may be desirable to concentrate more of the fibers in the area of a hinge or where the sheet requires increased toughness and strength.

The type of aggregate can also affect the properties of the final hardened sheet. Aggregates comprising generally hard, inflexible, small particles such as clay, kaolin, or chalk, will generally result in a smoother sheet having an increased brittleness. Lightweight aggregates such as perlite or hollow glass spheres result in a sheet having lower density, lower brittleness, and greater insulating ability. Aggregates such as crushed sand, silica, gypsum, or clay are extremely inexpensive and can greatly reduce the cost of manufacturing a sheet therefrom. Any material with a high specific surface area gives increased drying shrinkage and shrinkage defects. Materials with lower specific surface areas are advantageous because they are less sticky, which allows the sheet to be processed by lower temperature rollers without sticking.

Hydraulically settable aggregates such as hydraulic cement, gypsum hemihydrate, and calcium oxide may provide small to significant degrees of binding within the hardened sheet, depending on the amount in which such hydraulically settable aggregates are added. These may increase the stiffness and compressive strength of the final sheet and, to some degree, the tensile strength. Hydraulic cement can also decrease the solubility of the sheet in water, thereby increasing the resistance of the sheet to water degradation.

Finally, other admixtures within the moldable mixtures can add a waterproofing property to the final product, such as by adding rosin and alum to the mixture. These interact to form a very water resistant component within the starch-bound matrix. In the absence of significant quantities of such waterproofing agents, water can be used to remoisten the sheet and temporarily increase the flexibility, bendability, and elongation before rupture of the sheet, particularly where the sheet will be formed into another article of manufacture, such as a container. Of course, water can also facilitate the degradation of the sheet after it has been discarded.

As a general rule, starch-bound sheets which have lower concentrations of organic polymer binder and fiber will be more rigid, have a higher insulation ability, have lower cohesiveness, resist heat damage, have lower tensile strength, and resist water degradation (particularly if they contain hydraulic cement, the inclusion of which can also increase the compressive strength of the final product).

Sheets which have lower concentrations of organic binder but higher fiber content will generally have higher tensile strength, have higher toughness, have lower compressive and flexural strengths, have lower stiffness and higher flexibility, and be fairly resistant to water degradation.

Sheets which have higher concentrations of organic polymer binder and lower concentrations of fiber will be more water soluble and degradable, easier to mold (allowing for the manufacture of thinner sheets), have moderately high compressive and tensile strengths, higher toughness, moderate flexibility, and lower stiffness.

Finally, sheets which have higher concentrations of organic polymer binder and fiber will have properties that are most similar to conventional paper, will have higher tensile strength, toughness, and folding endurance, have moderately high compressive strength, have very low resistance to water degradation, will have lower resistance to heat (particularly when approaching ignition point of fibers or decomposition temperature of the binder), and have higher flexibility and lower stiffness.

The starch-bound sheets formed using the compositions described herein will preferably have a tensile strength in the range from about 0.05 MPa to about 100 MPa, and more preferably in the range from about 5 MPa to about 80 MPa. In addition, the sheets will preferably have a bulk density less than about 2 g/cm$^3$, and more preferably in the range from about 0.4 g/cm$^3$ to about 1.5 g/cm$^3$. Whether a sheet will have a density at the lower, intermediate, or higher end of this range will generally depend on the desired performance criteria for a given usage. In light of the foregoing, the starch-bound sheets of the present invention will preferably have a tensile strength to bulk density ratio in the range from about 2 MPa·cm$^3$/g to about 500 MPa·cm$^3$/g, and more preferably in the range from about 5 MPa·cm$^3$/g to about 150 MPa·cm$^3$/g.

The direction-specific strength properties of the starch-bound sheets of the present invention should be contrasted with those of paper, which is known to have a strong and weak direction with regard to tensile and tearing strength. The strong direction in conventional paper is the machine direction, while the weak direction is the cross-machine direction. While the ratio of the strengths in the strong and weak direction is about 3:1 in conventional paper, in the present invention the sheet can be manufactured to have evenly dispersed strength (i.e., ratio of strengths of about 1:1) depending on the particular forming process used.

The term "elongate" as used in the specification and appended claims with regard to the starch-bound sheet means that the structural matrix of the sheet is capable of being stretched without rupturing and still have a finished surface. In other words, the starch-bound matrix of the sheet is capable of moving or changing shape without rupture by application of a force such as pulling or stretching. The ability of the structural matrix of the sheet to elongate before rupture is measured by an Instron tensile test and a stress-strain test.

By optimizing the mix design, it is possible to manufacture a sheet which has a structural matrix capable of elongating up to about 30% when fresh and moist before tearing or rupturing occurs, and from about 0.5% to 12% when the sheet is dry. That is, the sheet is capable of elongating within these ranges without fracturing into two pieces. In addition, the elongation of a dry sheet can be increased by adding steam or moisture to the sheet in the order of up to about 20% by weight of the dry weight of the sheet. However, this remoistening step only temporarily reduces the strength of the sheet until it has been dried out again.

The term "deflect" as used in the specification and appended claims with regard to the starch-bound sheet means that the sheet has a structural matrix capable of bending, folding or rolling without rupture and change in the finished surface. The ability of the sheet to deflect is measured by measuring the elasticity modulus and the fracture energy of the sheet using means known in the art. As with any material, the bending ability of a sheet manufactured according to the present invention is largely dependent upon the thickness of the sheet.

In order to obtain a sheet having the desired properties of strength, bendability, insulation, toughness, weight, or other performance criteria, the thickness of the sheet can be altered by adjusting the space between the rollers, as set forth more fully below. Depending on the thickness and desired performance criteria, the components and their relative concentrations can be adjusted in order to accommodate a particular sheet thickness. The sheets of the present invention may be designed to have greatly varying thicknesses; however, most products requiring a thin-walled material will generally have a thickness less than about 1 cm, preferably less than about 5 mm, more preferably less than about 3 mm, and most preferably less than about 1 mm. Nevertheless, in applications where insulation ability or higher strength or stiffness is more important, the sheet thickness may range up to about 1 cm. Of course, the compositions can also be molded into sheets of 10 cm or greater.

In English units, sheets used to make corrugated boxes will preferably have a thickness of about 0.010", milk cartons about 0.020", juice boxes about 0.010".

Where a sheet is to be used to print magazines or other reading material, it will have a thickness that is comparable to conventional paper products, which typically have a thickness of about 0.05 mm. Printable sheets requiring greater flexibility and lower stiffness (such as regular pages of a magazine or brochure) will typically have a thickness of about 0.025–0.075 mm. Those requiring greater strength, stiffness, and lower flexibility (such as magazine or brochure covers) will have a thickness of about 0.1–2 mm. The thickness and flexibility of any particular sheet will depend on the desired performance criteria of the reading or other printed material in question.

As discussed more fully below, the moldable mixture is usually passed through a series of heated rollers which drive off a significant amount of water and aid in molding a sheet with high green strength. Nevertheless, one skilled in the art may adjust the water content so that the moldable mixture has an appropriate rheology so that it will be easily and effectively extruded through a particular die, and yet have sufficient form stability such that the integrity of the sheet is maintained as it is passed through a series of rollers during other processes.

The currently preferred embodiment for preparing an appropriate moldable mixture in an industrial setting includes equipment in which the materials incorporated into the moldable mixture are automatically and continuously metered, mixed (or kneaded), de-aired, and extruded by an auger extruder apparatus. It is also possible to premix some of the components in a vessel, as needed, and pump the premixed components into a kneading mixing apparatus.

A double shaft sigma blade kneading mixer with an auger for extrusion is the preferred type of mixer. The mixer may be adjusted to have different RPMs and, therefore, different shear for different components. Typically, the moldable mixtures will be mixed for a maximum of about 10 minutes, and thereafter emptied from the mixer by extrusion for a maximum of about 3 minutes.

In certain circumstances, it may be desirable to mix some of the components together in a high shear mixture in order to form a more well dispersed, homogeneous mixture. For example, certain fibers may require such mixing in order to fully disagglomerate or break apart from each other. High shear mixing results in a more uniformly blended mixture, which improves the consistency of the unhardened moldable mixture as well as increasing the strength of the final hardened sheet. This is because high shear mixing more uniformly disperses the fiber, aggregate particles, and binder throughout the mixture, thereby creating a more homogeneous structural matrix within the hardened sheets.

Different mixers are capable of imparting differing shear to the moldable mixture. For example, a kneader imparts higher shear compared to a normal cement mixer, but is low compared to an Eirich Intensive Mixer or a twin auger food extruder.

It should be understood however, that high shear, high speed mixing should not be used with materials that have a tendency to break down or disintegrate under such conditions. Starch granules can prematurely gelatinize under high shear conditions. Certain lightweight aggregates, such as perlite or hollow glass spheres, will have a tendency to shatter or crush under high shear conditions. In addition, high shear mixing by propeller is generally efficacious only where the mixture has relatively low viscosity. In those cases where it is desirable to obtain a more cohesive, plastic-like mixture, it may be desirable to blend some of the ingredients, including water, in the high shear mixer and thereafter increase the concentration of solids, such as fibers or aggregates, using a lower shear kneading mixer. High shear mixing is especially useful where it is desired to incorporate small, nonagglomerated air voids by adding an air entraining agent within the moldable mixture.

High shear mixers useful in creating the more homogeneous mixtures as described herein are disclosed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No. 4,944,595 entitled "Apparatus for Producing Cement Building Materials"; and U.S. Pat. No. 5,061,319 entitled "Process for Producing Cement Building Material". For purposes of disclosure, the foregoing patents are incorporated herein by specific reference. High shear mixers within the scope of these patents are available from E. Khashoggi Industries of Santa Barbara, Calif.

B. Forming Sheets from the Moldable Mixture

Once the moldable mixture has been properly blended, it is then transported to the sheet forming apparatus, which will typically comprise an extruder and a series of rollers. In some cases, an apparatus capable of both mixing and extruding the moldable mixture may be used in order to streamline the operation and minimize the coordination of the various components within the system. Reference is now made to FIG. 1A, which illustrates a currently preferred system for manufacturing sheets from a moldable mixture. The system includes a mixing apparatus 10, an auger extruder 20, a pair of sheet forming rollers 40, a first set of drying rollers 50, a pair of compaction rollers 60 (optional), a second set of drying rollers 70 (optional), a series of finishing rollers 80 (optional), and a spooler 90 (optional).

In the first currently preferred sheet forming step, the moldable mixture is formed into a sheet by extruding the material through an appropriate extruder die and then passing the extruded material through at least one pair of reduction or forming rollers (FIG. 1A). Alternatively, the moldable mixture can be directly fed between the sheet-forming rollers as depicted in FIG. 1B. Depicted in FIG. 2B is a wig wag extruding system, which is yet another preferred embodiment of feeding the molding composition between the sheet-forming rollers.

FIG. 2A is an enlarged view of auger extruder 20, which includes a feeder 22 that feeds the moldable mixture into a first interior chamber 24 within the extruder 20. Within the interior chamber 24 is a first auger screw 26 which exerts forward pressure on, and advances the moldable mixture through, the interior chamber 24 toward an evacuation chamber 28. Typically, a negative pressure or vacuum will be applied to the evacuation chamber 28 in order to remove unwanted air voids within the moldable mixture.

Thereafter, the moldable mixture is fed into a second interior chamber 30. A second auger screw 32 advances the mixture toward a die head 34 having a transverse slit 36 with a die width 38 and a die thickness 39. The cross-sectional shape of the slit 36 is configured to create a sheet of a desired width and thickness that will generally correspond to the die width 38 and die thickness 39.

Figure 3:
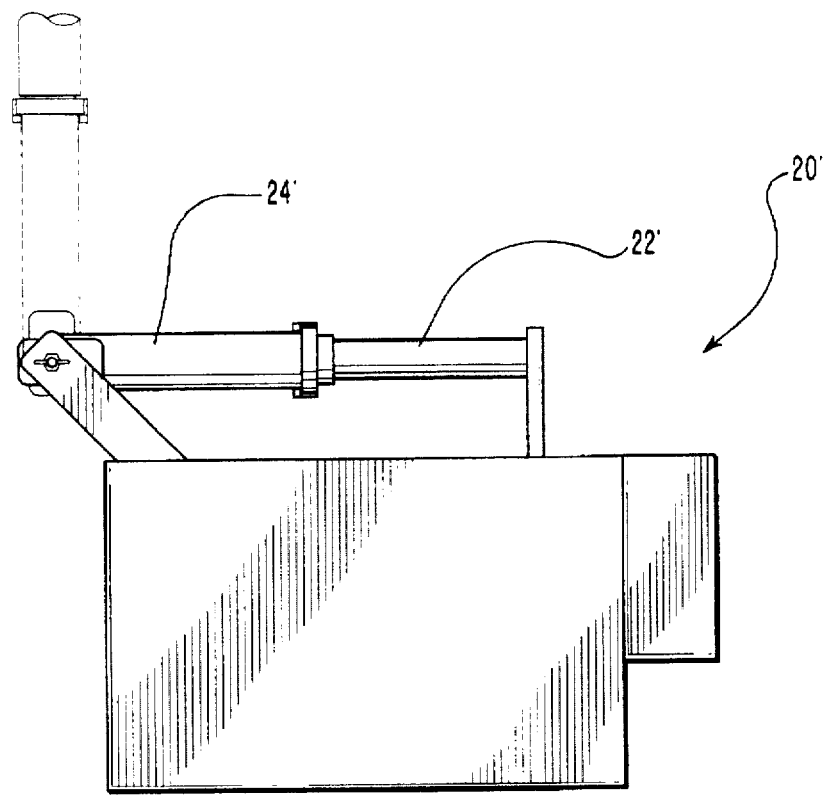
FIG. 3 is a side view of a piston extruder.

Alternatively, as depicted in FIG. 3, the extruder may comprise a piston extruder 20' instead of an auger extruder. The piston extruder 20' utilizes a piston 22' instead of an auger screw in order to exert forward pressure on, and advance the moldable mixture through, an interior chamber of an arm 24'. An advantage of using a piston extruder is the ability to exert much greater pressures upon the moldable mixture. Nevertheless, due to the highly plastic-like nature of mixtures typically employed in the present invention, it is not generally necessary, or even advantageous, to exert pressures greater than those achieved using an auger extruder.

Although the preferred width and thickness of the die will depend upon the width and thickness of the particular sheet to be manufactured, the thickness of the extruded sheet will usually be at least twice, and sometimes many times, the thickness of the final sheet. The amount of reduction (and, correspondingly, the thickness multiplier) will depend upon the properties of the sheet in question. Because the reduction process helps control fiber orientation, the amount of reduction will often correspond to the degree of desired orientation. In addition, the greater the thickness reduction, the greater the elongation of the sheet.

It will be appreciated that where the differential between the roller nip and the sheet thickness before the sheet passes between the reduction rollers is small, the fiber orienting flow of material will tend to be localized at or near the sheet surface, with the interior not being subjected to fiber orienting flow. This allows for the production of sheets that have significant unidirectional or bidirectional orientation of fibers at or near the surface of the sheet and more random orientation of fibers within the interior of the sheet. However, by decreasing the nip relative to the initial sheet thickness it is possible to increase the orientation of the fibers within the interior of the sheet by increasing the fiber orienting flow of material within the sheet interior.

In addition to narrow die slits to form flat sheets, other dies may be used to form other objects or shapes, the only criterion being that the extruded shape be capable of being thereafter formed into a sheet. For example, in some cases it may not be desirable to extrude an extremely wide sheet. Accordingly, a pipe or tube may be extruded and continuously cut and unfolded using a knife located just outside the die head.

The amount of pressure that is applied in order to extrude the moldable mixture will generally depend on the pressure needed to force the mixture through the die head, as well as the desired rate of extrusion. It should be understood that the rate of extrusion must be carefully controlled in order for the rate of sheet formation to correspond to the speed at which the sheet is subsequently passed through the rollers during the rolling step. If the rate of extrusion is too high, excess material will tend to build up behind the rollers, which will eventually cause clogging of the system. Conversely, if the rate of extrusion is too low, the rollers will tend to stretch the extruded sheet, which can result in a fractured or uneven structural matrix, or worse, breakage or tearing of the sheet. The latter can also result in a complete breakdown of the continuous sheet forming process.

Because it will sometimes not be possible to control all of the variables that can affect the rate of extrusion, it may be preferable to have an integrated system of transducers which measure the rate of extrusion, or which can detect any buildup of excess material behind the rollers. This information can then be fed into a computer processor which can then send signals to the extruder in order to adjust the pressure and rate of extrusion in order to fine tune the overall system. As set forth below, a properly integrated system will also be capable of monitoring and adjusting the roller speed as well.

It should be understood that the pressure exerted on the moldable mixture during the extrusion process should not be so great as to crush or fracture the lightweight, lower strength aggregates if used. Crushing or otherwise destroying the structural integrity of lightweight aggregates containing a large amount of voids will decrease their insulating effect by eliminating the voids. Nevertheless, because perlite, exfoliated rock, or other such materials are relatively inexpensive, some level of crushing or fracturing of the aggregate particles is acceptable. Excessive pressure and shear can also cause the starch granules to prematurely gelatinize.

The properties imparted to the hardened sheets by the fibers can be increased by unidirectionally or bidirectionally orienting the fibers within the sheet. Depending on the shape of the extruder die head, the extrusion of the moldable mixture through the die head will tend to unidirectionally orient the individual fibers within the moldable mixture along the "Y" axis or machine direction of the extruded sheet. The rolling process, which is discussed in detail below, will further orient the fibers in the "Y" direction as the sheet is further elongated during the reduction process. In addition, by employing rollers having varying gap distances in the "Z" direction (such as conical rollers) some of the fibers can also be oriented in the "X" direction, ie., along the width or cross-maching direction of the sheet. Thus, it is possible to create a sheet by extrusion, coupled with rolling, which will have bidirectionally oriented fibers.

In addition to the use of traditional extrusion methods, such as those set forth above, it may be preferable in some cases to either extrude individual mixture masses, which are conveyed to a hopper situated immediately above two horizontally oriented extruding rollers, or simply to convey the moldable mixture to the hopper. This eliminates the need to initially extrude the moldable mixture into a sheet before the rolling process. One conveyor method is an auger conveyor, which allows for variations in feed pressure of the moldable mixture through the rollers.

One of ordinary skill in the art will appreciate that the extrusion step need not formally employ the use of an "extruder" as the term is used in the art. The purpose of the extrusion step is to provide a continuous, well-regulated supply of the molding composition to the rollers. This may be achieved by other mechanisms known to those skilled in the art to effect the "extrusion" or flow of material through an appropriate opening. The force needed to cause a moldable mixture to flow may, for example, be supplied by gravity.

Reference should be made to FIG. 1B, which illustrates an alternative preferred embodiment in which the moldable mixture is fed directly from the mixer 10 to a pair of extruding reduction rollers 40, which converts the amorphous moldable mixture directly into a sheet without the use of an extruder die. As in the system illustrated in FIG. 1A, the sheet formed by forming rollers 40 is fed through a first set of drying rollers 50, a pair of compaction rollers 60 (optional), a second set of drying rollers 70 (optional), a series of finishing rollers 80 (optional), and is then wound onto a spooler 90 (optional). The forming rollers 40 will be heated to temperatures sufficient to cause initial film forming by the cellulosic ether, followed by gelatinization of the starch granules. They may also remove some of the water by evaporation. No significant amounts of water are removed in a liquid state using the preferred sheet-forming methods of the present invention.

Figure 4:
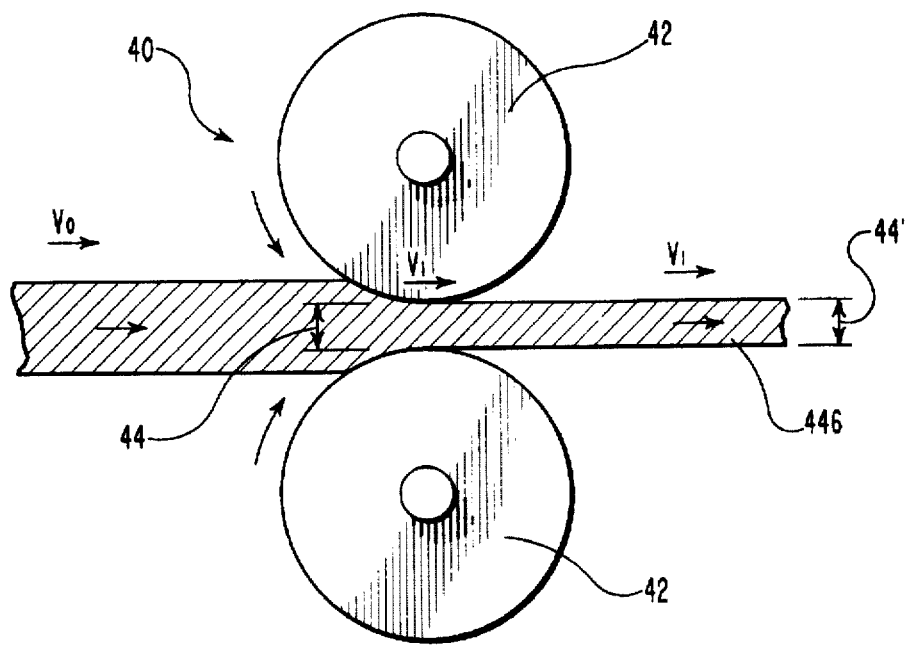
FIG. 4 is a side view of a pair of reduction rollers and a sheet being reduced in thickness by the rollers.

Referring again to FIG. 1A, which shows one embodiment of the sheet forming process of the present invention, a series of heated sheet-forming rollers are employed during the sheet-forming process. An enlarged side view of reduction rollers 40 is depicted in FIG. 4. The reduction rollers 40 include two individual rollers 42 positioned adjacent to one another with a predetermined gap distance (or nip) 44 therebetween. The gap distance 44 between individual rollers 42 corresponds to the desired thickness 44' of a reduced sheet 46 passing between rollers 42.

As the thickness of the sheet is reduced upon passing through a pair of rollers, it will also elongate in the forward moving (or "Y") direction, otherwise known as the "machine direction." One consequence of sheet elongation is that the fibers will further be at least partially oriented or lined up in the machine direction. In this way, the reduction process in combination with the initial extrusion process can create a sheet having substantially unidirectionally oriented fibers in the machine direction. Increasing the speed of the reduction rollers, however, has been found to create a better randomization of fibers throughout the sheet.

Another way to maintain the random orientation of fibers within the sheet is to decrease the differential forming speed of the rollers. That is, where the moldable mixture is fed between the extruding rollers under lower pressures, the sudden increase in machine-direction velocity and accompanying shear as the mixture passes between the rollers will tend to orient the fibers in the machine direction. However, by increasing the pressure of the mixture as it is fed between the rollers it is possible to decrease the level of machine-direction shear, thereby resulting in a sheet with a more randomized fiber orientation.

Another consequence of sheet elongation is that the sheet will "speed up" as it passes between a pair of reduction rollers. Reference is again made to FIG. 4 to illustrate that the rotational speed $v_1$ of the rollers will correspond to the speed $v_1$ of the reduced, elongated sheet as it exits the rollers, and not the speed $v_0$ of the sheet as it enters the gap between the rollers. By way of example, if the sheet thickness is reduced by 50%, and assuming there is no widening of the sheet during the reduction process, the sheet will elongate to twice its original length. This corresponds to a doubling of the sheet velocity from before entering the rollers to when the sheet exits the rollers. Thus, if the sheet thickness is reduced by 50%, then $v_1=2\times v_0$.

The sheet "speeds up" while passing between a pair of rollers by being squeezed or pressed into a thinner sheet by the rotating rollers. This process of squeezing or pressing the sheet, as well as the speed differential between the entering sheet and the rollers, can create varying shearing forces on the sheet. The application of an excessively large shearing force can disrupt the integrity of the structural matrix of the sheet and create flaws within the sheet, thereby weakening the sheet. Nevertheless, it has been found that for mix designs having very low adhesion to the rollers, and which are highly plastic, it may be possible to reduce the extruded sheet to the final thickness in just one step using a pair of relatively large diameter rollers.

The diameter of each of the rollers should be optimized depending on the properties of the moldable mixture and the amount of thickness reduction of the starch-bound sheets. When optimizing the diameter of the rollers, two competing interests should be considered. The first relates to the fact that smaller diameter rollers tend to impart a greater amount of shearing force into the sheet as it passes between the rollers. This is because the downward angle of compression onto the sheet is on average greater than when using a larger diameter roller.

However, the use of larger diameter rollers has the drawback of the molding composition coming into contact with the roller for a greater period of time, thereby resulting in increased drying of the sheet during the sheet-forming process, particularly as the roller temperature is increased. While some drying is advantageous, drying the sheet too quickly during the rolling process could result in the introduction of fractures and other flaws within the structural matrix.

The optimization of the roller diameters in order to achieve the greatest amount of reduction of sheet thickness, while at the same time preventing overdrying of the molded sheet, is preferred in order to reduce the number of reduction steps in a manufacturing process. Besides reducing the number of working parts, reducing the number of reduction steps also eliminates the number of rollers whose speed must be carefully synchronized in order to prevent sheet buildup behind the rollers (in the case of rollers rotating too slow) or sheet tearing (in the case of rollers rotating too fast).

It is preferable to treat the roller surfaces in order to prevent sticking or adhesion of the starch-bound sheet to the rollers One method entails simply heating the rollers, which causes some of the water within the moldable mixture to evaporate, thereby creating a steam barrier between the sheet and the rollers. Evaporation of some of the water also reduces the amount of water within the moldable mixture, thereby increasing the green strength of the sheet. The temperature of the rollers, however, must not be so high as to dry or harden the surface of the sheet to the point which would create residual stresses, fractures, flaking, or other deformities or irregularities in the sheet.

In general, the initial sheet-forming roller will preferably have a temperature that is similar to the thermal precipitation temperature of the cellulosic ether. In the case of Methocel, it will be preferable to use a sheet-forming roller having a temperature of about 70° C.; for Tylose FL 15002, the sheet-forming roller will preferably have a temperature of about 85° C. The temperature of the sheet-forming roller can be higher than the thermal precipitation temperature of the cellulosic ether, but will generally be lower than the gelation temperature of the starch granules in the composition in order to reduce adhesion of the green sheet to the rollers. After the cellulosic ether skin has been formed on the surface of the green sheet, the sheet is preferably passed between one or more rollers heated to or above the gelation temperature of the starch. Depending on the gelation temperature of the starch and the temperature of the later rollers, more or less of the starch can be caused to gelate at any point during the sheet-forming process. This is particularly feasible where two or more different starches having differing gelation temperatures are used. One of ordinary skill in the art can adjust the roller temperatures to optimize the sheet-forming process depending on the type(s) of cellulosic ether and starch being used in the molding composition.

Generally, the stickiness of the moldable mixture increases as the amount of water in the mixture is increased. Therefore, the rollers should generally be heated to a higher temperature in cases where the mixture contains more water in order to prevent sticking. This is advantageous because sheets containing a higher water content must generally have more of the water removed in order to obtain adequate green strength. In addition, increasing the roller speed will generally allow, and may require, a corresponding increase in the temperature of the rollers in order to prevent adhesion of the sheet to the rollers.

Another way to reduce the level of adhesion between the rollers and the starch-bound sheet is to treat the roller surfaces in order to make them less amenable to adhesion. Rollers are typically made from polished stainless steel and coated with a nonstick material such as polished chrome, nickel, or Teflon®.

Finally, it should be understood that due to the plastic nature and relatively high level of workability of the moldable mixture, the rolling process will usually not result in much compression of the sheet. In other words, the density of the sheet will remain substantially constant throughout the rolling process, although some compaction would be expected, particularly where the sheet has been significantly dried while passing between the reduction rollers. Where compaction is desired, the sheet can be passed between a pair of compaction rollers 60 (FIG. 1A) following a drying step, as set forth more fully below.

Thus, it has been found that the important parameters within the rolling process include the diameter, speed, and temperature of the rollers, as well as the "nip height" (or gap distance). Increasing the diameter of the rollers, as well as the nip height, each tend to decrease the shear rate that is imparted by the rollers to the moldable mixture and sheet during the sheet-forming process, while increasing the speed of the rollers increases the shear rate.

C. The Drying Process

Although the sheet-forming rollers can partially and even substantially dry the sheets, it may be preferable to further dry the sheet in order to obtain a sheet with the desired properties of tensile strength and toughness. Although the sheet will naturally dry out over time, it may not be feasible to wait for the sheet to naturally air dry. Accelerated drying may be accomplished in a number of ways, each of which involves heating the sheet in order to drive off the excess water.

In contrast to the reduction rollers, which are generally aligned in pairs, the drying rollers are individually aligned so that the sheet passes over a large area of each of the roller surfaces individually in sequence. (See drying rollers 50 in FIG. 1A and 1B.) In this way, the two sides of the sheet are alternately dried in steps. While the sheet passes between the reduction rollers during the rolling step in a generally linear path, the sheet follows a generally sinusoidal path when wrapping around and through the drying rollers during the drying step. Preferred drying rollers include large diameter rollers known in the art as "Yankee" rollers, although a series of smaller rollers may alternatively be employed.

The temperature of the drying rollers will depend on a number of factors, including the moisture content of the sheet as it passes over a particular roller. In any event, the temperature of the drying rollers should be less than about 300° C. Although the moldable mixture should not be heated to above 250° C. in order to prevent the destruction of the organic constituents (such as the organic binders or cellulosic fibers), rollers heated to above this temperature may be used so long as there is adequate water within the mixture to cool the material as the water vaporizes. Nevertheless, as the amount of water decreases during the drying process, the temperature of the rollers may need to be reduced to prevent overheating of the sheet material.

In some cases, it may be preferable to use a drying tunnel, oven, or chamber in conjunction with the drying rollers. In order to obtain the full effect of heat convection drying, it is often preferable to circulate the heated air in order to speed up the drying process. The temperature within the drying tunnel, as well as the residence or dwell time of the sheet within the tunnel, will determine the amount and rate of evaporation of the water within the sheet material. The temperature of the drying tunnel should not usually exceed 250° C. in order to prevent the destruction of the cellulose fibers and the organic binder. The drying tunnel will preferably be heated to a temperature in a range from about 100° C. to about 250° C.

Figure 8:
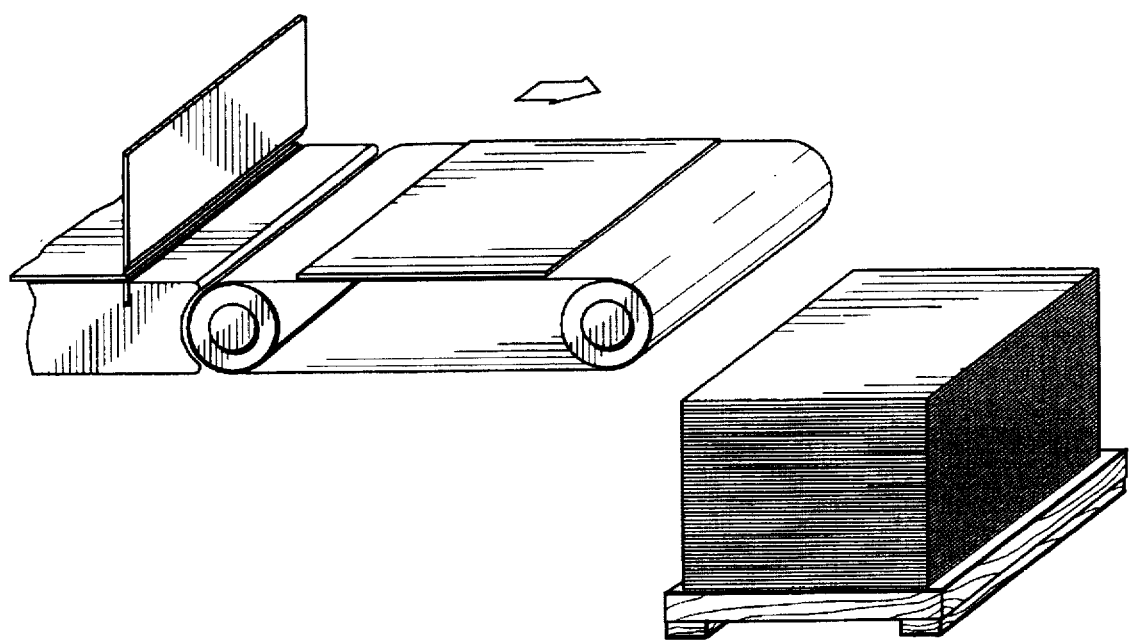
FIG. 8 is a perspective view showing a continuous sheet being cut and stacked as individual sheets.

In some cases, the drying process set forth above will be the final step before the sheet is either used to form a container or other object or, alternatively, rolled onto a spool (FIGS. 1A and 1B) or stacked as sheets until needed (FIG. 8). In other cases, particularly where a sheet with a smoother, more paper-like finish is desired, the drying step may be followed by one or more additional steps set forth more fully below, including a compacting step and/or a finishing step.

E. Optional Finishing Processes

Figure 5:
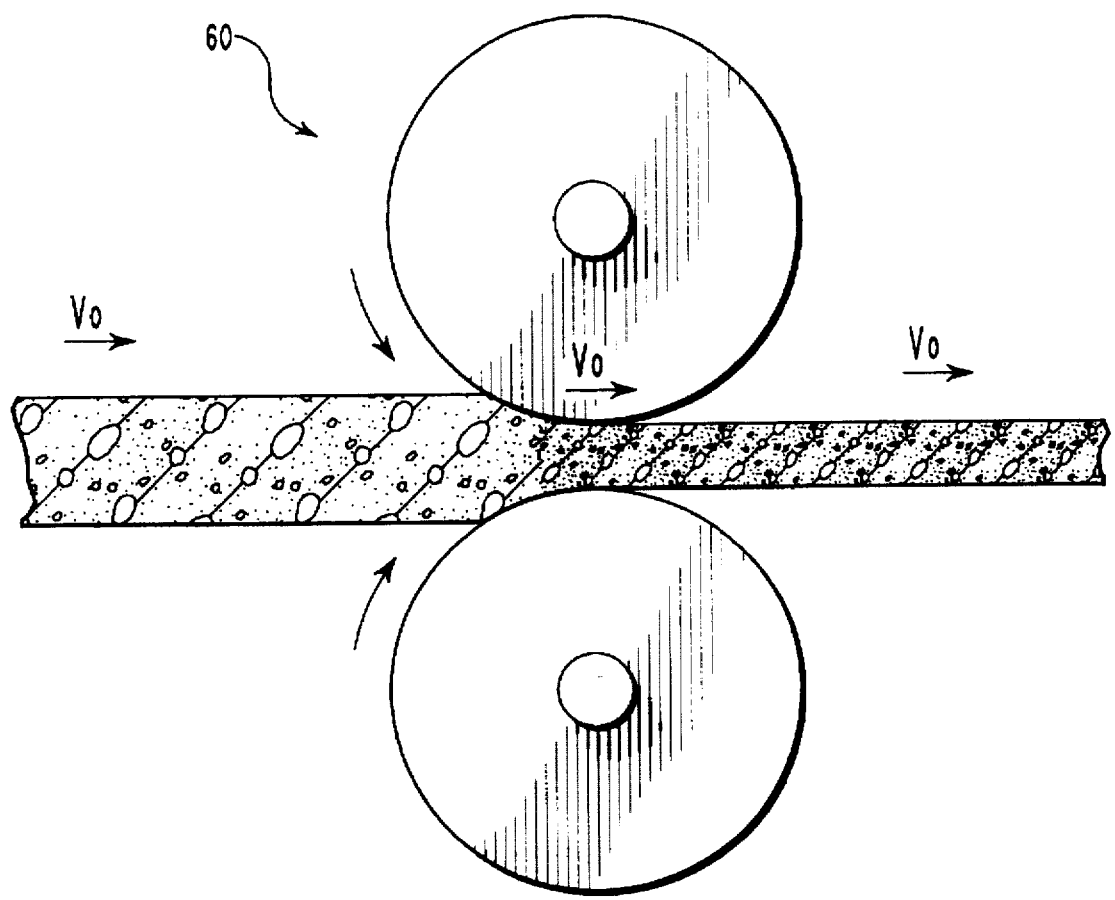
FIG. 5 is a side view of a pair of compaction rollers with a sheet being compacted therebetween.

In many cases, it may be desirable to compact the starch-bound sheet in order to achieve the final thickness, tolerance, and surface finish. In addition, the compaction process can be used to remove unwanted voids within the structural matrix. Referring to FIG. 5, the sheet may optionally be passed between a pair of compaction rollers 60 after being substantially dried during the drying process by first drying rollers 50 (FIGS. 1A and 1B). The compaction process generally yields a sheet with higher density and strength, fewer surface defects, and a reduced thickness, and also fixes and aligns the compacted particles within the sheet surface. The amount of compressive force of the compaction rollers should be adjusted to correspond to the particular properties of the sheet.

The compaction step improves the strength of the final hardened sheet by creating a more dense and uniform structural matrix while also leaving the sheet with a smoother finish. The compaction step is generally preferred in the case of thinner sheets where strength per unit of thickness should be maximized and where insulation ability is less important. Compaction is generally unnecessary for thicker sheets intended to have high insulation and/or low density characteristics. Indeed, it may be undesirable to compact sheets having weaker aggregates such as hollow glass spheres, which may lose their insulating ability if crushed.

The compaction process is preferably carried out without causing significant elongation of the sheet and without negatively disrupting or weakening the structural matrix. In order to achieve compaction without elongating the sheet and without weakening the structural matrix, it is important to control the drying process so that the sheet contains an appropriate amount of water to maintain a slightly moldable rheology of the sheet. By controlling the water content and roller nip, it is possible to ensure that the compaction rollers primarily compress and increase the density of the sheet without significantly elongating the sheet. If the sheet contains too much water, the compaction rollers will elongate the sheet in similar fashion as either the forming or reduction rollers. In fact, the compaction rollers are substantially the same as the forming or reduction rollers, the only difference being that compaction, rather than elongation, will occur if the sheet is dry enough and the reduction in sheet thickness is less than the total porosity left by the evaporation of the water (i.e., if the evaporation of water creates an additional porosity of 25% then the compaction roller nip should be at least 75% of the thickness of the precompacted sheet).

Since the compaction process (including one or more compaction steps) usually involves a slightly moist sheet, it is often preferable to further dry the sheet after the compaction step in a manner similar to the drying process outlined above using optional drying rollers 70. This optional drying step may be carried out using drying rollers, a drying tunnel, or a combination of the two. Nevertheless, in some cases the sheet may be further processed without a second drying step, such as where the sheet is immediately used to form a container or other object, is scored, or where it is otherwise advantageous to have a slightly moist sheet.

Figure 6:
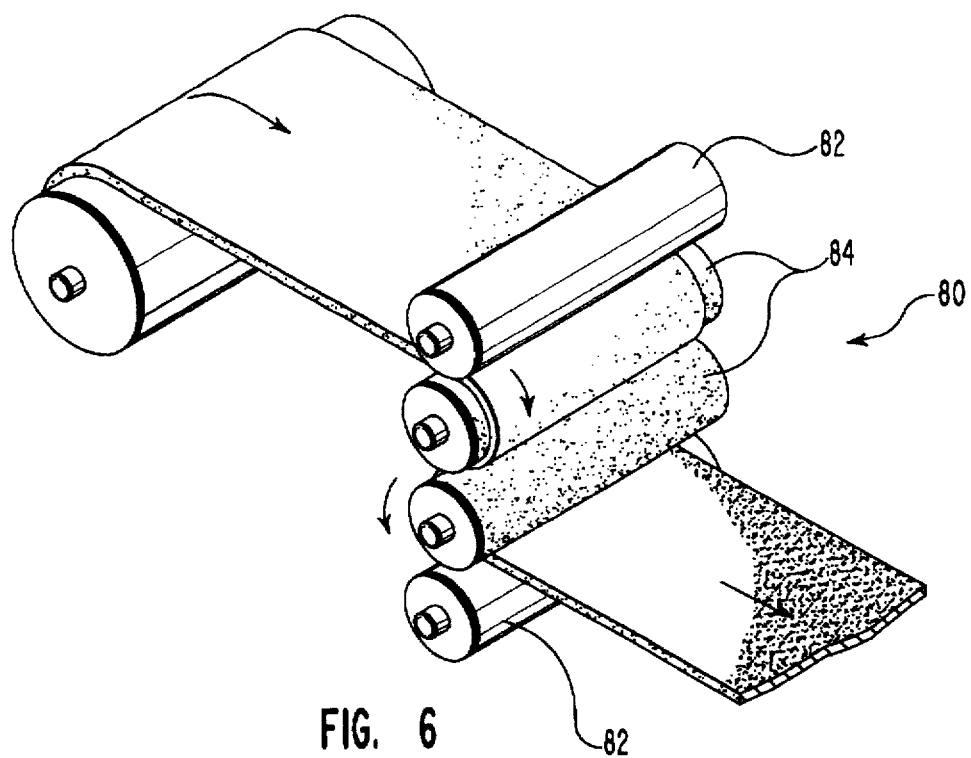
FIG. 6 is a perspective view of a pair of finishing rollers including a "hard" roller and a "soft" roller.

It may also be preferable to further alter the surface of the starch-bound sheet by passing the sheet between one or more pairs of finishing (or "calendering") rollers 80 as shown in FIG. 6. For example, in order to create a sheet with a very smooth surface on one or both sides, the sheet may be passed between at least two pairs of hard and soft rollers 82, 84. The term "hard roller" refers to roller 82 having a very polished surface, which leaves the side of the sheet in contact with the hard roller very smooth. The term "soft roller" refers to roller 84 having a surface capable of creating enough friction between the soft roller and the sheet to pull the sheet through the hard and soft roller pair. This is necessary because hard roller 32 is usually too slick to pull the dry sheet through a pair of hard rollers. Significant slippage of hard roller 82 is advantageous in order to align the particles within the surface of the sheet. Using a fast driven, highly polished hard roller in order to "supercalender" the sheet results in a sheet having a very smooth surface finish. The finishing process may be optionally facilitated by spraying water on the sheet surface, and/or by coating the surface with clay, calcium carbonate, or other appropriate coating materials known to one of ordinary skill in the art.

Figure 7:
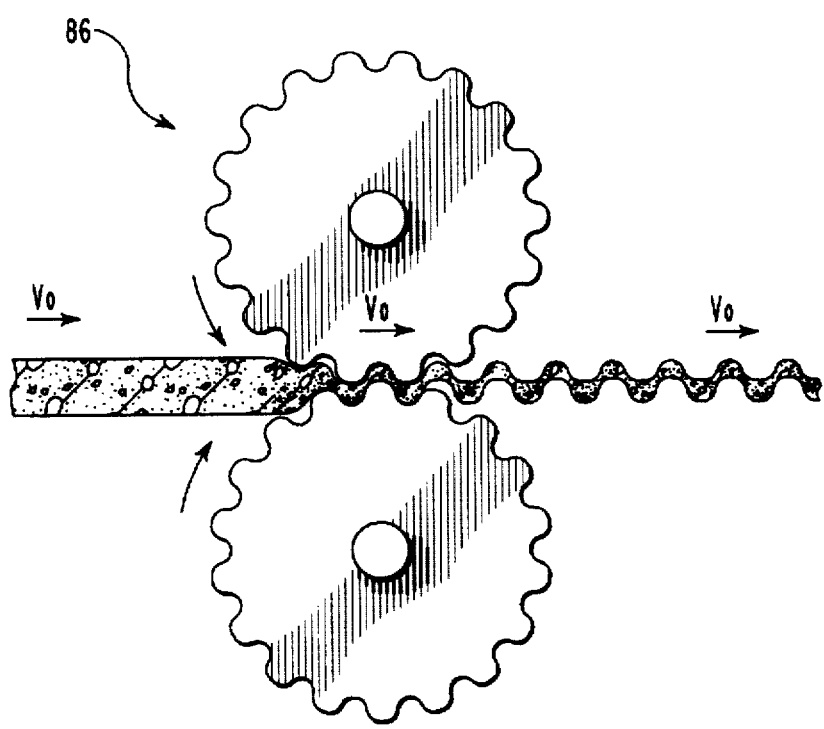
FIG. 7 is a side view of a pair of corrugated rollers used to form a corrugated sheet.

In other embodiments, the finishing rollers can impart a desired texture, such as a meshed, checkered, or waffled surface. Alternatively, or in conjunction with any other finishing process, the sheets may be corrugated by means of corrugating rollers as shown in FIG. 7. If desired, rollers can be used to imprint the surface of the sheet with a logo or other design. Special rollers capable of imparting a water mark can be used alone or in conjunction with any of these other rollers. The extruding rollers, reduction rollers, or compaction rollers may contain means for producing a water mark by either producing a raised or depressed area within a sheet passing therethrough.

III. OPTIONAL PROCESSING OF DRY STARCH-BOUND SHEETS

Starch-bound sheets prepared according to the methods set forth above may be subjected to additional processing steps, depending on the properties desired for the sheets, which, in turn, depends on the ultimate use intended for the sheets. These optional processes may include lamination, corrugation, application of coatings, printing of indicia, scoring, perforation, creping, parchmenting, or a combination thereof.

A. Laminating Processes

A variety of properties can be imparted to the starch-bound sheet by laminating. For the purposes of this specification and the appended claims, the terms "laminated sheet" or "laminate" (when used as a noun) shall refer to a sheet having at least two layers with at least one of the layers being the starch-bound sheet. The terms "laminating material" or "lamina" shall refer to any constituent layer of the laminated sheet, including both the starch-bound sheet and the other laminating material. Laminates having any combination of layers are within the scope of this invention to the extent that at least one layer of the laminate is a starch-bound sheet. The laminate can be formed by bonding or otherwise joining at least two layers together. The thickness of the laminate may vary depending on the nature of intended properties of the laminate.

The laminating material that is bonded, adhered, or otherwise joined to the starch-bound sheet may include another starch-bound sheet, a material which imparts a desired property to the starch-bound sheet when the two are laminated together, a material which is described below as a coating or an adhesive, or any combination thereof. Examples of materials which enhance or alter the properties of the starch-bound sheets include organic polymer sheets, metal foil sheets, ionomer sheets, elastomeric sheets, plastic sheets, fibrous sheets or mats, paper sheets, cellophane sheets, nylon sheets, wax sheets, hydraulically settable sheets, highly inorganically filled sheets, and metallized film sheets.

Laminates within the scope of this invention can be formed by bonding a starch-bound sheet and another layer or layers with or without adhesives. The bond between the starch-bound sheet and the other layer (or between other layers of the laminate) can range from a slight cling to a bond which exceeds the strength of the sheets or materials being bonded.

Starch-bound sheets can be bonded without the use of adhesives to another layer as long as the sheet is sufficiently "green" to effectuate an effective bond between the individual laminae. The slightly moist starch can act as an adhesive. Layers of a laminate comprising water soluble materials may be adhered to a slightly moist or remoistened starch-bound sheet.

Bonds can be formed with adhesives through many different processes, including wet-bond laminating, dry-bond laminating, thermal laminating and pressure laminating. Useful adhesives include waterborne adhesives (both natural and synthetic), hot-melt adhesives, and solvent-borne adhesives.

Wet-bond laminating of a starch-bound sheet and another layer involves the use of any liquid adhesive to bond the two layers together. Useful natural waterborne adhesives for wet-bond lamination include vegetable starch-based adhesives, protein-based adhesives, animal glue, casein, and natural rubber latex. Useful synthetic waterborne adhesives generally include resin emulsions such as stable suspensions of polyvinyl acetate particles in water. Waterborne adhesives are low in odor, taste, color, and toxicity, have a broad range of adhesion, and have excellent aging properties.

Thermoplastic polymers are useful hot-melt adhesives that can be applied in a molten state and which set to form upon cooling. Hot-melt adhesives generally set quicker than other adhesives. Useful solvent-borne adhesives include polyurethane adhesives, solvent-borne ethylene-vinyl acetate systems and other rubber resins which are pressure sensitive. The starch within the starch-bound sheets can also act as a thermoplastic material. Heating the starch-bound sheets to above the glass transition temperature of the starch allows for the melting and reformation of the sheets. Cooling causes solidification of the sheet or article in the new conformation. The melted and cooled starch can also act as an adhesive that allows adhesion and sealing of the sheets if formed into a desired article such as by, for example, spiral winding to form a tube or can.

It is also within the scope of the present invention to create a laminate by foil stamping. Foil stamping involves the use of heat and pressure to transfer a thin metallic or pigmented coating from a carrier film to the starch-bound sheet or container surface to obtain patterned decorative effects. This technique can be utilized in combination with embossing to obtain a laminate with a reflective, glossy, raised surface.

B. Corrugating Processes

It may be desirable to corrugate a dried starch-bound sheet in a manner similar to corrugated cardboard. This may be accomplished by passing a sheet, preferably in a semi-moist condition, between a pair of corrugated rollers 86 as shown in FIG. 7. The moisture content of the sheet should be controlled so that the corrugation process does not damage the starch-bound matrix. If the sheet is too dry, the corrugation process can damage the matrix, and in some cases may even result in the tearing or splitting of the sheet. Conversely, if the sheet is too moist, the corrugated sheet may lack the green strength necessary to maintain the corrugated shape. Preferably, the amount of water in the starch-bound sheet to be corrugated is from about 1% to about 30% by weight, more preferably from about 5% to about 20% by weight, and most preferably from about 7% to about 15% by weight.

The corrugated sheet can be utilized as a single sheet or it can be combined with other sheets to form laminates as described above. The corrugated sheet can be laminated with a single flat starch-bound sheet or a sheet formed from other materials, thus resulting in a "single-face" corrugated sheet. Sandwiching a corrugated sheet between two flat sheets results in a "double-face" sheet. Multiple wall corrugated sheets can be created by alternating flat and corrugated layers. Single-face, double-face, and multiple wall corrugated sheets are characterized by relatively low density and relative high stiffness and compressive strength. They can be used when articles, such as containers and packaging materials, require such properties.

The strength and flexibility of a single corrugated sheet can be altered by varying the number of corrugations or flutes per linear foot. The flutes per linear fool can be increased to create a more flexible sheet or the flutes can be decreased to obtain a strong sheet with a high degree of cushioning ability. Multiple wall corrugated sheets can also be created with two or more corrugated sheets having different amounts of flutes per linear foot. As with scoring, score cutting, and perforating (which are described more fully below), the individual flutes of the corrugated sheets create locations where the sheet might more naturally bend or fold. However, the sheet is actually much stiffer and stronger in the direction perpendicular to the row of the flutes. Therefore, an article, such as a container or other packaging material, should be constructed so that the corrugated sheet will afford maximum flexibility where needed, and maximum stiffness where needed such as where the article will be stacked.

Coatings can also be applied as part of the corrugating process. Certain coating materials, particularly waxes or polyethylene, can be applied with hot roll coaters on the corrugator. Coatings can also be applied by curtain coating the corrugated blank before it is converted into an article. Other useful coating processes involving corrugated sheets include dipping completed articles into coatings, such as waxes, or cascading such coatings through and around the flutes of the corrugated article.

C. Coatings and Coating Processes

It is within the scope of the present invention to apply coatings or coating materials to the starch-bound sheets or to articles made from such sheets. Coatings can be used to alter the surface characteristics of the starch-bound sheet in a number of ways, including sealing and protecting the sheet or article made therefrom. Coatings may provide protection against moisture, base, acid, grease, and organic solvents. They may also provide a smoother, more flexible, glossier, or scuff-resistant surface and help prevent fiber "fly away." Coatings may also provide reflective, electrically conductive or insulative properties. They may even reinforce the starch-bound sheet, particularly at a bend or fold line.

Some coatings may soften the starch-bound matrix, thereby resulting in a more flexible sheet. For example, coatings based upon materials such as soybean oil or Methocel® (available from Dow Chemical), either alone or in combination with polyethylene glycol, can be applied to the sheet surface in order to permanently soften the sheet or a hinge area within the sheet. Other coating materials can be used to make the sheet more stiff. In addition, elastomeric, plastic, or paper coatings can aid in preserving the integrity of a hinge whether or not the underlying hardened structural matrix fractures upon bending at the hinge location. Some coatings may be used to strengthen places where the starch-bound sheets are severely bent, such as where the sheet has been scored. In such cases, a pliable, possibly elastomeric coating may be preferred. It may be preferable for the coating to be elastomeric or deformable particularly for articles formed by folding or convoluting. Some coatings can also be utilized as laminating materials or as adhesives.

The object of the coating process is usually to achieve a uniform film with minimal defects on the surface of the sheet. Coatings can be applied during the sheet forming process, the article forming process, or after the article is formed. The selection of a particular coating process depends on a number of substrate (i.e., sheet) variables, as well as coating formulation variables. The substrate variables include the strength, wetability, porosity, density, smoothness, and uniformity of the sheet. The coating formulation variables include total solids content, solvent base (including water solubility and volatility), surface tension, and rheology.

The coatings may be applied to the sheets using any coating means known in the art of manufacturing paper, paperboard, plastic, polystyrene, sheet metal, or other packaging materials, including blade, puddle, air-knife, printing, Dahlgren, gravure, and powder coating. Coatings may also be applied by spraying the sheet, article, or other object with any of the coating materials listed below or by dipping the sheet, article, or other object into a vat containing an appropriate coating material. Finally, coatings may be coextruded along with the sheet in order to integrate the coating process with the extrusion process.

Suitable organic coating materials include edible oils, melamine, polyvinyl chloride, polyvinyl alcohol, polyvinyl acetate, polyacrylates, polyamides, hydroxypropylmethylcellulose, polyethylene glycol, acrylics, polyurethane, polyethylene, polylactic acid, Biopol® (a polyhydroxybutyrate-hydroxyvalerate copolymer), latex, starches, soybean protein, soybean oil, cellulosic ethers (e.g., Methocel) polyethylene, synthetic polymers including biodegradable polymers, waxes (such as beeswax, petroleum-based wax, or synthetic wax), elastomers, and mixtures thereof. Biopol® is manufactured by Imperial Chemical Industries (ICI) in the United Kingdom. Suitable inorganic coating materials include sodium silicate, calcium carbonate, aluminum oxide, silicon oxide, kaolin, clay, ceramic and mixtures thereof. The inorganic coatings may also be mixed with one or more of the organic coatings set forth above. Besides these coatings, any appropriate coating material can be used depending on the application involved.

A waterproof coating is desirable for articles intended to be in contact with water. If the sheets are used to manufacture containers or other products intended to come into contact with foodstuffs, the coating material will preferably comprise an FDA-approved coating. A particularly useful coating is sodium silicate, which is acid resistant. Resistance to acidity is important, for example, where the article is a container exposed to foods or drinks having a high acid content, such as soft drinks or juices. It is generally unnecessary to protect the article from basic substances, but increased resistance to basic substances can be provided by an appropriate polymer or wax coating, such as those used to coat paper containers.

Polymeric coatings, such as polyethylene, are useful in forming generally thin layers having low density. Low density polyethylene is especially useful in creating containers which are liquid-tight and even pressure-tight to a certain extent. Polymeric coatings can also be utilized as an adhesive when heat sealed.

Aluminum oxide and silicon oxide are useful coatings, particularly as a barrier to oxygen and moisture. These coatings can be applied to the starch-bound sheets by any means known in the art, including the use of a high energy electron beam evaporation process, chemical plasma deposition, and sputtering. Another method of forming an aluminum oxide or silicon oxide coating involves treating of a starch-bound sheet with an aqueous solution having an appropriate pH level to cause the formation of aluminum oxide or silicon oxide on the sheet due to the composition of the sheet.

Waxes and wax blends, particularly petroleum and synthetic waxes, provide a barrier to moisture, oxygen, and some organic liquids, such as grease or oils. They also allow an article such as a container to be heat sealed. Petroleum waxes are a particularly useful group of waxes in food and beverage packaging and include paraffin waxes and microcrystalline waxes.

D. Scoring and Perforation Processes

In some cases it may be desirable to alternatively score, score cut, or perforate the sheet in order to define a line upon which the sheet may fold or bend. Scores, score cuts, and perforations can be formed into the sheets using means known in the art of sheet-molding. Score cuts can also be made using a continuous die cut roller. Alternatively, a score (not a score cut) may be pressed into the sheet by means of a rounded scoring die or rule. The scoring die or rule can be used alone or in conjunction with a score counter. The scoring rule configuration forces the sheet to deform into the groove of the score counter. Finally, a perforation may be made by means of a perforation cutter.

The purpose of the score, score cut, or perforation is to create a location on the starch-bound sheet where the sheet can be more easily bent or folded. This creates a "hinge" within the sheet with far greater bendability and resilience than possible with an unscored or unperforated sheet. In some cases, multiple score cuts or perforations may be desirable.

Cutting a score line or perforation within the sheet creates a better fold line or hinge for a number of reasons. First, it provides a place where the sheet might more naturally bend or fold. Second, cutting a score makes the sheet at the score line thinner than the rest of the sheet, which reduces the amount of lengthwise elongation of the surface while bending the sheet. The reduction of surface elongation reduces the tendency of the starch-bound matrix to fracture upon being folded or bent. Third, the score cut or perforation allows for a controlled crack formation within the starch-bound matrix in the event that fracture of the matrix occurs.

It may sometimes be preferable to concentrate more fibers at the location where the score cut or perforation is made. This can be accomplished by co-extruding a second layer of molding material containing a higher fiber content at predetermined timed intervals to correspond with the location of the score cut or perforation. In addition, fibers can be placed on top of, or injected within, the sheet during the extrusion or rolling processes in order to achieve a higher fiber concentration at the desired location.

The starch-bound sheet will be preferably in a substantially dry or semi-hardened state during the scoring or perforation process. This is desirable to prevent the score or perforation from closing up through the migration of moist material into the score cut. Since scoring generally (and perforation always) involves cutting through a portion of the starch-bound matrix, the sheet can even be totally dry without the scoring or perforation process harming the sheet. However, in cases where a score is pressed rather than cut into the sheet surface, the sheet should be moist enough to prevent fracture due to the dislocation of the starch-bound matrix.

The depth of the score cut will generally depend on the type of score, the thickness of the starch-bound sheet, and the desired degree of bending along the score line. The scoring mechanism should be adjusted to provide for a score of the desired depth. Of course, the die cutter should not be so large as to actually cut through the sheet or render it too thin to withstand the anticipated forces (unless an easily tearable score is desired). Preferably, the score cut should be just deep enough to adequately serve its purpose. A combination of score cuts on opposing sides of the sheet may be preferred in some cases to increase the range of bending motion.

E. Creping and Parchmenting Processes

The starch-bound sheets may optionally be creped much like conventional paper in order to provide a highly extensible sheet that is capable of absorbing energy at sudden rates of strain. Creped sheets are increasingly important in the production of shipping sacks. Conventional creping is performed either at the wet press section of a paper machine (wet crepe) or on a Yankee dryer (dry crepe). Although the exact parameters of either a wet or dry creping process will differ between the starch-bound sheets of the present invention and tree paper, one of ordinary skill in the art will recognize how to adjust the creping process in order to obtain creped starch-bound sheets. Creping can be utilized to create a more bendable sheet and also to form a hinge.

It has been found that the starch-bound sheets can be treated with strong acids in order to parchment the fibrous surface portion of the sheet matrix. Treating the sheet with, for example, concentrated sulfuric acid causes the cellulosic fibers to swell tremendously and become partially dissolved. In this state, these plasticized fibers close their pores, fill in surrounding voids and achieve more intimate contact with other fibers for more extensive hydrogen bonding. Rinsing with water causes reprecipitation and network consolidation, resulting in fibers that are stronger wet than dry, lint free, odor free, taste free, and resistant to grease and oils. By combining parchment's natural tensile toughness with extensibility imparted by wet creping, sheets with great shock-absorbing capability can be produced.

In the present invention, it can be seen that the parchmenting process would be expected to work better as the fiber content of the sheets is increased. Increased fiber content facilitates the sealing of the pores and increased hydrogen bonding of the fibers. It should be understood, however, that certain acid sensitive aggregates, such as calcium carbonate, should probably not be used where the sheet is to be parchmented.

F. Printing and Related Processes

It may be desirable to apply print or other indicia, such as trademarks, product information, container specifications, or logos, on the surface of the starch-bound sheets. This can be accomplished using any conventional printing means or processes known in the art of printing paper or cardboard products, including planographic, relief, intaglio, porous, and impactless printing. In addition, the sheets or articles may be embossed or provided with a watermark. In addition, decals, labels or other indicia can be attached or adhered to the starch-bound sheet using methods known in the art. Printed indicia may be applied to a continuous sheet, individual sheets, laminated sheets, blanks, or completed articles depending on the printing process involved and the shape of the article.

IV. ARTICLES MADE FROM STARCH-BOUND SHEETS

Using the methods set forth above, it is possible to manufacture a wide variety of sheets having greatly varying properties. The sheets may be as thin as about 0.1 mm or less in the case where very thin, flexible, and lightweight sheets are required. The sheets may also be as thick as about 1 cm in the case where relatively thick, strong, and stiff sheets are required. In addition, sheets may range in density from as low as about 0.6 g/cm$^3$ to as high as about 2 g/cm$^3$. Generally, higher density sheets are stronger while lower density sheets are more insulative. The exact thickness or density of a particular sheet can be designed beforehand in order to yield a sheet having the desired properties at a cost which allows the sheets to be produced in an economically feasible manner.

The cutting mechanisms utilized with paper and paperboard can also be utilized to cut a continuous starch-bound sheet into individual sheets. As shown in FIG. 8, the sheet can be cut into individual sheets by the use of a knife blade cutter, which is mounted on a press. Cutting can also be accomplished using continuous die cut rollers, by pressing a cutting die into the sheet, or by other means known in the art.

The sheets of the present invention may be used in any application where conventional paper or paperboard have been used. In addition, due to the unique properties of the starch-bound materials of the present invention, it is possible to make a variety of objects that presently require the use of plastics, polystyrene, or even metal.

In particular, the sheets of the present invention may be used to manufacture the following exemplary articles: containers, including disposable and nondisposable food or beverage containers, such as cereal boxes, sandwich containers, "clam shell" containers (including, but not limited to, hinged containers used with fast-food sandwiches such as hamburgers), frozen food boxes, milk cartons, fruit juice containers, yoghurt containers, beverage carriers (including, but not limited to, wraparound basket-style carriers, and "six pack" ring-style carriers), ice cream cartons, cups (including, but not limited to, disposable drinking cups, two piece cups, one piece pleated cups, and cone cups), french fry containers used by fast-food outlets, and fast food carryout boxes; packaging materials such as wrapping paper, spacing material, flexible packaging such as bags for snack foods, bags with an open end such as grocery bags, bags within cartons such as a dry cereal box, multiwall bags, sacks, wraparound casing, support cards for products which are displayed with a cover (particularly plastic covers disposed over food products such as lunch meats, office products, cosmetics, hardware items, and toys), support trays for supporting products (such as cookies and candy bars), cans, tape, and wraps (including, but not limited to, freezer wraps, tire wraps, butcher wraps, meat wraps, and sausage wraps); a variety of cartons and boxes such as corrugated boxes, cigar boxes, confectionery boxes, and boxes for cosmetics; convoluted or spiral wound containers for various products (such as frozen juice concentrate, oatmeal, potato chips, ice cream, salt, detergent, and motor oil), mailing tubes, sheet tubes for rolling materials (such as wrapping paper, cloth materials, paper towels and toilet paper), and sleeves; printed materials and office supplies such as books, magazines, brochures, envelopes, gummed tape, postcards, three-ring binders, book covers, folders, and pencils; various eating utensils and storage containers such as dishes, lids, straws, cutlery, bottles, jars, cases, crates, trays, baking trays, bowls, microwaveable dinner trays, "TV" dinner trays, egg cartons, meat packaging platters, disposable plates, vending plates, pie plates, and breakfast plates; and a variety of miscellaneous articles such as emergency emesis receptacles (i.e., "barf bags"), substantially spherical objects, toys, medicine vials, ampules, animal cages, non-flammable firework shells, model rocket engine shells, model rockets, and an endless variety of other objects.

V. EXAMPLES OF THE PREFERRED EMBODIMENTS

The following examples are presented in order to more specifically teach the compositions and methods for forming the starch-bound sheets according to the present invention. The examples include various mix designs, as well as methods for manufacturing sheets, containers, and other articles of manufacture having varying properties and dimensions from the sheets.

Example 1

Sheets with a high starch content were prepared from moldable mixtures that included the following components in the indicated amounts:

| Compound | Unmodified Starch | Water | Fiber | Methocel | Total |
| --- | --- | --- | --- | --- | --- |
| Density (g/cm$^3$) | 1.45 | 1.00 | 1.29 | 1.31 | — |
| Batch Weight (g) | 1700.00 | 6000.00 | 1200.00 | 230.00 | 9130 |
| Batch Volume (cm$^3$) | 1172.41 | 6000.00 | 930.23 | 175.57 | 8278 |
| By Weight (%)-wet | 18.62 | 65.72 | 13.14 | 2.52 | 100 |
| By Volume (%)-wet | 14.16 | 72.48 | 11.24 | 2.12 | 100 |
| By Weight (%)-dry | 54.31 | — | 38.34 | 7.35 | 100 |
| By Volume (%)-dry | 51.46 | — | 40.83 | 7.71 | 100 |

The fiber that was used in this example was southern pine and the unmodified starch was corn starch, which was ungelatinized when added to the mixture. The water, Methocel, and fibers were first mixed for 10 minutes under high shear in a Hobart kneader-mixer. Thereafter, the starch was added to the mixture, which was mixed for an additional 4 minutes under low shear.

The mixture was extruded using a deairing auger extruder through a 30 cm×0.6 cm die to form continuous sheets having corresponding dimensions of width and thickness. The extruded sheet was then passed between a pair of reduction rollers having a gap distance therebetween corresponding to the thickness of the sheet formed and heated to a temperature of about 70° C. Thereafter, the green sheet was passed between rollers having a temperature greater than about 100° C. in order to gelatinize the corn starch and the remove the water from the green sheet by evaporation. The Methocel formed a skin on the sheet surface, which prevented the starch from sticking to the rollers during the sheet forming process. The resulting starch-bound sheets had varying thicknesses from 0.1 mm to 1 mm.

Example 2

Inorganically filled sheets having a high starch content were prepared from the following molding composition.

| Compound | Unmodified Corn Starch | CaCO₃ | Water | Southern Pine Fiber | Methocel | Total |
|---|---|---|---|---|---|---|
| Density (g/cm³) | 1.45 | 2.70 | 1.00 | 1.29 | 1.31 | — |
| Batch Weight (g) | 1700.00 | 1700.00 | 7000.00 | 1200.00 | 200.00 | 11800 |
| Batch Vol. (cm³) | 1172.41 | 629.63 | 7000.00 | 930.23 | 152.67 | 9885 |
| By Weight (%)-wet | 14.41 | 14.41 | 59.32 | 10.17 | 1.69 | 100 |
| By Volume (%)-wet | 11.86 | 6.37 | 70.81 | 9.41 | 1.54 | 100 |
| By Weight (%)-dry | 35.42 | 35.42 | — | 25.00 | 4.17 | 100 |
| By Volume (%)-dry | 40.64 | 21.82 | — | 32.24 | 5.29 | 100 |

The water, Methocel, and southern pine fibers were first mixed for 10 minutes under high shear in a Hobart kneader-mixer. Thereafter, the calcium carbonate and corn starch were added to the mixture, which was mixed for an additional 4 minutes under low shear.

The mixture was extruded using a deairing auger extruder through a 30 cm×0.6 cm die to form continuous sheets having corresponding dimensions of width and thickness. The extruded sheet was then passed between a pair of forming/reduction rollers having a gap distance therebetween corresponding to the thickness of the sheet formed.

Since the calcium carbonate had a low specific surface area, the mixture had a low adhesiveness to the rollers. In addition, the Methocel prevented the starch from sticking to the rollers during the sheet forming process. The roller temperatures were similar to those used in Example 1. The sheets of these examples had thicknesses of 0.23 mm, 0.3 mm, 0.38 mm, and 0.5 mm.

Example 3

Inorganically filled sheets having a high starch content were prepared from the following composition.

| Compound | Unmodified Corn Starch | CaCO₃ | Water | Southern Pine Fiber | Methocel | Total |
|---|---|---|---|---|---|---|
| Density (g/cm³) | 1.45 | 2.70 | 1.00 | 1.29 | 1.31 | — |
| Batch Weight (g) | 1700.00 | 3000.00 | 7000.00 | 1200.00 | 200.00 | 13100 |
| Batch Vol. (cm³) | 1172.41 | 1111.11 | 7000.00 | 930.23 | 152.67 | 10366 |
| By Weight (%)-wet | 12.98 | 22.90 | 53.44 | 9.16 | 1.53 | 100 |
| By Volume (%)-wet | 11.31 | 10.72 | 67.53 | 8.97 | 1.47 | 100 |
| By Weight (%)-dry | 27.87 | 49.18 | — | 19.67 | 3.28 | 100 |
| By Volume (%)-dry | 34.83 | 33.01 | — | 27.63 | 4.54 | 100 |

The composition and sheets were prepared in the manner set forth in Example 2. The sheets formed in this example had thicknesses of 0.23 mm, 0.3 mm, 0.38 mm, and 0.5 mm.

Example 4

Inorganically filled sheets having a high starch content were prepared from the following composition.

| Compound | Unmodified Corn Starch | CaCO₃ | Water | Southern Pine Fiber | Methocel | Total |
|---|---|---|---|---|---|---|
| Density (g/cm³) | 1.45 | 2.70 | 1.00 | 1.29 | 1.31 | — |
| Batch Weight (g) | 2000.00 | 5000.00 | 8000.00 | 2000.00 | 200.00 | 17200 |
| Batch Vol. (cm³) | 1379.31 | 1851.85 | 8000.00 | 1550.39 | 152.67 | 12934 |
| By Weight (%)-wet | 11.63 | 29.07 | 46.51 | 11.63 | 1.16 | 100 |

-continued

| Compound | Unmodified Corn Starch | CaCO₃ | Water | Southern Pine Fiber | Methocel | Total |
|---|---|---|---|---|---|---|
| By Volume (%)-wet | 10.66 | 14.32 | 61.85 | 11.99 | 1.18 | 100 |
| By Weight (%)-dry | 21.74 | 54.35 | — | 21.74 | 2.17 | 100 |
| By Volume (%)-dry | 27.95 | 37.53 | — | 31.42 | 3.09 | 100 |

The composition and sheets were prepared in the manner set forth in Example 2. The sheets formed in this example had thicknesses of 0.23 mm, 0.3 mm, 0.38 mm, and 0.5 mm.

Example 5

Inorganically filled sheets having a high starch content were prepared from the following composition.

| Compound | Unmodified Corn Starch | CaCO₃ | Water | Southern Pine Fiber | Glycerin | Methocel | Total |
|---|---|---|---|---|---|---|---|
| Density (g/cm³) | 1.45 | 2.70 | 1.00 | 1.29 | 1.00 | 1.31 | — |
| Batch Wt. (g) | 2000.00 | 5000.00 | 8000.00 | 2000.00 | 300.00 | 200.00 | 17500 |
| Batch V. (cm³) | 1379.31 | 1851.85 | 8000.00 | 1550.39 | 300.00 | 152.67 | 13234 |
| By Weight (%)-wet | 11.43 | 28.57 | 45.71 | 11.43 | 1.71 | 1.14 | 100 |
| By Volume (%)-wet | 10.42 | 13.99 | 60.45 | 11.71 | 2.27 | 1.15 | 100 |
| By Weight (%)-dry | 21.05 | 52.63 | — | 21.05 | 3.16 | 2.11 | 100 |
| By Volume (%)-dry | 26.35 | 35.38 | — | 29.62 | 5.73 | 2.92 | 100 |

The composition and sheets were prepared in the manner set forth in Example 2. The sheets formed in this example had thicknesses of 0.23 mm, 0.3 mm, 0.38 mm, and 0.5 mm.

Example 6

Inorganically filled sheets having a high starch content were prepared from the following composition.

| Compound | Unmodified Corn Starch | CaCO₃ | Water | Southern Pine Fiber | Methocel | Total |
|---|---|---|---|---|---|---|
| Density (g/cm³) | 1.45 | 2.70 | 1.00 | 1.29 | 1.31 | — |
| Batch Wt. (g) | 2000.00 | 5000.00 | 9000.00 | 2000.00 | 200.00 | 18200 |
| Batch V. (cm³) | 1379.31 | 1851.85 | 9000.00 | 1550.39 | 152.67 | 13934 |
| By Weight (%)-wet | 10.99 | 27.47 | 49.45 | 10.99 | 1.10 | 100 |
| By Volume (%)-wet | 9.90 | 13.29 | 64.59 | 11.13 | 1.10 | 100 |
| By Weight (%)-dry | 21.74 | 54.35 | — | 21.74 | 2.17 | 100 |
| By Volume (%)-dry | 27.95 | 37.53 | — | 31.42 | 3.09 | 100 |

The composition and sheets were prepared in the manner set forth in Example 2. The sheets formed in this example had thicknesses of 0.23 mm, 0.3 mm, 0.38 mm, and 0.5 mm.

Example 7

Inorganically filled sheets having a high starch content were prepared from the following composition.

| Compound | Unmodified Corn Starch | CaCO₃ | Water | Southern Pine Fiber | Methocel | Total |
|---|---|---|---|---|---|---|
| Density (g/cm³) | 1.45 | 2.70 | 1.00 | 1.29 | 1.31 | — |
| Batch Wt. (g) | 2500.00 | 5000.00 | 9500.00 | 2000.00 | 200.00 | 19200 |
| Batch V. (cm³) | 1724.14 | 1851.85 | 9500.00 | 1550.39 | 152.67 | 14779 |
| By Weight (%)-wet | 13.02 | 26.04 | 49.48 | 10.42 | 1.04 | 100 |
| By Volume (%)-wet | 11.67 | 12.53 | 64.28 | 10.49 | 1.03 | 100 |
| By Weight (%)-dry | 25.77 | 51.55 | — | 20.62 | 2.06 | 100 |
| By Volume (%)-dry | 32.66 | 35.08 | — | 29.37 | 2.89 | 100 |

The composition and sheets were prepared in the manner set forth in Example 2. The sheets formed in this example had thicknesses of 0.23 mm, 0.3 mm, 0.38 mm, and 0.5 mm.

Example 8

Inorganically filled sheets having a high starch content were prepared from the following composition.

| Compound | Unmodified Corn Starch | CaCO₃ | Water | Southern Pine Fiber | Methocel | Total |
|---|---|---|---|---|---|---|
| Density (g/cm³) | 1.45 | 2.70 | 1.00 | 1.29 | 1.31 | — |
| Batch Wt. (g) | 2500.00 | 5000.00 | 9000.00 | 2000.00 | 100.00 | 18600 |
| Batch V. (cm³) | 1724.14 | 1851.85 | 9000.00 | 1550.39 | 76.34 | 14203 |
| By Weight (%)-wet | 13.44 | 26.88 | 48.39 | 10.75 | 0.54 | 100 |
| By Volume (%)-wet | 12.14 | 13.04 | 63.37 | 10.92 | 0.54 | 100 |
| By Weight (%)-dry | 26.04 | 52.08 | — | 20.83 | 1.04 | 100 |
| By Volume (%)-dry | 33.14 | 35.59 | — | 29.80 | 1.47 | 100 |

The composition and sheets were prepared in the manner set forth in Example 2. The sheets formed in this example had thicknesses of 0.23 mm, 0.3 mm, 0.38 mm, and 0.5 mm.

Example 9

Inorganically filled sheets having a high starch content were prepared from the following composition.

| Compound | Unmodified Corn Starch | CaCO₃ | Water | Southern Pine Fiber | Methocel | Total |
|---|---|---|---|---|---|---|
| Density (g/cm³) | 1.45 | 2.70 | 1.00 | 1.29 | 1.31 | — |
| Batch Wt. (g) | 3000.00 | 4000.00 | 9000.00 | 2000.00 | 100.00 | 18100 |
| Batch V. (cm³) | 2068.97 | 1481.48 | 9000.00 | 1550.39 | 76.34 | 14177 |
| By Weight (%)-wet | 16.57 | 22.10 | 49.72 | 11.05 | 0.55 | 100 |
| By Volume (%)-wet | 14.59 | 10.45 | 63.48 | 10.94 | 0.54 | 100 |
| By Weight (%)-dry | 32.97 | 43.96 | — | 21.98 | 1.10 | 100 |
| By Volume (%)-dry | 39.96 | 28.62 | — | 29.95 | 1.47 | 100 |

The composition and sheets were prepared in the manner set forth in Example 2. The sheets formed in this example had thicknesses of 0.23 mm, 0.3 mm, 0.38 mm, and 0.5 mm.

Example 10

Inorganically filled sheets having a high starch content were prepared from the following composition.

| Compound | Unmodified Corn Starch | CaCO₃ | Water | Southern Pine Fiber | Glycerin | Methocel | Total |
|---|---|---|---|---|---|---|---|
| Density (g/cm³) | 1.45 | 2.70 | 1.00 | 1.29 | 1.00 | 1.31 | — |
| Batch Wt. (g) | 3000.00 | 4000.00 | 9000.00 | 2000.00 | 300.00 | 100.00 | 18400 |
| Batch V. (cm³) | 2068.97 | 1481.48 | 9000.00 | 1550.39 | 300.00 | 76.34 | 14477 |
| By Weight (%)-wet | 16.30 | 21.74 | 48.91 | 10.87 | 1.63 | 0.54 | 100 |
| By Volume (%)-wet | 14.29 | 10.23 | 62.17 | 10.71 | 2.07 | 0.53 | 100 |
| By Weight (%)-dry | 31.91 | 42.55 | — | 21.28 | 3.19 | 1.06 | 100 |
| By Volume (%)-dry | 37.77 | 27.05 | — | 28.31 | 5.48 | 1.39 | 100 |

The composition and sheets were prepared in the manner set forth in Example 2. The sheets formed in this example had thicknesses of 0.23 mm, 0.3 mm, 0.38 mm, and 0.5 mm.

Example 11

Inorganically filled sheets having a high starch content were prepared from the following composition.

| Compound | Unmodified Corn Starch | CaCO$_3$ | Water | Southern Pine Fiber | Glycerin | Methocel | Total |
|---|---|---|---|---|---|---|---|
| Density (g/cm$^3$) | 1.45 | 2.70 | 1.00 | 1.29 | 1.00 | 1.31 | — |
| Batch Wt. (g) | 2000.00 | 6000.00 | 9000.00 | 2000.00 | 300.00 | 100.00 | 19400 |
| Batch V. (cm$^3$) | 1379.31 | 2222.22 | 9000.00 | 1550.39 | 300.00 | 76.34 | 14528 |
| By Weight (%)-wet | 10.31 | 30.93 | 46.39 | 10.31 | 1.55 | 0.52 | 100 |
| By Volume (%)-wet | 9.49 | 15.30 | 61.95 | 10.67 | 2.06 | 0.53 | 100 |
| By Weight (%)-dry | 19.23 | 57.69 | — | 19.23 | 2.88 | 0.96 | 100 |
| By Volume (%)-dry | 24.95 | 40.20 | — | 28.04 | 5.43 | 1.38 | 100 |

The composition and sheets were prepared in the manner set forth in Example 2. The sheets formed in this example had thicknesses of 0.23 mm, 0.3 mm, 0.38 mm, and 0.5 mm.

Example 12

Sheets with a high starch content were prepared from a moldable mixture that included the following components in the indicated amounts:

| Compound | Unmodified Starch | Water | Southern Pine Fiber | Methocel | Total |
|---|---|---|---|---|---|
| Density (g/cm$^3$) | 1.45 | 1.00 | 1.29 | 1.31 | — |
| Batch Wt. (g) | 4000.00 | 8000.00 | 2000.00 | 100.00 | 14100 |
| Batch V. (cm$^3$) | 2758.62 | 8000.00 | 1550.39 | 76.34 | 12385 |
| By Weight (%)-wet | 28.37 | 56.74 | 14.18 | 0.71 | 100 |
| By Volume (%)-wet | 22.27 | 64.59 | 12.52 | 0.62 | 100 |
| By Weight (%)-dry | 65.57 | — | 32.79 | 1.64 | 100 |
| By Volume (%)-dry | 62.91 | — | 35.35 | 1.74 | 100 |

The water, Methocel, and fibers were first mixed for 10 minutes under high shear in a Hobart kneader-mixer. Thereafter, the starch was added to the mixture, which was mixed for an additional 4 minutes under low shear. The sheets were prepared in the manner set forth in Example 2. The sheets formed in this example had thicknesses of 0.23 mm, 0.3 mm, 0.38 mm, and 0.5 mm.

Example 13

Sheets containing a significant quantity of starch were manufactured from a molding composition that included 8000 g water and the following components:

| Component | Batch Wt. (g) | Dry Wt. % | Batch Vol. (cm$^3$) | Dry Vol. % |
|---|---|---|---|---|
| Softwood Fiber | 2000 | 50.9% | 1550 | 53.5% |
| Corn Starch | 1700 | 43.3% | 1172 | 40.5% |
| Glycerin | 0 | 0.0% | 0 | 0.0% |
| CaCO$_3$ | 0 | 0.0% | 0 | 0.0% |
| Methocel 240 | 230 | 5.9% | 176 | 6.1% |
| Sum | 3930 | 100% | 2898 | 100% |

Sheets were manufactured as above. The Sheets had thicknesses ranging from 0.010" to 0.050" and a density of 1.11 g/cm$^3$.

Sheets having a thickness of 0.010" were manufactured into cups that resembled cups made from ordinary tree paper. Ordinary paper cups cost 1.101¢ per cup uncoated and 1.410¢ per cup coated with wax in paper stock. The compositions used to manufacture the inventive sheets cost 1.270¢ per cup uncoated and 1.455¢ per cup coated with wax. The uncoated inventive cups were 115% the cost of paper cups, while the coated invenive cups were only 103% the cost of paper cups owing to the ability to use far less coating material on the inventive cups.

The following table compares the cost of the various components used to make the sheets that were formed into cups. The table lists gross cost, unit cost per cup, and percentage cost of each ingredient in the dry batch (the cost of the water is presumed to be negligible).

| Component | Cost ($/lb.) | Cost/Cup (¢) | % Batch Cost |
|---|---|---|---|
| Softwood Fiber | 0.425 | 0.660 | 52% |
| Corn Starch | 0.09 | 0.119 | 9% |
| Glycerin | 1 | 0.000 | 0% |
| CaCO$_3$ | 0.015 | 0.000 | 0% |
| Methocel 230 | 2.75 | 0.491 | 39% |
| Sum | — | 1.270 | 100% |

The forgoing tables demonstrates that although the molding composition used to manufacture the inventive sheets only inluded 5.9% Methocel 240 by dry weight of the molding composition, it made up 39% of the materials cost for manufacturing the sheet. On the other hand, while corn starch made up 43.3% by dry weight of the molding composition, it made up only 9% of the total materials cost. Methocel 240 costs $2.75/lb., while corn starch costs only $0.09/lb., plainly indicating that replacing Methocel with starch greatly reduces the materials costs expended in manufacturing the inventive sheets.

Example 14

As a matter of comparison, sheets were manufactured from the following composition which included no starch but increased methylcellulose. In addition, the composition included a large amount of inorganic filler, which is generally the cheapest of all components. Water was included in an amount of 11 kg.

| Component | Batch Wt. (g) | Dry Wt. % | Batch Vol. (cm³) | Dry Vol. % |
|---|---|---|---|---|
| Abaca Fiber | 2000 | 20.4% | 1550 | 32.9% |
| Corn Starch | 0 | 0.0% | 0 | 0.0% |
| Glycerin | 0 | 0.0% | 0 | 0.0% |
| CaCO₃ | 7000 | 71.4% | 2545 | 54.1% |
| Methocel 240 | 800 | 5.9% | 611 | 13.0% |
| Sum | 9800 | 100% | 4707 | 100% |

Notwithstanding the inclusion of a large amount of inorganic filler, the use of 800 g Methocel 240, which represented 70% of the materials cost, increased the unit cost of each uncoated cup to 1.509¢ and of each coated cup to 1.694¢. The inorganic filler increased the density of the sheets to 1.70 g.cm³.

Example 15

The molding composition used in this example was identical in every respect to the composition used in Example 13, except that a 50/50 mixture of hardwood and softwood fibers were used in this example. The resulting sheets were similar to those of Example 14. The materials cost of making cups from the sheets of this example was virtually identical to the cost of making cups from the sheets of Example 13.

Example 16

The molding composition used in this example was identical in every respect to the composition used in Example 13, except that abaca fibers were used in this example. The materials cost of making cups from the sheets of this example was virtually identical to the cost of making cups from the sheets of Example 13.

Example 17

The molding composition used in this example was identical in every respect to the composition used in Example 13, except that only 1200 g softwood fibers were used in this example. The materials cost of making cups from the sheets of this example was slightly more than the cost of making cups from the sheets of Example 13.

Example 18

Sheets were manufactured according to the method of Example 13, except that the following composition containing 7000 g of water was used.

| Component | Batch Wt. (g) | Dry Wt. % | Batch Vol. (cm³) | Dry Vol. % |
|---|---|---|---|---|
| Fiber | 1200 | 25.0% | 930 | 32.4% |
| Corn Starch | 1700 | 35.4% | 1172 | 40.8% |
| Glycerin | 0 | 0.0% | 0 | 0.0% |
| CaCO₃ | 1700 | 35.4% | 618 | 21.5% |
| Methocel 240 | 200 | 4.2% | 153 | 5.3% |
| Sum | 4800 | 100% | 2873 | 100% |

The resulting sheets had a density of 1.37 g.cm³. The unit cost of uncoated cups made from the sheets of this example was 0.970¢ and of coated cups was 1.155¢, which is 88% and 82% of the cost of coated and uncoated paper cups, respectively.

Example 19

Sheets were manufactured using a composition that was similar to the composition of Example 18, except that the amount of CaCO₃ was increased to 3000 g while the other components were held constant. The resulting sheets had a density of 1.49 g/cm³. The unit cost of uncoated cups made from the sheets of this example was 0.846¢ and of coated cups was 1.031¢, which is 77% and 73% of the cost of coated and uncoated paper cups, respectively.

Example 20

Sheets were manufactured according to the method of Example 13, except that the following composition containing 8000 g of water was used.

| Component | Batch Wt. (g) | Dry Wt. % | Batch Vol. (cm³) | Dry Vol. % |
|---|---|---|---|---|
| Pine Fiber | 2000 | 21.7% | 1550 | 31.6% |
| Corn Starch | 2000 | 21.7% | 1379 | 28.1% |
| Glycerin | 0 | 0.0% | 0 | 0.0% |
| CaCO₃ | 5000 | 54.3% | 1818 | 37.1% |
| Methocel 240 | 200 | 2.2% | 153 | 3.1% |
| Sum | 9500 | 100% | 4901 | 100% |

The resulting sheets had a density of 1.53 g.cm³. The unit cost of uncoated cups made from the sheets of this example was 0.760¢ and of coated cups was 0.945¢, which is 69% and 67% of the cost of coated and uncoated paper cups, respectively.

Example 21

Sheets were manufactured from a composition that was similar in every respect to the composition of Example 20, except for the further inclusion of 300 g glycerin. The resulting sheets had a density of 1.49 g/cm³. The unit cost of uncoated cups made from the sheets of this example was 0.846¢ and of coated cups was 1.031¢, which is 77% and 73% of the cost of coated and uncoated paper cups, respectively.

Example 22

Sheets were manufactured from a composition that was similar in every respect to the composition of Example 20, except that the concentration of corn starch was increased to 2500 g and the amount of water was increased to 9500 g. The resulting sheets had a density of 1.51 g/cm³. The unit cost of uncoated cups made from the sheets of this example was 0.729¢ and of coated cups was 0.914¢, which is 66% and 65% of the cost of coated and uncoated paper cups, respectively. Increasing the amount of starch had the effect of further decreasing the unit cost of the cups slightly.

Example 23

Sheets were manufactured from a composition that was similar in every respect to the composition of Example 22, except that the concentration of Methocel 240 was decreased to 100 g and the amount of water decreased to 9000 g. The resulting sheets had a density of 1.52 g/cm³. The unit cost of uncoated cups made from the sheets of this example was 0.620¢ and of coated cups was 0.850¢, which is 56% and 57% of the cost of coated and uncoated paper cups, respectively. Decreasing the amount of Methocel 240 had the effect of significantly decreasing the unit cost of the cups.

Example 24

Sheets were manufactured according to the method of Example 13, except that the following composition containing 9000 g of water was used.

| Component | Batch Wt. (g) | Dry Wt. % | Batch Vol. (cm³) | Dry Vol. % |
|---|---|---|---|---|
| Fiber | 2000 | 22.0% | 1550 | 30.1% |
| Corn Starch | 3000 | 33.0% | 2069 | 40.2% |
| Glycerin | 0 | 0.0% | 0 | 0.0% |
| CaCO₃ | 4000 | 44.0% | 1455 | 28.2% |
| Methocel 240 | 100 | 1.1% | 76 | 1.5% |
| Sum | 9100 | 100% | 5150 | 100% |

The resulting sheets had a density of 1.44 g.cm³. The unit cost of uncoated cups made from the sheets of this example was 0.636¢ and of coated cups was 0.821¢, which is 58% and 58% of the cost of coated and uncoated paper cups, respectively.

Example 25

Sheets were manufactured from a composition that was similar in every respect to the composition of Example 24, except that 100 g of glycerin was used. The resulting sheets had a density of 1.43 g/cm³. The unit cost of uncoated cups made from the sheets of this example was 0.667¢ and of coated cups was 0.852¢, which is 61% and 60% of the cost of coated and uncoated paper cups, respectively.

Example 26

Sheets were manufactured from a composition that was similar in every respect to the composition of Example 25, except that the glycerin content was increased to 200 g. The resulting sheets had a density of 1.42 g/cm³. The unit cost of uncoated cups made from the sheets of this example was 0.696¢ and of coated cups was 0.881¢, which is 63% of the cost of both coated and uncoated paper cups.

Example 27

Sheets were manufactured from a composition that was similar in every respect to the composition of Example 26, except that the glycerin content was further increased to 300 g. The resulting sheets had a density of 1.41 g/cm³. The unit cost of uncoated cups made from the sheets of this example was 0.725¢ and of coated cups was 0.910¢, which is 65% of the cost of both coated and uncoated paper cups.

Example 28

Sheets were manufactured according to the method of Example 13, except that the following composition containing 9000 g of water was used.

| Component | Batch Wt. (g) | Dry Wt. % | Batch Vol. (cm³) | Dry Vol. % |
|---|---|---|---|---|
| Fiber | 2000 | 21.7% | 1550 | 31.6% |
| Corn Starch | 2000 | 21.7% | 1379 | 28.1% |
| Glycerin | 300 | 0.0% | 0 | 0.0% |
| CaCO₃ | 6000 | 54.3% | 1818 | 37.1% |
| Methocel 240 | 100 | 2.2% | 153 | 3.1% |
| Sum | 10400 | 100% | 4901 | 100% |

The resulting sheets had a density of 1.55 g.cm³. The unit cost of uncoated cups made from the sheets of this example was 0.695¢ and of coated cups was 0.880¢, which is 63% and 62% of the cost of coated and uncoated paper cups, respectively.

Example 29

Sheets were manufactured from a composition that was similar in every respect to the composition of Example 28, except that the glycerin content was increased to 400 g. The resulting sheets had a density of 1.54 g/cm³. The unit cost of uncoated cups made from the sheets of this example was 0.7230¢ and of coated cups was 0.908¢, which is 66% and 64% of the cost of coated and uncoated paper cups, respectively.

Example 30

Sheets were manufactured from a composition that was similar in every respect to the composition of Example 28, except that the glycerin was eliminated. The resulting sheets had a density of 1.59 g/cm³. The unit cost of uncoated cups made from the sheets of this example was 0.605¢ and of coated cups was 0.790¢, which is 55% and 56% of the cost of coated and uncoated paper cups, respectively.

Example 31

Sheets were manufactured from a composition that was similar in every respect to the composition of Example 30, except that the amount of Methocel 240 used in the composition was increased to 200 g and the water increased to 10 kg. The resulting sheets had a density of 1.58 g/cm³. The unit cost of uncoated cups made from the sheets of this example was 0.714¢ and of coated cups was 0.899¢, which is 65% and 64% of the cost of coated and uncoated paper cups, respectively.

Example 32

Sheets were manufactured from a composition that was similar in every respect to the composition of Example 31, except that the water content was reduced to 9000 g. The resulting sheets had a density of 1.58 g/cm³. The unit cost of uncoated cups made from the sheets of this example was 0.714¢ and of coated cups was 0.899¢, which is 65% and 64% of the cost of coated and uncoated paper cups, respectively. The water content was optimum based on the properties of the newly formed sheet.

Example 33

Sheets were manufactured from a composition that was similar in every respect to the composition of Example 32, except that 300 g of glycerin were used. The resulting sheets had a density of 1.54 g/cm³. The unit cost of uncoated cups made from the sheets of this example was 0.797¢ and of coated cups was 0.982¢, which is 72% and 70% of the cost of coated and uncoated paper cups, respectively.

Example 34

Sheets were manufactured from a composition that was similar in every respect to the composition of Example 32, except that 400 g of glycerin were used. The resulting sheets had a density of 1.53 g/cm³. The unit cost of uncoated cups made from the sheets of this example was 0.822¢ and of coated cups was 1.007¢, which is 75% and 71% of the cost of coated and uncoated paper cups, respectively.

Example 35

Sheets were manufactured from a composition that was similar in every respect to the composition of Example 32, except that 500 g of glycerin were used. The resulting sheets had a density of 1.52 g/cm³. The unit cost of uncoated cups made from the sheets of this example was 0.847¢ and of coated cups was 1.032¢, which is 77% and 73% of the cost of coated and uncoated paper cups, respectively.

Example 36

Sheets were manufactured according to the method of Example 13, except that the following composition containing 9000 g of water was used.

| Component | Batch Wt. (g) | Dry Wt. % | Batch Vol. (cm³) | Dry Vol. % |
| --- | --- | --- | --- | --- |
| Fiber | 2000 | 32.8% | 1550 | 35.4% |
| Corn Starch | 4000 | 65.6% | 2759 | 62.9% |
| Glycerin | 0 | 0.0% | 0 | 0.0% |
| CaCO₃ | 0 | 0.0% | 0 | 0.0% |
| Methocel 240 | 100 | 1.6% | 76 | 1.7% |
| Sum | 6100 | 100% | 4385 | 100% |

The resulting sheets had a density of 1.14 g.cm³. The unit cost of uncoated cups made from the sheets of this example was 0.762¢ and of coated cups was 0.947¢, which is 69% and 67% of the cost of coated and uncoated paper cups, respectively.

Example 37

Sheets were manufactured according to the method of Example 13, except that the following composition containing 8000 g of water was used.

| Component | Batch Wt. (g) | Dry Wt. % | Batch Vol. (cm³) | Dry Vol. % |
| --- | --- | --- | --- | --- |
| Fiber | 1200 | 12.8% | 930 | 20.0% |
| Corn Starch | 2000 | 21.3% | 1379 | 29.7% |
| Glycerin | 0 | 0.0% | 0 | 0.0% |
| CaCO₃ | 6000 | 63.8% | 2182 | 47.0% |
| Methocel 240 | 200 | 2.1% | 153 | 3.3% |
| Sum | 9400 | 100% | 4644 | 100% |

The resulting sheets had a density of 1.65 g.cm³. The unit cost of uncoated cups made from the sheets of this example was 0.644¢ and of coated cups was 0.829¢, which is 59% of the cost of both coated and uncoated paper cups.

Example 38

Sheets were manufactured according to the method of Example 13, except that the following composition containing 8000 g of water was used.

| Component | Batch Wt. (g) | Dry Wt. % | Batch Vol. (cm³) | Dry Vol. % |
| --- | --- | --- | --- | --- |
| Fiber | 2000 | 31.7% | 1550 | 33.8% |
| Corn Starch | 4000 | 63.5% | 2759 | 60.2% |
| Glycerin | 200 | 3.2% | 200 | 4.4% |
| CaCO₃ | 0 | 0.0% | 0 | 0.0% |
| Methocel 240 | 100 | 1.6% | 76 | 1.7% |
| Sum | 6300 | 100% | 4585 | 100% |

The resulting sheets had a density of 1.12 g.cm³. The unit cost of uncoated cups made from the sheets of this example was 0.827¢ and of coated cups was 1.012¢, which is 75% and 72% of the cost of coated and uncoated paper cups, respectively.

Example 39

Sheets were manufactured from a composition that was similar in every respect to the composition of Example 38, except that the amount of glycerin that was used was increased to 400 g. The resulting sheets had a density of 1.11 g/cm³. The unit cost of uncoated cups made from the sheets of this example was 0.886¢ and of coated cups was 1.071¢, which is 80% and 76% of the cost of coated and uncoated paper cups, respectively.

Example 40

Sheets were manufactured according to the method of Example 13, except that the following composition containing 8500 g of water was used.

| Component | Batch Wt. (g) | Dry Wt. % | Batch Vol. (cm³) | Dry Vol. % |
| --- | --- | --- | --- | --- |
| Fiber | 2000 | 28.2% | 1550 | 32.6% |
| Corn Starch | 4000 | 56.3% | 2759 | 58.1% |
| Glycerin | 0 | 0.0% | 0 | 0.0% |
| CaCO₃ | 1000 | 14.1% | 364 | 7.7% |
| Methocel 240 | 100 | 1.4% | 76 | 1.6% |
| Sum | 7100 | 100% | 4749 | 100% |

The resulting sheets had a density of 1.22 g.cm³. The unit cost of uncoated cups made from the sheets of this example was 0.711¢ and of coated cups was 0.896¢, which is 65% and 64% of the cost of coated and uncoated paper cups, respectively.

Example 41

Sheets were manufactured from a composition that was similar in every respect to the composition of Example 40, except that the amount of CaCO₃ was increased to 1500 g and the water increased to 8750 g. The resulting sheets had a density of 1.26 g/cm³. The unit cost of uncoated cups made from the sheets of this example was 0.688¢ and of coated cups was 0.873¢, which is 62% of the cost of both coated and uncoated paper cups.

Example 42

Sheets were manufactured from a composition that was similar in every respect to the composition of Example 40, except that the amount of CaCO₃ was increased to 2000 g. The resulting sheets had a density of 1.29 g/cm³. The unit cost of uncoated cups made from the sheets of this example was 0.667¢ and of coated cups was 0.852¢, which is 61% and 60% of the cost of coated and uncoated paper cups, respectively.

Example 43

Sheets were manufactured from a composition that was similar in every respect to the composition of Example 40, except that the amount of CaCO₃ was increased to 3000 g, the Methocel 240 to 150 g, and the water increased to 9500 g. The resulting sheets had a density of 1.36 g/cm³. The unit cost of uncoated cups made from the sheets of this example was 0.680¢ and of coated cups was 0.866¢, which is 62% and 61% of the cost of coated and uncoated paper cups, respectively.

Example 44

Sheets were manufactured from a composition that was similar in every respect to the composition of Example 43, except that the amount of water was increased to 10 kg, which appeared to be optimum for the sheet-forming process.

Example 45

Sheets were manufactured from a composition that was similar in every respect to the composition of Example 40, except that the amount of CaCO$_3$ was increased to 3000 g, the Methocel 240 to 200 g, and the water increased to 10.5 kg. The resulting sheets had a density of 1.35 g/cm$^3$. The unit cost of uncoated cups made from the sheets of this example was 0.732¢ and of coated cups was 0.917¢, which is 66% and 65% of the cost of coated and uncoated paper cups, respectively.

Example 46

Sheets were manufactured from a composition that was similar in every respect to the composition of Example 43, except that 200 g of glycerin was used and the amount of water in the molding composition was increased to 10 kg. The resulting sheets had a density of 1.34 g/cm$^3$. The unit cost of uncoated cups made from the sheets of this example was 0.735¢ and of coated cups was 0.920¢, which is 67% and 65% of the cost of coated and uncoated paper cups, respectively.

Example 47

Sheets were manufactured from a composition that was similar in every respect to the composition of Example 43, except that 400 g of glycerin was used and the amount of water in the molding composition was increased to 10 kg. The resulting sheets had a density of 1.32 g/cm$^3$. The unit cost of uncoated cups made from the sheets of this example was 0.787¢ and of coated cups was 0.927¢, which is 71% and 69% of the cost of coated and uncoated paper cups, respectively.

Example 48

Sheets were manufactured from a composition that was similar in every respect to the composition of Example 43, except that 600 g of glycerin was used and the amount of water in the molding composition was increased to 10 kg. The resulting sheets had a density of 1.30 g/cm$^3$. The unit cost of uncoated cups made from the sheets of this example was 0.835¢ and of coated cups was 1.020¢, which is 76% and 72% of the cost of coated and uncoated paper cups, respectively.

Example 49

Sheets were manufactured according to the method of Example 13, except that the following composition containing 11 kg of water was used.

| Component | Batch Wt. (g) | Dry Wt. % | Batch Vol. (cm$^3$) | Dry Vol. % |
|---|---|---|---|---|
| Fiber | 2000 | 21.5% | 1550 | 27.5% |
| Corn Starch | 4000 | 43.0% | 2759 | 49.0% |
| Glycerin | 0 | 0.0% | 0 | 0.0% |
| CaCO$_3$ | 3000 | 32.3% | 1091 | 19.4% |
| Methocel 240 | 300 | 3.2% | 229 | 4.1% |
| Sum | 9300 | 100% | 5629 | 100% |

The resulting sheets had a density of 1.35 g.cm$^3$. The unit cost of uncoated cups made from the sheets of this example was 0.832¢ and of coated cups was 1.017¢, which is 76% and 72% of the cost of coated and uncoated paper cups, respectively.

Example 50

Sheets were manufactured from a composition that was similar in every respect to the composition of Example 49, except that the amount of Methocel 240 was reduced to 250 g and the water reduced to 10 kg. The resulting sheets had a density of 1.35 g/cm$^3$. The unit cost of uncoated cups made from the sheets of this example was 0.782¢ and of coated cups was 0.967¢, which is 71% and 69% of the cost of coated and uncoated paper cups, respectively.

Example 51

Sheets were manufactured from a composition that was similar in every respect to the composition of Example 36, except that the amount of Methocel 240 was increased to 150 g and the water reduced to 8500 g. The resulting sheets had a density of 1.14 g/cm$^3$. The unit cost of uncoated cups made from the sheets of this example was 0.825¢ and of coated cups was 1.010¢, which is 75% and 72% of the cost of coated and uncoated paper cups, respectively.

Example 52

Sheets were manufactured from a composition that was similar in every respect to the composition of Example 36, except that the amount of Methocel 240 was increased to 200 g. The resulting sheets had a density of 1.14 g/cm$^3$. The unit cost of uncoated cups made from the sheets of this example was 0.888¢ and of coated cups was 1.073¢, which is 81% and 76% of the cost of coated and uncoated paper cups, respectively.

In the following examples, very thin sheets are formed that have many characteristics and properties making them suitable for use much like paper, paperboard, plastic, polystyrene, or metal sheets of similar thickness and weight. The desired properties are designed into the sheets using a microstructural engineering approach. This allows for the manufacture of sheets having a variety of desirable properties, including properties not generally possible in mass-produced sheet-like objects presently manufactured from the foregoing conventional materials.

Examples 53–58

Sheets capable of being formed into a variety of articles (including food or beverage containers) are manufactured according to the processes described in Examples 1–52. The hardened sheets are finished, optionally coated, and then formed into a number of different food and beverage containers.

For example, a "cold cup" (such as those in which cold soft drinks are dispensed at fast food restaurants) is made by cutting an appropriate blank from a sheet, rolling the blank into the shape of a cup, and adhering the ends of the rolled blank using conventional water-based glue. A disc is placed at the bottom of the cup, and the bottom of the rolled wall portion is crimped in order to hold the bottom of the cup in place. The rim of the cup is curled to strengthen the rim and create a smoother drinking surface. Sheets having a thickness of 0.3 mm can be used to make the cup.

A "clam shell" container (such as those presently used in the fast food industry to package hamburgers) is made by cutting an appropriate blank from a sheet, score cutting the blank to form the desired fold lines, folding the blank into the shape of a clam shell container, and adhering or interlocking the ends of the folded blank to preserve the integrity of the container. Sheets having a thickness of 0.4 mm can be used to make the clam shell container.

A french fry container (such as those used to serve cooked french fries in the fast food industry) is made by cutting an appropriate blank from a sheet, score cutting the blank to form the desired fold lines, folding the blank into the shape of a french fry container, and adhering the ends of the folded blank using an adhesive to preserve the integrity of the container. Sheets having a thickness of 0.4 mm can be used to make the french fry container.

A frozen food box (such as those used by supermarkets to package frozen foods) is made by cutting an appropriate blank from a sheet, score cutting the blank to form the desired fold lines, folding the blank into the shape of a frozen food box, and adhering the ends of the folded blank using an adhesive to preserve the integrity of the box. Sheets having a thickness of 0.5 mm can be used to make the frozen food boxes.

A cold cereal box is made by cutting an appropriate blank from a 0.3 mm thick sheet, score cutting the blank to form the desired fold lines, folding the blank into the shape of a cold cereal box, and adhering the ends of the folded blank using an adhesive to preserve the integrity of the cereal box.

A drinking straw is made by rolling a piece of a 0.25 mm sheet into the form of a straw and adhering the ends together. In making the straw, as in making each of the containers set forth above, it is advantageous to control the moisture content of the sheet in order to maintain the highest level of flexibility of the sheet. The higher level of flexibility minimizes splitting and tearing of the sheet.

The containers so made are set forth as follows, including the thickness of the sheet used to make each container:

| Example | Container | Sheet Thickness |
|---|---|---|
| 53 | cold cup | 0.3 mm |
| 54 | clam shell | 0.4 mm |
| 55 | french fry container | 0.4 mm |
| 56 | frozen food box | 0.5 mm |
| 57 | cold cereal box | 0.3 mm |
| 58 | drinking straw | 0.25 mm |

Example 59

Cold cups made according to Example 53 are passed through a commercial wax coating machine, whereby a uniform layer of wax is applied to the surface. The layer of wax completely seals the surface of the cup to moisture and renders it watertight.

Example 60

Cold cups made according to Example 53 are coated with an acrylic coating using a fine spraying nozzle. Similar to the wax in Example 59, the layer of acrylic coating completely seals the surface of the cup to moisture and renders it watertight. The acrylic coating has the added advantage that it is not as visible as the wax coating. Because a thinner acrylic coating is possible, the cup looks almost as if it is uncoated. The glossiness of the cup can be controlled by using different types of acrylic coatings.

Examples 61-62

Clam shell containers made according to Example 54 are alternatively coated with the same coating materials used to coat the cold cups in Examples 59-60. The results are substantially identical to those achieved with the coated cups.

| Example | Coating Material |
|---|---|
| 61 | wax |
| 62 | acrylic |

Examples 63

Sheets of varying thickness between 0.25 mm and 0.5 mm are formed according to the processes of Examples 1-52. Dry sheets of each thickness are cut into circular shapes and formed into disposable plates using a commercial mechanical press fitted with a progressive die used to make such plates out of paper stock. The formed plates are substantially similar in shape, strength, and appearance compared to conventional paper plates. However, the plates made from starch-bound sheets are more rigid than conventional paper plates and, hence, possess more structural integrity when food is placed on or within the plates.

Example 64

Starch-bound sheets using any of the mix designs set forth above are used to manufacture printed reading materials, such as magazines or brochures. Such magazines and brochures contain both thinner, more flexible sheets, as well as thicker, less flexible sheets. The thinner, more flexible sheets have a thickness of about 0.025-0.05 mm, while the thicker, less flexible sheets have a thickness of about 0.1-0.2 mm.

Example 65

Using any of the foregoing compositions, corrugated sheets containing a fluted inner structure sandwiched between two flat sheets are formed. The flat outer sheets are formed by rolling the material into a flat sheet of the appropriate thickness. The corrugated, or fluted inner sheet (which is similar to the fluted or corrugated inner sheet of an ordinary cardboard box) is formed by passing either a hardened or remoistened flat starch-bound sheet of the appropriate thickness through a pair of rollers with intermeshing corrugated surfaces or teeth.

Glue is applied to the surfaces of the corrugated sheet, which is then sandwiched between two flat sheets and allowed to harden. The corrugated/sandwich sheet construction has superior properties of strength, toughness, and rigidity compared to conventional corrugated cardboard sheets.

VI. SUMMARY

From the foregoing, it will be appreciated that the present invention provides compositions and methods for manufacturing low cost, environmentally friendly sheets which have properties similar to paper, paperboard, polystyrene, plastic, or metal sheets.

In addition, the present invention provides compositions and methods for manufacturing sheets that can be formed into a variety of containers or other articles using existing manufacturing equipment and techniques presently used to form articles from paper, paperboard, polystyrene, plastic, or metal sheets.

Further, the present invention provides compositions and methods for manufacturing environmentally friendly sheets that can be formed from moldable compositions which contain only a fraction of the water contained in typically slurries used to make conventional paper and which do not require extensive dewatering during the sheet forming process.

In addition, the present invention provides sheets, as well as containers and other articles made therefrom, that are readily biodegradable and/or decomposable into substances naturally found in the earth.

Moreover, the present invention provides compositions and methods which allow for the manufacture of sheets, containers and other articles therefrom at a cost that is comparable to or even lower than the cost of existing methods for manufacturing paper, plastics, or metal products.

Specifically, the present invention reduces the energy requirements and initial capital investment cost for making products having the desirable characteristics found in paper, plastics, or metals.

The present invention further provides compositions and methods which allow for the inclusion of relatively high amounts of starch within sheets while overcoming the problems associated its adhesion of starch, particularly gelatinized starch, to the molding or sheet forming apparatus.

Further, the present invention provides compositions and methods which allow for the optional inclusion of significant quantities of natural inorganic mineral fillers within the aforementioned sheets.

Finally, the present invention provides compositions and methods for manufacturing inorganically filled sheets that have greater flexibility, tensile strength, toughness, moldability, and mass-producibility compared to primary materials having a high content of inorganic filler.

The present invention may be embodied in other specific forms without departing from its spirit or essential characteristics. The described embodiments are to be considered in all respects as illustrative only and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A starch-bound sheet comprising:
   (a) a binding matrix including starch and a cellulosic ether, the starch having a concentration in a range from about 5% to about 90% by weight of solids in the sheet, the cellulosic ether having a concentration in a range from about 0.5% to about 10% by weight of solids in the sheet;
   (b) fibers substantially homogeneously dispersed throughout the binding matrix and having a concentration in a range from about 3% to about 40% by weight of solids in the sheet; and
   (c) an inorganic mineral filler included in a range from about 0% to about 90% by weight of solids in the sheet, the starch-bound sheet having a thickness less than about 1 cm and a density greater than about 0.5 g/cm³.

2. A sheet as defined in claim 1, wherein the starch has a concentration in a range from about 15% to about 75% by weight of total solids in the sheet.

3. A sheet as defined in claim 1, wherein the starch has a concentration in a range from about 30% to about 70% by weight of total solids in the sheet.

4. A sheet as defined in claim 1, wherein the starch comprises unmodified potato starch.

5. A sheet as defined in claim 1, wherein the starch comprises unmodified corn starch.

6. A sheet as defined in claim 1, wherein the starch comprises unmodified waxy corn starch.

7. A sheet as defined in claim 1, wherein the cellulosic ether has a concentration in a range from about 1% to about 5% by weight of total solids in the sheet.

8. A sheet as defined in claim 1, wherein the cellulosic ether has a concentration in a range from about 2% to about 4% by weight of total solids in the sheet.

9. A sheet as defined in claim 1, wherein the cellulosic ether is selected from the group consisting of methylhydroxyethylcellulose, hydroxymethylethylcellulose, carboxymethylcellulose, methylcellulose, ethylcellulose, hydroxyethylcellulose, hydroxyethylpropylcellulose, and mixtures or derivatives thereof.

10. A sheet as defined in claim 1, wherein the binding matrix further includes a protein-based binder selected from the group consisting of prolamine, collagen, gelatin, glue, casein, and mixtures or derivatives thereof.

11. A sheet as defined in claim 1, wherein the binding matrix further includes a polysaccharide selected from the group consisting of alginic acid, phycocolloids, agar, gum arabic, guar gum, locust bean gum, gum karaya, gum tragacanth, and mixtures or derivatives thereof.

12. A sheet as defined in claim 1, wherein the binding matrix further includes a synthetic organic binder selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, polylactic acid, ethylene oxide polymers, latex, and mixtures or derivatives thereof.

13. A sheet as defined in claim 1, wherein the inorganic mineral filler has a concentration in a range from about 30% to about 70% by weight of total solids in the sheet.

14. A sheet as defined in claim 1, wherein the inorganic mineral filler is selected from the group consisting of clay, gypsum, calcium carbonate, mica, silica, alumina, sand, gravel, sandstone, limestone, and mixtures thereof.

15. A sheet as defined in claim 1, wherein the inorganic mineral filler comprises individual particles that are size optimized in order to achieve a predetermined natural particle packing density.

16. A sheet as defined in claim 15, wherein the natural particle packing density of the inorganic aggregate is at least about 0.65.

17. A sheet as defined in claim 1, wherein the inorganic mineral filler comprises a lightweight aggregate selected from the group consisting of perlite, vermiculite, hollow glass spheres, porous ceramic spheres, pumice, and mixtures thereof.

18. A sheet as defined in claim 1, wherein the fibers have a concentration in a range from about 5% to about 30% by weight of total solids in the sheet.

19. A sheet as defined in claim 1, wherein the fibers have a concentration in a range from about 7% to about 20% by weight of total solids in the sheet.

20. A sheet as defined in claim 1, wherein the fibers comprise organic fibers selected from the group consisting of hemp fibers, cotton fibers, bagasse fibers, abaca fibers, flax, southern pine fibers, southern hardwood fibers, and mixtures thereof.

21. A sheet as defined in claim 1, wherein the fibers comprise inorganic fibers selected from the group consisting of glass fibers, silica fibers, ceramic fibers, carbon fibers, metal fibers, and mixtures thereof.

22. A sheet as defined in claim 1, wherein the fibrous material includes individual fibers having an aspect ratio of at least about 10:1.

23. A sheet as defined in claim 1, wherein the fibrous material includes individual fibers having an aspect ratio of at least about 100:1.

24. A sheet as defined in claim 1, wherein said sheet has a thickness less than about 5 mm.

25. A sheet as defined in claim 1, wherein said sheet has a thickness less than about 3 mm.

26. A sheet as defined in claim 1, wherein said sheet has a thickness less than about 1 mm.

27. A sheet as defined in claim 1, wherein the fibers include a mixture of different fibers having varying strengths and flexibilities.

28. A sheet as defined in claim 1, wherein the fibers have a substantially random orientation within the sheet.

29. A sheet as defined in claim 1, wherein the fibers have a substantially unidirectional orientation within the sheet.

30. A sheet as defined in claim 1, wherein the fibers have a substantially bidirectional orientation within the sheet.

31. A sheet as defined in claim 1, wherein the sheet has a tensile strength to density ratio in a range from about 2 MPa·cm$^3$/g to about 500 MPa·cm$^3$/g.

32. A sheet as defined in claim 1, wherein the sheet has a tensile strength to density ratio in a range from about 5 MPa·cm$^3$/g to about 150 MPa·cm$^3$/g.

33. A sheet as defined in claim 1, wherein the sheet has a tensile strength in a range from about 0.05 MPa to about 100 MPa.

34. A sheet as defined in claim 1, wherein the sheet has a tensile strength in a range from about 5 MPa to about 80 MPa.

35. A sheet as defined in claim 1, wherein the sheet has a density greater than about 1 g/cm$^3$.

36. A sheet as defined in claim 1, wherein the sheet has a density greater than about 1.5 g/cm$^3$.

37. A sheet as defined in claim 1, wherein the sheet can elongate in a range from about 0.5% to about 12% without completely fracturing.

38. A sheet as defined in claim 1, wherein the sheet is water degradable.

39. A sheet as defined in claim 1, wherein the sheet is corrugated.

40. A sheet as defined in claim 1, wherein the sheet is creped.

41. A sheet as defined in claim 1, wherein the sheet is parchmented.

42. A sheet as defined in claim 1, wherein the sheet further includes a coating.

43. A sheet as defined in claim 1, wherein the sheet further includes a second sheet laminated thereto.

44. A sheet as defined in claim 1, wherein the sheet includes an indicia.

45. A sheet as defined in claim 1, wherein the sheet includes a hinge.

46. A sheet as defined in claim 1, wherein the sheet includes a perforation.

47. A sheet as defined in claim 1, wherein the sheet has been fashioned into a container.

48. A sheet as defined in claim 1, wherein the sheet may be bent over an angle of about 90° without substantially fracturing.

49. A sheet as defined in claim 1, wherein the sheet may be bent over an angle of about 180° without substantially fracturing.

50. A sheet as defined in claim 1, wherein the sheet comprises a continuous sheet that has been rolled onto a spool.

51. An inorganically filled starch-bound sheet comprising:
(a) a binding matrix including starch and a cellulosic ether, the starch having a concentration in a range from about 5% to about 75% weight of solids in the sheet, the cellulosic ether having a concentration in a range from about 0.5% to about 10% by weight of solids in the sheet;
(b) fibers substantially homogeneously dispersed throughout the binding matrix and having a concentration in a range from about 3% to about 40% by weight of solids in the sheet; and
(c) an inorganic mineral filler included in a range from about 20% to about 90% by weight of solids in the sheet, the starch-bound sheet having a thickness less than about 1 cm and a density greater than about 0.5 g/cm$^3$.

52. An inorganically filled starch-bound sheet as defined in claim 51, wherein the cellulosic ether is selected from the group consisting of methylhydroxyethylcellulose, hydroxymethylethylcellulose, carboxymethylcellulose, methylcellulose, ethylcellulose, hydroxyethylcellulose, hydroxyethylpropylcellulose, and mixtures or derivatives thereof.

53. An inorganically filled starch-bound sheet as defined in claim 51, wherein the binding matrix further includes a protein-based binder selected from the group consisting of prolamine, collagen, gelatin, glue, casein, and mixtures or derivatives thereof.

54. An inorganically filled starch-bound sheet as defined in claim 51, wherein the binding matrix further includes a polysaccharide selected from the group consisting of alginic acid, phycocolloids, agar, gum arabic, guar gum, locust bean gum, gum karaya, gum tragacanth, and mixtures or derivatives thereof.

55. An inorganically filled starch-bound sheet as defined in claim 51, wherein the binding matrix further includes a synthetic organic binder selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, polylactic acid, ethylene oxide polymers, latex, and mixtures or derivatives thereof.

56. An inorganically filled starch-bound sheet as defined in claim 51, wherein the inorganic mineral filler is selected from the group consisting of clay, gypsum, calcium carbonate, mica, silica, alumina, sand, gravel, sandstone, limestone, and mixtures thereof.

57. An inorganically filled starch-bound sheet as defined in claim 51, wherein the inorganic mineral filler comprises a lightweight aggregate selected from the group consisting of perlite, vermiculite, hollow glass spheres, porous ceramic spheres, pumice, and mixtures thereof.

58. An inorganically filled starch-bound sheet as defined in claim 51, wherein the fibers comprise organic fibers selected from the group consisting of hemp fibers, cotton fibers, bagasse fibers, abaca fibers, flax, southern pine fibers, southern hardwood fibers, and mixtures thereof.

59. An inorganically filled starch-bound sheet as defined in claim 51, wherein the fibers comprise inorganic fibers selected from the group consisting of glass fibers, silica fibers, ceramic fibers, carbon fibers, metal fibers, and mixtures thereof.

60. An inorganically filled starch-bound sheet as defined in claim 51, wherein the sheet has a thickness less than about 5 mm.

61. An inorganically filled starch-bound sheet as defined in claim 51, wherein the sheet has a thickness less than about 3 mm.

62. An inorganically filled starch-bound sheet as defined in claim 51, wherein the sheet has a thickness less than about 1 mm.

63. An inorganically filled starch-bound sheet as defined in claim 51, wherein the fibers have a substantially random orientation within the sheets.

64. An inorganically filled starch-bound sheet as defined in claim 51, wherein the fibers have a substantially unidirectional orientation within the sheet.

65. An inorganically filled starch-bound sheet as defined in claim 51, wherein the sheet has a density greater than about 1 g/cm$^3$.

66. An inorganically filled starch-bound sheet as defined in claim 51, wherein the sheet has a density greater than about 1.5 g/cm$^3$.

67. An inorganically filled starch-bound sheet as defined in claim 51, wherein the sheet is water degradable.

68. An inorganically filled starch-bound sheet as defined in claim 51, wherein the sheet further includes a coating on at least a portion thereof.

69. An inorganically filled starch-bound sheet as defined in claim 51, wherein the sheet further includes a second sheet laminated thereto.

70. An inorganically filled starch-bound sheet as defined in claim 51, wherein the sheet includes a hinge.

71. An inorganically filled starch-bound sheet as defined in claim 51, wherein the sheet is fashioned into a container.

72. An inorganically filled starch-bound sheet as defined in claim 51, wherein the sheet comprises a continuous sheet that has been rolled onto a spool.

73. A starch-bound sheet formed by passing a starch-based composition between at least one set of heated rollers, the starch-bound sheet having a thickness less than about 1 cm and a density greater than about 0.5 g/cm$^3$, the starch-based mixture comprising:

(a) water;

(b) ungelatinized starch granules having a concentration in a range from about 5% to about 90% by weight of total solids in the starch-based composition;

(c) a cellulosic ether having a concentration in a range from about 0.5% to about 10% by weight of total solids in the starch-based composition;

(d) an inorganic mineral filler having a concentration in a range from about 0% to about 90% by weight of solids in the starch-based composition; and (e) fibers having a concentration in a range from about 3% to about 40% by weight of total solids in the starch-based composition.

74. A starch-bound sheet as defined in claim 73, wherein at least a portion of the ungelatinized starch granules in the starch-based composition become at least partially gelatinized upon formation of the starch-bound sheet.

75. A starch-bound sheet as defined in claim 73, wherein the cellulosic ether reduces adhesion between the starch-based composition and the heated rollers during formation of the starch-bound sheet.

76. A starch-bound sheet as defined in claim 73, wherein the sheet has the thickness of less than about 3 mm.

77. A starch-bound sheet as defined in claim 73, wherein the sheet has the thickness of less than about 1 mm.

78. A starch-bound sheet as defined in claim 73, wherein the sheet has a density greater than about 1 g/cm$^3$.

79. A starch-bound sheet as defined in claim 73, wherein the sheet has a density greater than about 1.5 g/cm$^3$.

80. A starch-bound sheet as defined in claim 73, wherein the sheet further includes a coating on at least a portion thereof.

81. A starch-bound sheet as defined in claim 73, wherein the sheet is fashioned into a container.

82. A starch-bound sheet as defined in claim 73, wherein the sheet comprises a continuous sheet that has been rolled onto a spool.

83. A starch-bound sheet as defined in claim 73, wherein the sheet further includes at least one other sheet laminated thereto.

84. A starch-bound sheet as defined in claim 83, wherein the at least one other sheet is selected from the group consisting of starch-bound sheets, organic polymer sheets, metal foil sheets, ionomer sheets, elastomeric sheets, plastic sheets, fibrous sheets, mats, paper sheets, cellophane sheets, nylon sheets, wax sheets, hydraulically settable sheets, highly inorganically filled sheets, metallized film sheets and combinations thereof.

85. (New) A starch-bound sheet as defined in claim 73, wherein the starch-based composition further includes a hydraulically settable binder.

86. An inorganically filled starch-bound sheet formed by passing a starch-based composition between at least one set of heated rollers, the starch-bound sheet having a thickness less than about 1 cm and a density greater than about 0.5 g/cm$^3$, the starch-based mixture comprising:

(a) water;

(b) ungelatinized starch granules having a concentration in a range from about 5% to about 75% by weight of total solids in the starch-based composition;

(c) a cellulosic ether having a concentration in a range from about 0.5% to about 10% by weight of total solids in the starch-based composition;

(d) an inorganic mineral filler having a concentration in a range from about 20% to about 90% by weight of solids in the starch-based composition; and (e) fibers having a concentration in a range from about 3% to about 40% by weight of total solids in the starch-based composition.

* * * * *